United States Patent [19]
Dombrosky et al.

[11] Patent Number: 5,881,247
[45] Date of Patent: Mar. 9, 1999

[54] SYSTEM HAVING A PLURALITY OF FRAME BYTES CAPABLE OF IDENTIFYING ADDRESSED RECIPIENTS AND ASSERT A BUSY SIGNAL ONTO THE BACKPLANE BUS TO FORTHRIGHTLY ABORT THE MESSAGE TRANSFER

[75] Inventors: Dennis J. Dombrosky, Willoghby Hills; Jack D. Calderon, Concord Township, Lakes County; Timothy J. Murphy, Hudson, all of Ohio

[73] Assignee: Allen-Bradley Company LLC, Milwaukee, Wis.

[21] Appl. No.: 537,066

[22] Filed: Nov. 30, 1995

[51] Int. Cl.$^6$ .................................................... G06F 13/00
[52] U.S. Cl. .................. 395/280; 395/309; 395/877; 395/200.62; 395/200.64; 395/200.65; 395/200.66
[58] Field of Search .................................... 395/280, 309, 395/287, 285, 289, 741, 200, 303, 737, 182.12, 650; 370/85.1, 85; 364/90, 200

[56] References Cited

U.S. PATENT DOCUMENTS

| | | | |
|---|---|---|---|
| 4,442,504 | 4/1984 | Dummermuth et al. | 364/900 |
| 4,516,205 | 5/1985 | Eing A et al. | 364/200 |
| 4,583,262 | 4/1986 | Sinniger et al. | 370/85 |
| 4,787,082 | 11/1988 | Delaney et al. | 370/85 |
| 4,897,833 | 1/1990 | Kent et al. | 370/85.2 |
| 4,937,777 | 6/1990 | Flood et al. | 364/900 |
| 5,084,871 | 1/1992 | Carn et al. | 370/94.1 |
| 5,193,189 | 3/1993 | Flood et al. | 395/650 |
| 5,237,567 | 8/1993 | Nay et al. | 370/85.1 |
| 5,249,292 | 9/1993 | Chiappa | 395/650 |
| 5,509,124 | 4/1996 | Bourke et al. | 395/280 |

OTHER PUBLICATIONS

IEEE Standard for Futurebus+ –Logical Protocol Specification, IEEE Computer Society, Sep. 26, 1991, pp. 39 to 56.
Multibus II Bus Architecture Specification, Intel Corporation, 1984, pp. 2–27 to 2–37.

*Primary Examiner*—Meng-Ai T. An
*Assistant Examiner*—Eric S. Thlang
*Attorney, Agent, or Firm*—John J. Horn; John M. Miller; William R. Walbrun

[57] ABSTRACT

A bus structure for interconnecting the modules of an industrial automation controller includes DATA lines and associated control lines that enable interface circuits on each module to transfer frames of data. The interface circuit includes a flow control circuit for managing resources within the receiving module, and thus controlling the flow of data over the backplane bus. As soon as a message begins to be received, the flow control circuit makes a determination as to the availability of resources within the module to successfully receive the data frame. If sufficient resources are not available, a busy indication is returned to the transmitting module, and the transmitting module then aborts the transmission. The factors evaluated by the interface circuit in forming the determination as to the availability of resources includes the factors of: (a) availability of a control block when the frame begins a new complete message, (b) completion of processing for a frame from a particular source module before accepting another frame from that module, and (c) availability of a buffer for receiving the frame.

26 Claims, 28 Drawing Sheets

FIG. 5  SIMPLIFIED BUS TIMING DIAGRAM

FIG. 15B

4 BYTE BY 4 BYTE SELECTOR MAPPING TABLE

| | SIZE_VALID = FALSE<br>STROBE WR0-WR3<br>ON BUS CYCLE 1 | SIZE_VALID = TRUE | | |
|---|---|---|---|---|
| | | SIZE = 8 BITS | SIZE = 16 BITS | SIZE = 32 BITS |
| LATCH "A" = IN_DATA[7:0] | | LATCH "A" = IN_DATA[7:0]<br>STROBE WR0 ON:<br>BUS CYCLES 5, 9, 13 . . . | LATCH "A" = IN_DATA[7:0]<br>STROBE WR0 ON:<br>BUS CYCLES 3, 5, 7 . . . | LATCH "A" = IN_DATA[7:0]<br>STROBE WR0 ON:<br>BUS CYCLES 2, 3, 4 . . . |
| LATCH "B" = IN_DATA[15:8] | | LATCH "B" = IN_DATA[7:0]<br>STROBE WR1 ON:<br>BUS CYCLES 2, 6, 10 . . . | LATCH "B" = IN_DATA[15:8]<br>STROBE WR1 ON:<br>BUS CYCLES 3, 5, 7 . . . | LATCH "B" = IN_DATA[15:8]<br>STROBE WR1 ON:<br>BUS CYCLES 2, 3, 4 . . . |
| LATCH "C" = IN_DATA[23:16] | | LATCH "C" = IN_DATA[7:0]<br>STROBE WR2 ON:<br>BUS CYCLES 3, 7, 11 . . . | LATCH "C" = IN_DATA[7:0]<br>STROBE WR2 ON:<br>BUS CYCLES 2, 4, 6 . . . | LATCH "C" = IN_DATA[23:16]<br>STROBE WR2 ON:<br>BUS CYCLES 2, 3, 4 . . . |
| LATCH "D" = IN_DATA[31:24] | | LATCH "D" = IN_DATA[7:0]<br>STROBE WR3 ON:<br>BUS CYCLES 4, 8, 12 . . . | LATCH "D" = IN_DATA[15:8]<br>STROBE WR3 ON:<br>BUS CYCLES 2, 4, 6 . . . | LATCH "D" = IN_DATA[31:24]<br>STROBE WR3 ON:<br>BUS CYCLES 2, 3, 4 . . . |

SYSTEM HAVING A PLURALITY OF FRAME BYTES CAPABLE OF IDENTIFYING ADDRESSED RECIPIENTS AND ASSERT A BUSY SIGNAL ONTO THE BACKPLANE BUS TO FORTHRIGHTLY ABORT THE MESSAGE TRANSFER

The field of the invention is automation controllers such as those described in U.S. Pat. Nos. 3,810,118; 3,942,158; 4,038,533; 4,228,495; 4,442,504; 4,742,443; 4,858,101 and 5,038,317. And more particularly, the invention relates to bus structures for interconnecting separate modules in such automation controllers.

BACKGROUND OF THE INVENTION

Automation controllers are typically connected to industrial equipment such as assembly lines, machine tools and processing equipment to operate the equipment in accordance with a stored program. In controllers such as those disclosed in the above cited patents, for example, the control program is stored in a memory and includes instructions which are read out in rapid sequence and executed to examine the condition of selected sensing devices on the controlled equipment, or to energize or de-energize selected operating devices on the controlled equipment contingent upon the status of one or more of the examined sensing devices.

Large controllers consist of a number of modules with different functions assigned to each module. For example, one module may execute the user control program, another may interface the controller to the remote sensing and operating devices, and yet another module may control communications with a host computer via a local area network. The modules are typically housed in a rack and are interconnected by a bus structure on the backplane of the rack.

Since the backplane buses are needed by all the modules, it is necessary to establish procedures for sharing the common buses. In one approach described in U.S. Pat. Nos. 4,691,296 and 5,038,317, for example, one of the modules serves as a "master" of the backplane buses and it scans, or polls, all of the other "slave" modules on the backplane to determine if they have data to exchange. In a variation of this technique described in U.S. Pat. No. 3,815,099, the master module may be interrupted by requests from slave modules that require prompt access to the backplane buses. The master module has a circuit for receiving the interrupt requests and granting access to requesting modules based on a priority scheme. Such interrupt schemes enable occasional high priority data exchanges to occur promptly while the scanning, or polling, process is conducted in the background on a continuous basis. This approach works well when there is a single module that dominates the backplane buses, but it is less appropriate when more than one module needs control of a substantial portion of the bus bandwidth.

Another approach exemplified by the controllers described in U.S. Pat. Nos. 4,442,504 and 4,876,664 enables any module connected to the backplane bus to become master for the purpose of exchanging data with another module. In these controllers one of the modules contains an arbitration circuit that grants access to requesting modules according to a fixed priority scheme. In one method, priority of access is granted to the modules according to the physical location of requesting modules in the backplane rack and this preference does not change from one arbitration period to the next. In the other method, priority is determined by position in the backplane rack, but the order is rotated in a methodical manner during successive arbitration periods such that all modules are guaranteed priority access on a regular basis.

Prior bus arbitration methods have a number of limitations when employed in industrial applications. In some systems arbitration for access to the backplane bus is performed by one module, and if that module is removed or fails, the entire backplane rack is rendered inoperable. More importantly, however, the single phase arbitration methods used in most prior systems do not recognize differences in the priority of the data to be exchanged. That is, priority is granted simply on the basis of the module requesting bus access during that arbitration period, and no consideration is given to the type of data to be exchanged. As a result, standard bus architectures such as VMEbus, MULTIBUS I and MULTIBUS II are severely limited in industrial applications. For example, an analog input module may produce normal data on a relatively infrequent basis (e.g. seconds), and as a result, that module may be given a low priority under one of the prior arbitration schemes. However, that module may also report alarm conditions which should be given high priority. Conversely, a module which connects the backplane to a serial I/O network will be given high priority under prior arbitration schemes because it conveys I/O data that must be reported within milliseconds of events. However, such modules may also convey large blocks of data from I/O devices that report infrequently, and will monopolize the bus during those infrequent intervals if given the same high priority level. In other words, many modules connected to an industrial backplane will transfer data that is highly time critical and should, therefore, be given a high priority, and such modules may also transfer large amounts of data that is not time critical and should be given a low priority.

Another limitation of standard buses such as Futurebus+ is the high cost to implement their protocols. This is due to the large number of backplane lines required to convey the various control and status signals between modules (see e.g. IEEE standard 896.1, 1991, page 48 and FIG. 15). These many backplane lines must be driven by each module and the signals on them must be received by circuitry in each module. With highly functional, expensive modules, such as processor modules, the cost of extensive backplane interface circuitry for arbitration is not burdensome. However, with low cost input and output modules, complex backplane interface circuitry cannot be cost justified and therefore a need exists to reduce the number backplane lines required for arbitration.

Also, the mix of modules in an industrial automation controller typically have different performance and communication requirements. For example, high cost/complexity modules may have wide (i.e. 32 or 64 bit) internal architectures and communication interfaces to achieve a high throughput, while inexpensive, low complexity modules require far less capability. However, since all of the modules must interoperate on a backplane bus within the industrial controller, all of the modules in the past had to be designed to the same standards, i.e. the highest capability demanded by the most complex modules. Consequently, even the lowest complexity modules had to support wide communications interfaces to the bus, which required far more line receivers, line drivers, buffers, etc. than were necessary, and thus increased their cost substantially. Therefore, a need exists for a capability to permit interoperability of modules with a wide range of different operational requirements on a single, common bus structure.

Another consideration in current industrial control systems is the flow of message traffic between modules. Often, a module may be overwhelmed when messages are received faster than they can be processed. When a message can not be accepted, some form of negative acknowledgement (NACK) is sent back to the transmitting module, but not until most or all of the message has already been sent. Further, in order to prevent such overflow situations, the modules had to be designed with additional resources in terms of memory for control blocks, buffers, etc. to better accommodate peak message traffic. Of course, this also increases the cost of the modules, particularly in otherwise low cost/complexity modules. Thus, a need also exists for a means to control the flow of messages between modules, so that modules may effectively use a limited amount of resources while at the same time reducing the time spent transmitting and retransmitting rejected messages.

SUMMARY OF THE INVENTION

The present invention relates to a backplane bus structure, and particularly, to a method and means for a set of interconnected modules to (a) arbitrate for control of the backplane bus, (b) automatically and dynamically negotiate a data transfer width for performing data transfers between modules with differing data transfer width capabilities, and (c) evaluate resource availability criteria within receiving modules to make a determination at the inception of message transmission as to whether or not to quickly abort the data transfer if the receiving module does not have sufficient resources at that moment to ensure successful message completion.

In one aspect of the invention, the bus structure includes a set of arbitration lines which couple to an arbitration circuit in each connected module. The arbitration lines in turn include a set of wired-or weight code lines and a single wired-or arbitration strobe line. Each connected module which has data to transmit, and therefore requires bus mastership, activates its arbitration circuit for participation in a competition cycle. The competition cycle is conducted using the wired-or weight code lines and the wired-or arbitration strobe line in a manner in which bus mastership is awarded to the module which is asserting the numerically highest local weight code on the weight code lines at a time determined by mutual release of the wired-or arbitration strobe line by all modules participating in the competition cycle. In forming the numerically highest weight code, each participating module asserts its own local weight code and then continuously examines an aggregate weight code appearing on the wired-or weight code lines. Modules which find that their local weight code is numerically less than the aggregate weight code appearing on the wired-or weight code lines drop out of the competition, until only the module with the numerically highest weight code remains.

One object of the invention is to enable each module to arbitrate for backplane control in a process that requires few additional backplane lines. Control of the competition cycle is performed mutually among the participating modules using the single wired-or arbitration strobe line. The competition cycle may further be divided into two phases, where first and second portions of the weight codes are sequentially asserted to further reduce the number of arbitration lines required. For a two phase competition, the invention still utilizes only a single wired-or arbitration strobe line, in which the two phases of the competition are defined by successive, mutual assertions by the participating modules.

In another aspect of the invention, the weight codes may include fields which identify both the module source address and a priority code of the data which the module is waiting to transmit. Then, the aggregate weight code which appears on the wired-or weight code lines at the conclusion of the competition forms an arbitration vector which may be latched by all connected modules; including modules which did not win the competition and even modules which did not participate in the competition. In that way, every module has obtained both the source address of the next module to transmit and the priority of the message which will be transmitted prior to the actual data transmission being commenced. Therefore, this information does not need to be included in the message itself, thus reducing data transmission time and eliminating the need for separate data or control lines for this purpose.

Another object of the invention is to provide a fairness mechanism in awarding bus mastership through the arbitration process by utilizing a wired-or bus request line in the set of arbitration lines. Mutual assertion of the wired-or bus request line by competing modules defines an arbitration cycle, in which each module is permitted to obtain bus mastership only once during a particular arbitration cycle. When a module has data to transmit, but has not yet won a competition cycle in a particular arbitration cycle, the module enters the arbitration by asserting the wired-or bus request line, and commences participation in competition cycles. Once a module has obtained bus mastership by virtue of having won a competition, the arbitration circuit releases the wired-or bus request line, and does not participate in any more competitions until all other modules have had their turn at bus mastership, as indicated by release of the wired-or bus request line by all connected modules.

A more specific object of the invention is to minimize the impact of the arbitration process on bus bandwidth. The arbitration lines are provided separately from the data transfer lines. Consequently, the arbitration for a new "owner" of the backplane bus can be carried out concurrently with a data transfer being performed by the current owner of the backplane bus. When such a concurrent arbitration is being conducted (i.e. while the current owner is transmitting data), the arbitration will have completed and the new owner will be ready to transfer data as soon as the current owner relinquishes control of the data transfer lines.

In a still further aspect of the invention, the interconnected modules may each support differing data transfer width capabilities, and the modules which are participating in the data transfer conduct a negotiation amongst themselves to determine a negotiated data transfer width. The ensuing data transfer is then conducted at a width corresponding to the negotiated transfer width. The backplane bus includes a set of DATA lines for conducting the data transfer, in which the negotiated transfer width may dictate that all of the DATA lines or a subset thereof may be utilized for the transfer. The data transfer itself is conducted in a series of bus cycles, and the negotiation for the data transfer width is conducted during the first bus cycle using a wired-or status line (STATUS_L). A transmitting module and each of one or more addressed recipient modules each assert a data transfer width code onto the wired-or status line (STATUS_L), in which the data transfer width code corresponds to a maximum number of lines in the set of DATA lines over which each respective module is capable of transferring data. The result of the negotiation appears on the wired-or status line (STATUS_L), and is latched by each module participating in the data transfer during the first bus cycle. The second and subsequent bus cycles are then conducted according to the negotiated width.

An object of the invention afforded by the above described interoperability is to permit modules of different cost and complexity to be operatively combined in a single backplane system. For example, low cost modules which support only a relatively narrow data transfer width may be produced with a more narrow internal processing width and less receiver/driver components for connecting to the backplane DATA lines. At the same time, high capability and high cost modules may be capable of wide data transfers to like modules, and yet be automatically and seamlessly interoperable with modules supporting narrower data transfers. In every individual data transfer, a separate negotiation is conducted between the transmitting module and one or more addressed recipient modules to determine the data transfer width that will be used for that particular data transfer. The negotiated data transfer width thus arrived at is the widest data width which is mutually supported by all modules participating in the transfer.

Consistent with the foregoing object of the invention, a variety of different data transfer widths for the various modules connected to the bus may be accommodated by utilizing a plurality of wired-or status lines (STATUS_L) to convey the data transfer width codes. In that case, assertion of each one of the status lines (STATUS_L) may be indicative of a reduction in the maximum bus width supported by the asserting module. The aggregate, or negotiated data transfer width thus appearing on the plurality of wired-or status lines (STATUS_L) is thereby encoded to indicate the minimum bus width supported by all of the modules participating in the transfer.

A still further object of the invention is to support interoperability between modules having different data transfer speed capabilities. An additional status line (STATUS_L) may be employed in a manner similar to the above described data transfer width negotiation to further negotiate for the speed at which the data transfer is to be conducted. This further allows interoperability between modules which have different data transfer speed capabilities.

One more object of the invention is to further reduce the number of backplane lines required by using the status lines for alternate functions after the data transfer width and speed negotiations are completed in the first bus cycle, i.e. beginning with the second and subsequent bus cycles.

Yet another object of the invention is to prevent transmission of entire message frames when one or more of the receiving modules are not capable of receiving the message frame at that particular time. Receiving modules which are addressed recipients of the message frame may include a flow control circuit which makes a determination very early in the message reception as to whether or not the module currently has sufficient resources available to successfully receive the complete message frame. If any one of the receiving modules is not currently capable of receiving the message frame, then a busy signal is asserted on the backplane bus and the transmitting module aborts the transmission. The determination may be based on the first and second frame bytes received, and if the busy signal is to be asserted, it is asserted prior to the latter of the second bus cycle (when the first and second frame bytes are both received during the first bus cycle) or the third bus cycle (when the first and second frame bytes are received in respective first and second bus cycles). In that way, the bus is quickly made available for the transmission of a subsequent message frame (i.e. not later than the third bus cycle), since the current message frame is known to be incapable of being accepted by at least one receiving module at that time, and will therefore need to be repeated later anyway. The determination as to available resources is performed according to resource availability criteria, which may include separate criteria for (a) availability of control blocks for managing receipt of a new complete message, if the message frame includes a start-of-message code indicating the same; (b) a lockout to ensure that any previous message frame from a particular source address has been completely processed before accepting another message frame from that particular source address; and (c) availability of a buffer for receipt of the message frame.

As an object of the foregoing, the receiving module is protected from being overwhelmed with an excessive flow of message data from the backplane bus. The module may therefore be efficiently produced with a fixed amount of memory, and exercise precise control over allocation thereof without overflow.

Another object of the invention is to reserve some amount of remaining resources for possible receipt of high priority messages. The flow control circuit may include a control block counter to keep track of the number of control blocks which are available for allocation to reception of new complete messages. Each time that a control block is allocated to the receipt of a new complete message, the control block counter is decremented. When the module is forming the determination as to the availability of resources, the count contained in the control block counter is compared to a minimum value which is based on message priority. Higher priority codes correspond to lower minimum values for the control block count, such that the last remaining control blocks can not be used up by lower priority messages, and are thus "reserved" for successively higher priority messages.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 15B is a mapping table for the 4 byte by 4 byte selector circuit which forms a part of the input latch circuit of FIG. 15A;

DESCRIPTION OF THE PREFERRED EMBODIMENT

Figure 1:
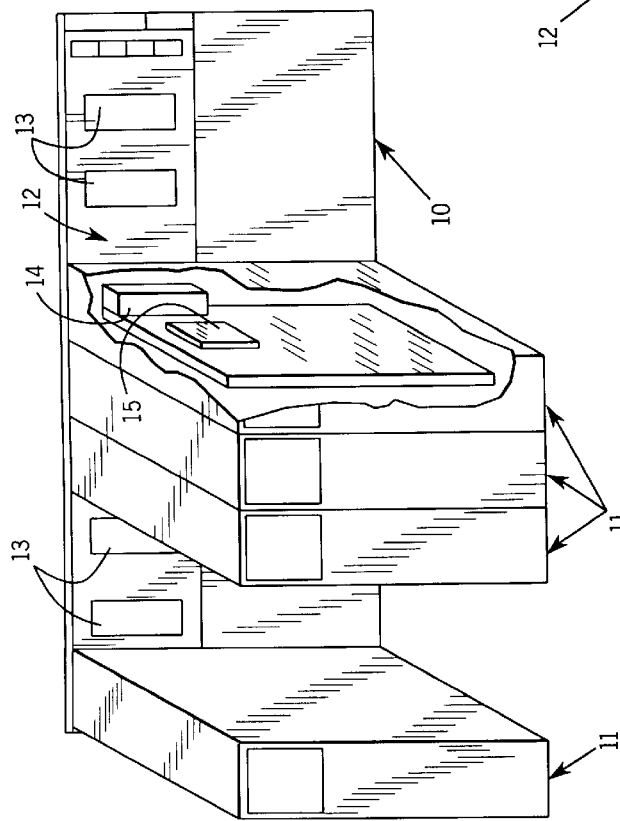
FIG. 1 is a pictorial view with part cut away of a backplane and associated modules which employ the present invention.

Referring particularly to FIG. 1, a backplane 10 physically supports a set of removable modules 11 and provides a bus structure 12 which extends along its entire length. The bus structure 12 is comprised of conductors (not shown) that convey signals between the modules 11 in accordance with a protocol to be described in detail below. The modules 11 are mounted at locations on the backplane 10 referred to as "slots", and each slot has a connector 13 which mates with a connector 14 on the module 11 inserted in the slot. The connectors 13 and 14 provide a removable electrical connection between lines in the bus structure 12 and elements in an interface circuit 15 contained in the module 11. As will be described in detail below, the interface circuits 15 in each module 11 are similar to each other and contain the elements which enable the modules 11 to communicate with each other over the backplane bus 12.

Figure 2:
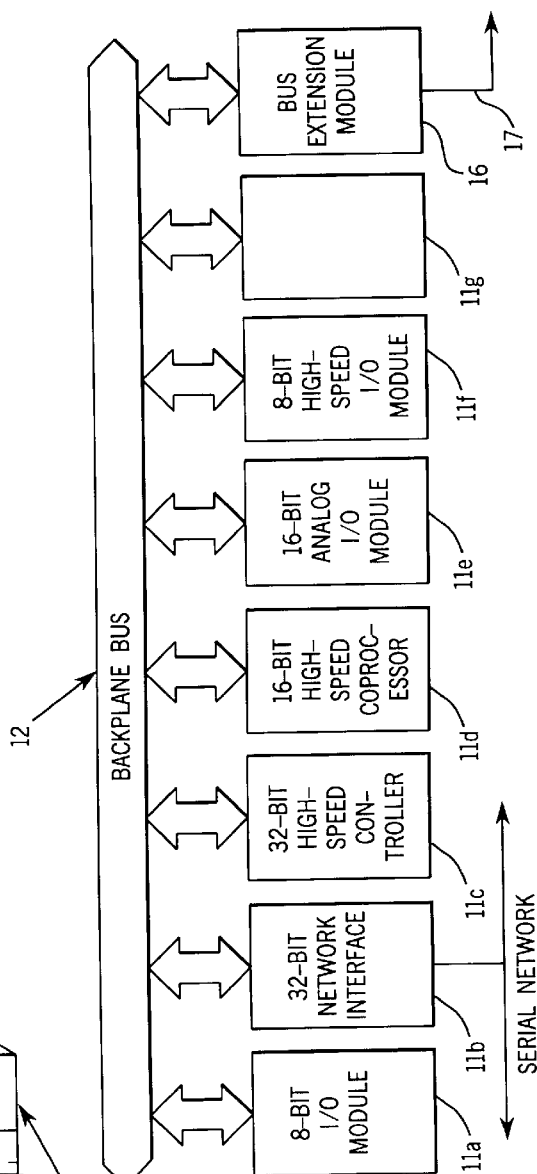
FIG. 2 is an electrical block diagram of the backplane and modules of the present invention.

Referring particularly to FIGS. 1 and 2, while the interface circuits 15 in each module 11 are similar, the remainder of the module 11 may be quite different. Indeed, there are many different modules 11 that can be plugged into the backplane 10 to form an industrial controller or part of an industrial control system. Some of the different types of modules 11a–11g are shown in FIG. 2. Each of the modules 11a–11g includes an interface circuit 15 for communications with the backplane 10, in addition to other circuitry which is unique to each type of module 11 for carrying out the particular function for that module 11. The circuitry for the specific module function is referred to in the following discussions as the "host" circuitry. As such, the "host" circuitry utilizes the interface circuit 15 for backplane communications with other modules 11a–11g. The host circuit may vary greatly between module types, and may include its own microprocessor or other digital processor.

Referring still to FIG. 2, an important feature of the bus structure 12 is that it can accommodate modules 11 that communicate with different word sizes (i.e. 8-bit, 16-bit, and 32-bit) and at different clock rates (i.e. 10 MHz and 20 MHz). For example, a 32-bit high speed controller module 11c may transfer 32-bit words at a 10 MHz clock rate across the backplane bus 12 to a 32-bit network interface module 11b, while transfers to a 16-bit high speed co-processor module 11d may be performed using 16-bit words at a 20 MHz clock rate. Further, an 8-bit I/O module 11a may transfer its data to any other module 11b–11g in 8-bit words at a 10 MHz clock rate. As will be described in more detail below, the bus data transfer protocol enables the modules to automatically communicate at the optimal data bus width and clock rate that is supported by the particular modules 11 which are involved in the transfer.

Still referring to FIGS. 1 and 2, the backplane 10 is available in different lengths to support up to nineteen modules 11. Each module 11 is located at a unique physical location on the backplane 10 referred to as a "slot". The slots are numbered consecutively from left to right, and the connector 13 corresponding to each slot location includes a unique 5-bit slot address code (#32, FIG. 3 below) specifying the slot number. Similarly, the backplane 10 includes a 1-bit "rack_address" line (#31, FIG. 3 below), identifying a rack number code to all of the modules 11 plugged into that particular backplane 10. If the backplane 10 is used alone, its 1-bit rack_address code 31 indicates rack number "zero" to all of its modules 11.

However, the invention also provides for communication between modules 11 distributed over two different racks. In such a dual rack configuration, each of the racks includes a bus extension module 16 installed in one of the nineteen available slots, and the two respective bus extension modules 16 are linked by an extension bus cable 17. The bus extension module 16 selectively permits either (a) autonomous, separate operation of the dual racks, or (b) linked, cross communication between modules on the two respective backplanes 10. For the two rack configuration, one of the racks carries a rack_address code 31 of "zero" on its backplane 10, while the rack_address code 31 on the other backplane 10 is a logical "one". The selection of which rack is the primary, or rack "zero", and which rack is the secondary, or rack "one" may be selected, for example, by manual switches or jumpers on the respective racks.

Using the combined 5-bit slot address 32 and the 1-bit rack_address 31, each module 11 can uniquely identify the slot location and rack where it is physically installed. Thus, the combined 5-bit slot address and 1-bit rack address are collectively referred to herein as a 6-bit geographic address (#30, FIG. 3 below). Each of the modules 11 is able to input its own geographic address 30 by reading the respective slot address 32 and rack_address 31 from the backplane bus 12. As will be described in detail below, the geographic address 30 for a particular module 11 is used in both arbitration for access to the backplane bus 12, and in performing a controlled data transfer when bus access is obtained.

Figure 3:
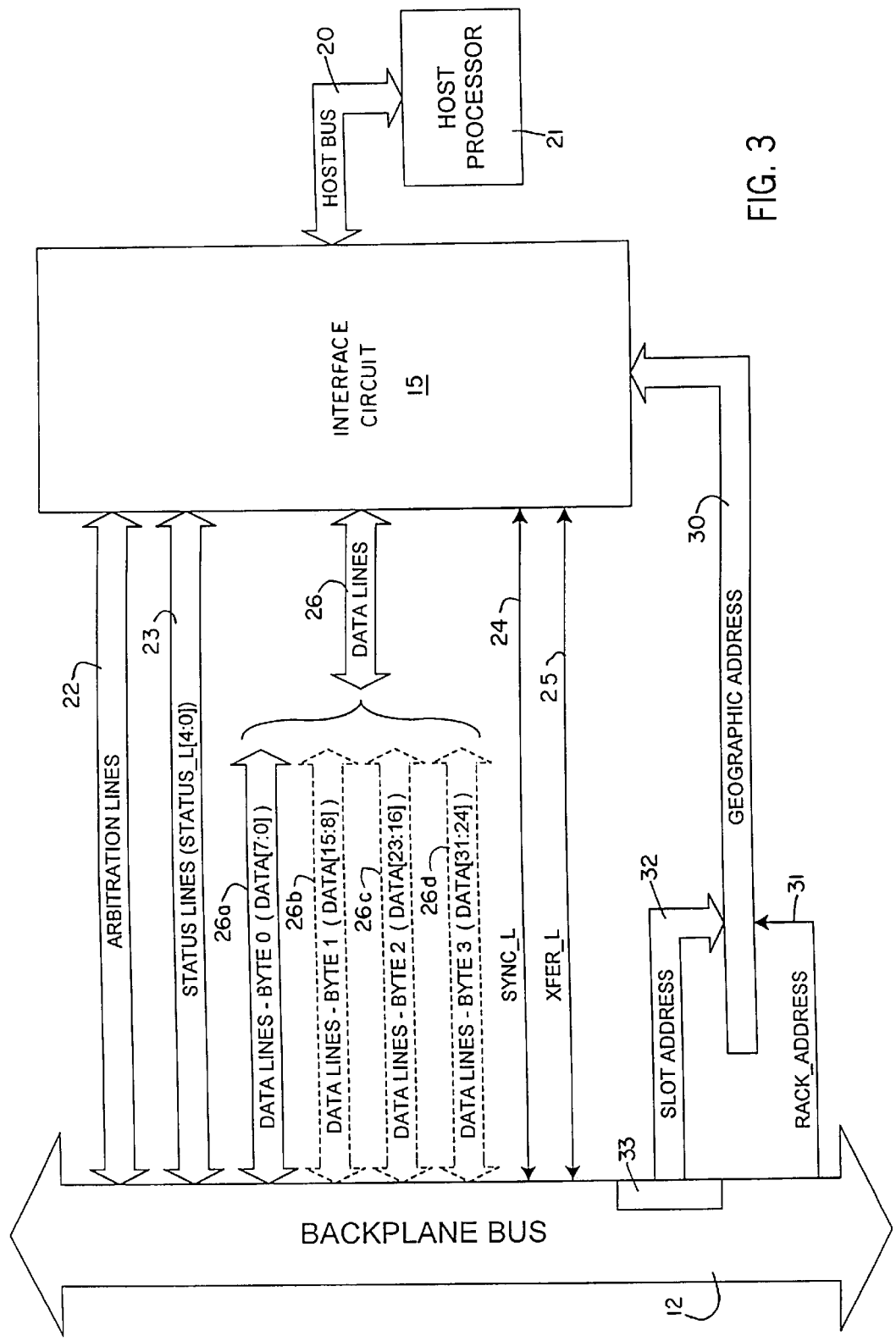
FIG. 3 is a block diagram of the backplane bus interface between the backplane and modules of FIGS. 1 and 2.

Referring particularly to FIG. 3, the interface circuit 15 on each module 11 is a large scale integrated circuit which connects to both the backplane bus 12 and to a local host bus 20. In the following description, the function of the interface circuit 15 will be described in relation to a host processor 21, such as, for example, any known type of microprocessor. It would then be clear to those skilled in the art that the interface circuit 15 may be employed with other equivalent "host" functions, including custom, stand-alone digital processing circuits, and that host and interface functions may in fact be combined and implemented using a single custom or semi-custom integrated circuit. The host bus 20 connects the host processor 21 to the interface circuit 15, and includes the customary address, data, and control lines for reading and writing to "register" style data and control points within the interface circuit 15.

One important aspect of the present invention is to permit the interoperability of modules 11 with different word sizes and transmission speeds on the backplane bus 12. The invention provides this capability while utilizing only a small number of control lines, and requiring wider data line connections only for those modules 11 which are capable of wider, (multi-byte wide) data transfers. Specifically, a set of arbitration lines 22, a set of status lines 23, a SYNC_L line 24 and an XFER_L line 25 are used in all module configurations to support the bus control functions according to the invention. The exact function of these control lines is described in detail below. However, different modules 11 may interface to a variable number of data lines 26, according to needed word size and/or data transfer width for the respective module 11. Preferably, the total number of data lines 26 on the backplane bus 12 are divided into "byte-wide" groups 26a–26d of eight lines each. As shown in FIG. 3, the backplane bus 12 is implemented with 32 data lines 26, divided into four byte-wide groups 26a–26d corresponding to data bytes numbered 0–3, respectively. Note that the backplane bus 12 always includes lines which make the widest data path (i.e. all four data bytes 0–3) available at each slot location. However, each module 11 may include connections within the module 11 for only a subset of the data bytes 0–3, thereby simplifying design and lowering cost to produce the module 11. As shown in FIG. 3, connections for at least one data byte must of course be provided by every module 11 as shown, for example, by a solid outline 26a for data byte 0. The other three data bytes 26b–26d may be optionally connected to the interface circuit 15 within any particular module 11, and are thus shown by a dashed outline for the respective data bytes 1–3. In the discussions which follow, reference is made in general to the data lines 26, where this is understood to be construed as an appropriate subset of data bytes 26a–26d as implemented in any specific module 11.

Still referring to FIG. 3, the interface circuit 15 also inputs the "geographic address" 30 discussed above, formed as the concatenation of the 1-bit rack_address line 31 with the 5-bit slot address 32. As previously stated, the "slot address" 32 is unique at each slot location, and is thus formed by a unique logic connection, represented by box 33, at each slot location. All of the other signals on the backplane bus 12, including the rack_address line 31, are common to each slot location and connected thereto in parallel.

Figure 4:
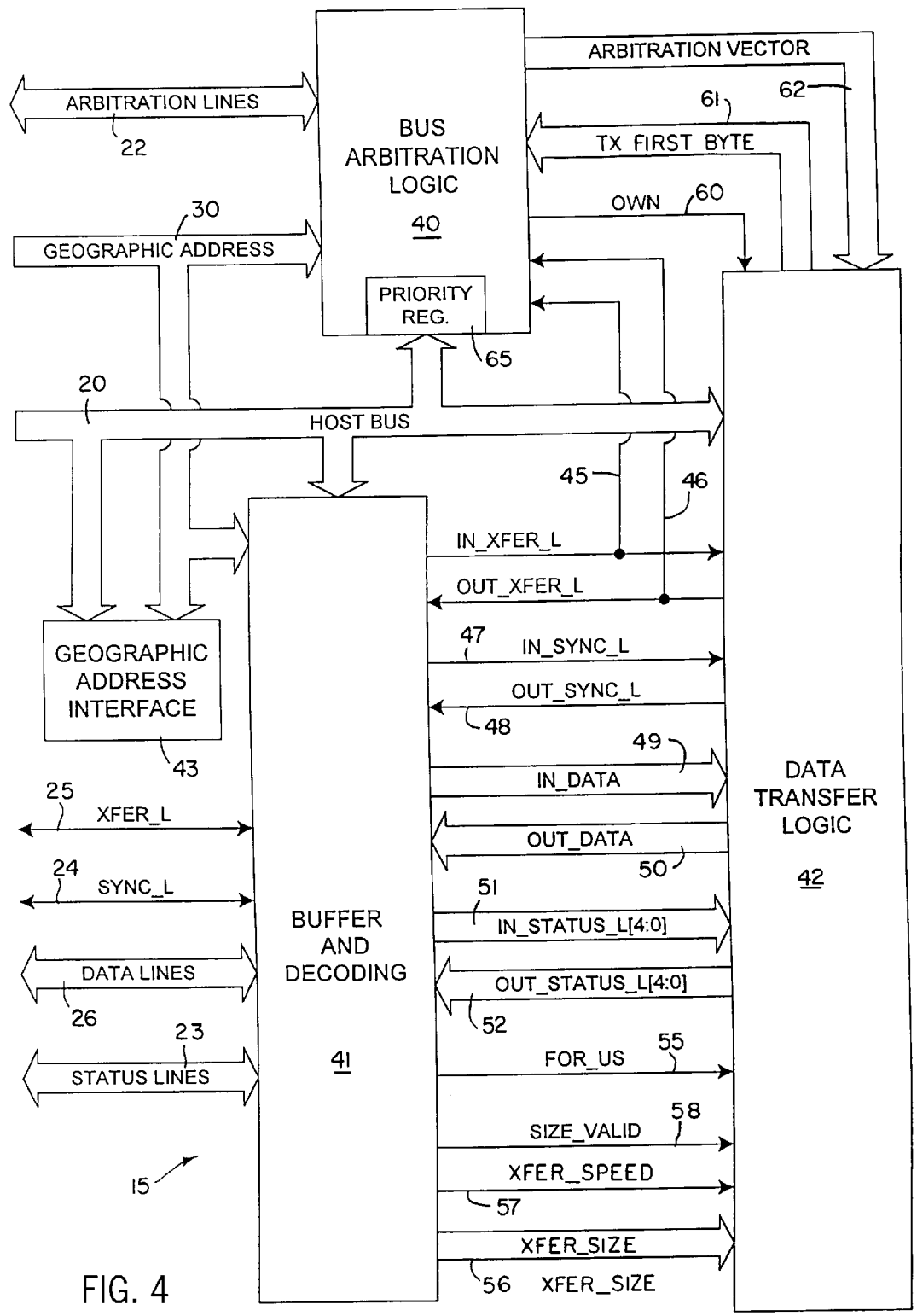
FIG. 4 is an electrical block diagram of an interface circuit which is employed in the backplane bus interface of FIG. 3.

Referring to FIG. 4, the interface circuit 15 performs both a bus arbitration function to resolve contention for mastery of the backplane bus 12, and a data transfer function to perform the actual data transfer, based of course on the arbitration result. The bus arbitration function is performed by a bus arbitration logic circuit 40, while the data transfer function utilizes a buffer and decoding circuit 41, and a data transfer logic circuit 42. A geographic address interface circuit 43 is also preferably included so that the host processor 21 can read the geographic address 30 via the host bus 20.

Still referring to FIG. 4, the buffer and decoding circuit 41 provides bi-directional buffering for the status lines 23, the SYNC_L line 24, the XFER_L line 25, and the data lines 26. These respective lines 23–26 are carried on the backplane bus 12 in an "open-drain" format, such that any individual line may be pulled to a low, or logic "zero" voltage only. Thus, each line is effectively a "wired-or" connection between all drivers on that line, and assumes a high, or logic "one" voltage (for example, by use of a resistive "pull-up") only when not pulled low by any driver. The notation used throughout this description adds a suffix "_L" to signal names in order to indicate a corresponding "active low", or "low true" signal format, as in the signals XFER_L 25 and SYNC_L 24 already mentioned. As described in detail below, the buffer and decoding circuit 41 separates each set of lines 23–26 into corresponding sets of separate input and output lines. The "input" lines then represent the actual logic state of the corresponding wired-or connection on the backplane bus 12, while the "output" lines control open-drain drivers for driving a low logic state onto the corresponding lines on the backplane bus 12. In the descriptions below, a prefix "IN_" is used to denote an input line, whereas a prefix "OUT_" is used for output lines. Specifically, the XFER_L line 25 on the backplane bus 12 is separated into a corresponding input line IN_XFER_L 45, and a corresponding output line OUT_XFER_L 46. Likewise, the SYNC_L line 24 on the backplane bus 12 is separated to lines IN_SYNC_L 47 and OUT_SYNC_L 48, while the data lines 26 separate into corresponding lines IN_DATA 49 and OUT_DATA 50. The set of status lines 23 includes five lines which are referred to individually as STATUS_L[4:0], and these lines are separated into corresponding lines IN_STATUS_L[4:0] 51 and OUT_STATUS_L[4:0] 52. The specific functions of the individual status lines 23, 51 and 52 are an important part of this invention, and are described in detail below.

In addition to providing the above described buffering, the buffer and decoding circuit 41 also produces some initial decoding. The decoding performed is based upon the above described lines 23–26, in addition to the geographic address 30. Specifically, a FOR_US signal 55 is produced by comparing the geographic address 30 to a destination byte appearing on the data lines 26 during the first cycle of a data transfer. The specific circuit for producing the FOR_US signal 55 is described in detail below, but for now it can be noted that the FOR_US signal 55 indicates that this node is included as an addressee of the message frame currently being received. A second decoding function produces a XFER_SIZE bus 56, a XFER_SPEED signal 57, and a SIZE_VALID signal 58. As will be described in complete detail below, a fundamental aspect of this invention is the capability to provide for transfers of different word widths, where the width of each and-every transfer is determined dynamically, and on a transfer-by-transfer basis. The preferred embodiment described herein provides this capability by utilizing the status lines 23 to conduct a negotiation process at the beginning of each message frame. The result of the negotiation process results in an agreement between all of the modules 11 participating in the transfer as to both (a) the size, or width, of the transfer, and (b) the clock speed at which the transfer is to be performed. These two quantities are latched at the conclusion of the negotiation process as the XFER_SIZE 56 and the XFER_SPEED 57, respectively. The SIZE_VALID signal 58 becomes TRUE upon completion of the negotiation process, and thus indicates that the values on the XFER_SIZE 56 bus and the XFER_SPEED 57 line have been latched and are valid.

The data transfer logic circuit 42 carries out several important aspects of the invention, and is described in detail later. The lines 45–52 and 55–58 from the buffer and decoding circuit 41 are connected to the data transfer logic circuit 42 for carrying out the data transfer operations. As a further novel aspect of the invention, the data transfer logic circuit 42 also operates in conjunction with the bus arbitration logic circuit 40 in order to originate, or transmit, a message frame onto the backplane bus 12. As previously stated, only one module 11 at a time is the "master" or transmitter, on the backplane bus 12. The bus arbitration logic circuit 40 determines which module 11 obtains mastership, or permission to transmit, and coordinates this arbitration result with the data transfer logic circuit 42 utilizing an OWN signal 60, an TX FIFO FIRST BYTE bus 61, and an ARBITRATION VECTOR bus 62. While the detailed operation of these signals 60–62 is developed in full below, the basic operation involved in a transmission sequence is as follows.

As the first step in the transmission sequence, the host processor 21 loads data forming a complete message frame into the data transfer logic circuit 42 via the host bus 20. The data transfer logic circuit 42 maintains the message frame in a transmit First In, First out, or FIFO memory. After the message frame has been loaded, the host processor 21 then writes a priority value into a priority register 65 which forms a part of the bus arbitration logic circuit 40. The act of writing into the priority register 65 triggers the bus arbitration logic circuit 40 to enter the arbitration for bus access. The bus arbitration logic circuit 40 also receives an indication of the message destination, contained as the first byte of the message frame, on the TX FIRST BYTE bus 61. The message destination value obtained from the TX FIFO FIRST BYTE bus 61 is used in conjunction with the geographic address 30 to determine whether the arbitration is to be performed locally (e.g. constrained to the local rack), or whether the destination requires joint arbitration between the local rack and another remote rack. One special line called REMOTE_L 83 (described below in relation to FIG. 7A) within the set of arbitration lines 22 is used to indicate when joint arbitration between racks is required. In either case, the bus arbitration logic circuit 40 circuit continues to participate in the arbitration until it obtains bus mastery for the next data transfer cycle. The bus arbitration logic circuit 40 indicates possession of bus mastery by activating the OWN signal 60, thereby informing the data transfer logic circuit 42 that it will be the next to transmit.

One other important function of the bus arbitration logic circuit 40 is the capture of the arbitration vector 62 during every arbitration cycle. As will be seen from the descriptions below, the arbitration vector 62 contains information which specifies both.(a) the identity, i.e. geographic address 30, of the module 11 which "won" the next bus mastership, as well as (b) the priority of the message frame which the winning module will transmit next. There are two important aspects of this arbitration vector capture. Firstly, the arbitration vector 62 is simultaneously captured by all modules 11 in the system, including modules 11 which did not win the arbitration, and further including modules 11 which did not even participate in the arbitration. Secondly, and as a result of the simultaneous capture of the arbitration vector 62 by all modules 11, the source address of the next module 11 to transmit, as well as the priority of the message frame that will be transmitted, are known apriori by all modules 11 in the system. Therefore, the corresponding information as to the message source and message priority does not need to be included in the message itself, thus reducing message size and increasing bus utilization. Instead, each module 11 which is addressed as a recipient of a message frame extracts the source identity and message priority from the arbitration vector 62 which has been captured, and delivers this information to the host processor 21 along with the remainder of the message. Modules 11 which are not addressed by a particular message discard the current arbitration vector 62 for that message.

Figure 5:
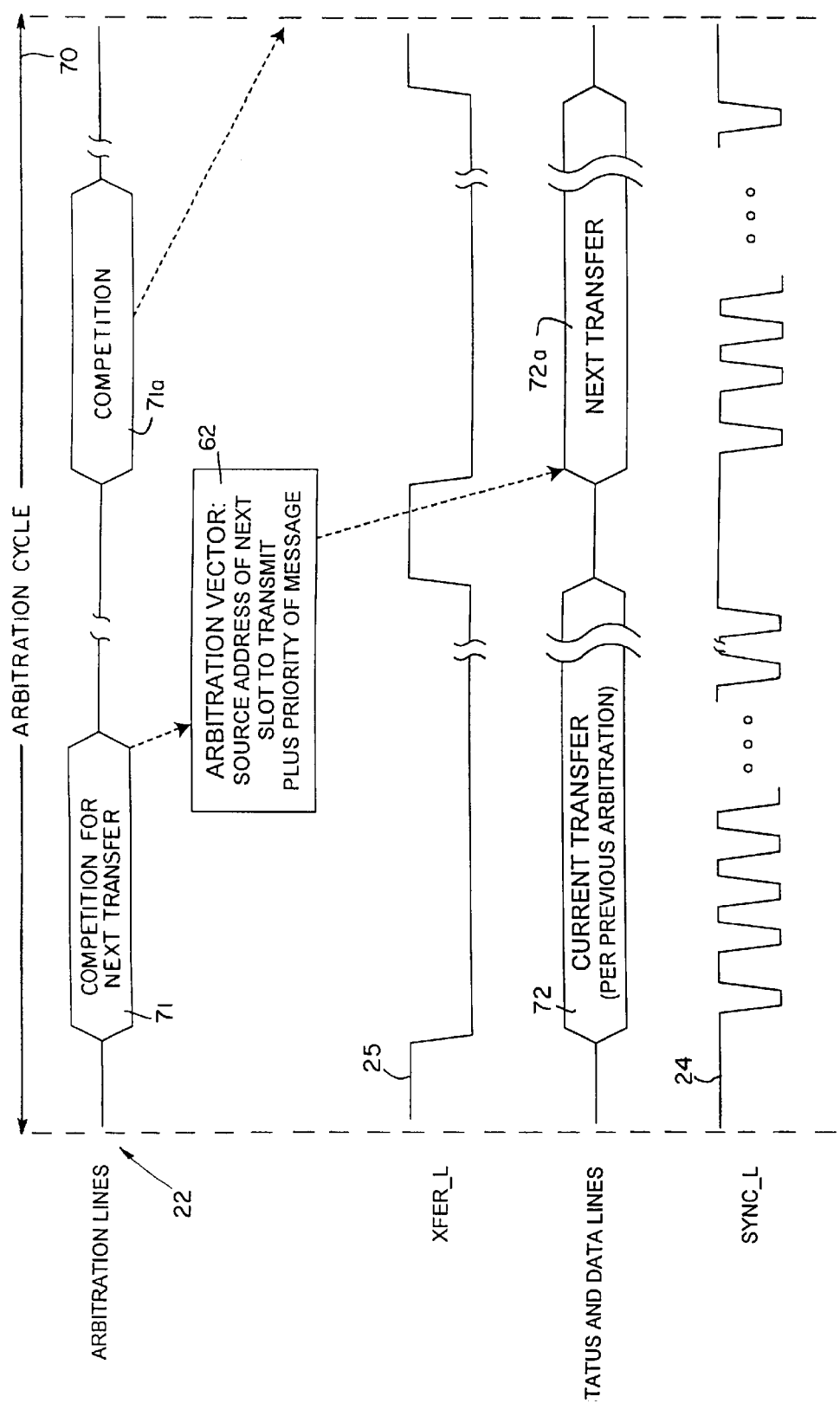
FIG. 5 is a simplified bus timing diagram for bus arbitration and for data transfers on the backplane bus which are performed by the interface circuit of FIG. 4.

Referring to FIG. 5, another aspect of this invention is that the arbitration process and the data transfer process are conducted using separate lines on the backplane bus 12, and are thus capable of being performed in parallel. Specifically, data transfers are performed utilizing the XFER_L line 25, the SYNC_L line 24, and the combined status lines 23 and data lines 26. The XFER_L line 25 is active (low level) to indicate that a data transfer is in progress, while the SYNC_L line 24 is used as a clocking signal for individual words in the data transfer. The SYNC_L line 24 is actually used in conjunction with the status lines 23 in a novel manner according to the invention, although the complete description of that operation is deferred to the later sections of this description.

Still referring to FIG. 5, an arbitration cycle 70 is initiated when one or more modules on the backplane bus 12 enter contention for bus mastership. The arbitration cycle 70 is defined as a sequence of separate competitions 71, with each competition 71 determining a single "winning" module 11, e.g. the module 11 which is granted the next bus mastership. The arbitration cycle 70 itself is defined in a manner which insures fair bus access, as explained later. The competitions 71 proceed separately, and in parallel with, any data transfers which may also be in progress, as represented by a current data transfer block 72. Since a data transfer 72 may already be ongoing, the competition 71 is actually determining the following, or "next" module 11 to receive transmit permission (i.e. bus mastership), with the understanding that the currently transmitting module 11 retains current bus mastership until it is finished transmitting.

Upon determining a "winner" of the competition 71, the information as to (1) the geographic address 30 (i.e. rack and slot number) of the winning module 11, and (2) the priority of the message the winning module 11 will transmit next has been obtained from the arbitration lines 22, and latched within the bus arbitration logic circuit 40 of every module 11 on the backplane bus 12. The winning geographic address 30 and message priority are then provided in the form of the arbitration vector 62 to the data transfer logic circuit 42. When the ongoing data transfer 72 (if any) is concluded, the following data transfer 72a is performed according to the arbitration vector 62, which is available in an identical form in each module 11.

Still referring to FIG. 5, the winning module 11 of the competition 71 will of course initiate the transmission 72a, while the remainder of the modules 11 will begin decoding the transmission 72a to determine if each such respective module 11 is an addressee of the transmission 72a. If a module 11 finds that it is indeed addressed by the transmission 72a, then the arbitration vector 62 is retained along with the message transmitted. By storing the arbitration vector 62 along with the message data, the receiving host processor 21 obtains both the source address of the message originator and the message priority, even though this information was not transmitted during the data transfer 72a.

The above overlapping arbitration and data transmission may continue indefinitely, with a subsequent competition 71a being commenced in parallel with the previously arbitrated data transfer 72a. If none of the modules 11 has data to transmit, the arbitration lines 22 may alternatively be idle, until such time as one or more modules 11 begin a new arbitration cycle 70. Although the detailed description is presented later, the arbitration cycle 70 also includes a fairness mechanism to insure that all modules 11 eventually receive bus access, and other mechanisms are provided to coordinate arbitration between two separate racks, having separate backplanes 10.

Figure 7A:
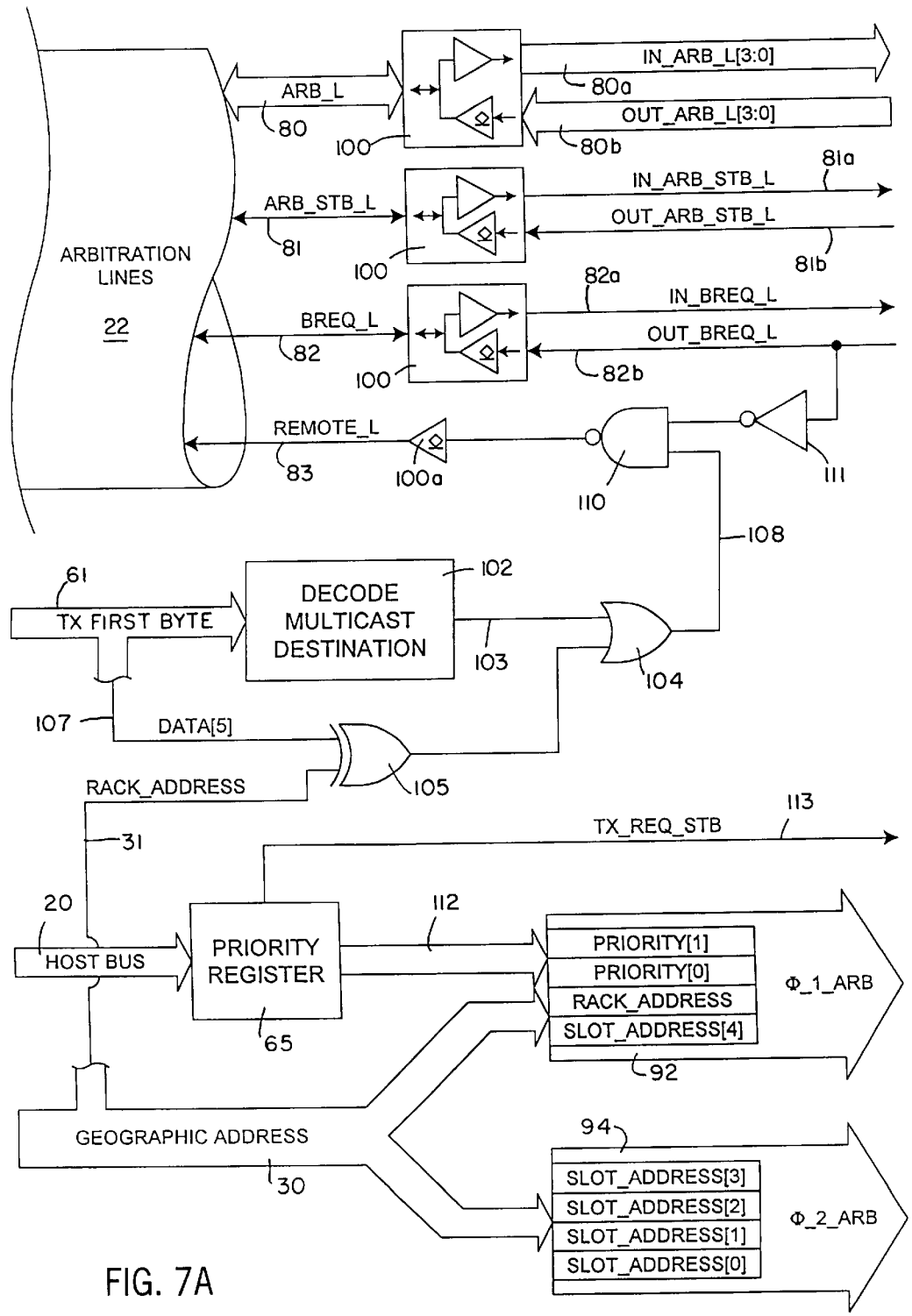
FIGS. 7A, 7B and 7C are circuit diagrams of the bus arbitration logic which forms part of the interface circuit of FIG. 4.

Referring briefly to FIG. 7A, the arbitration lines 22 are shown to include a bus labeled ARB_L 80, and individual lines ARB_STB_L 81, BREQ_L 82, and REMOTE_L 83. The ARB_L 80 bus includes four lines which alternately carry two separate arbitration "weights" during respective alternate phases within each competition 71. The two phases of the competition 71, designated as $\Phi_1$ and $\Phi_2$, as well as the overall competition 71 itself, will be described in complete detail below. The ARB_STB_L 81 line (active low) is a "strobe" signal, used as a coordinating clock during the competition 71, and in effect defines the phases $\Phi_1$ and $\Phi_2$ of the competition 71. The BREQ_L signal 82 (active low) is used to indicate a "bus request", e.g. a request for bus mastership. The REMOTE_L line 83 is used to indicate a need for a joint arbitration with a possible second, or "remote" rack. The detailed description of these signals 80–83, and the remainder of the bus arbitration logic circuit 40, will be returned to later, after the following general overview of the arbitration process and timing.

Figure 6:
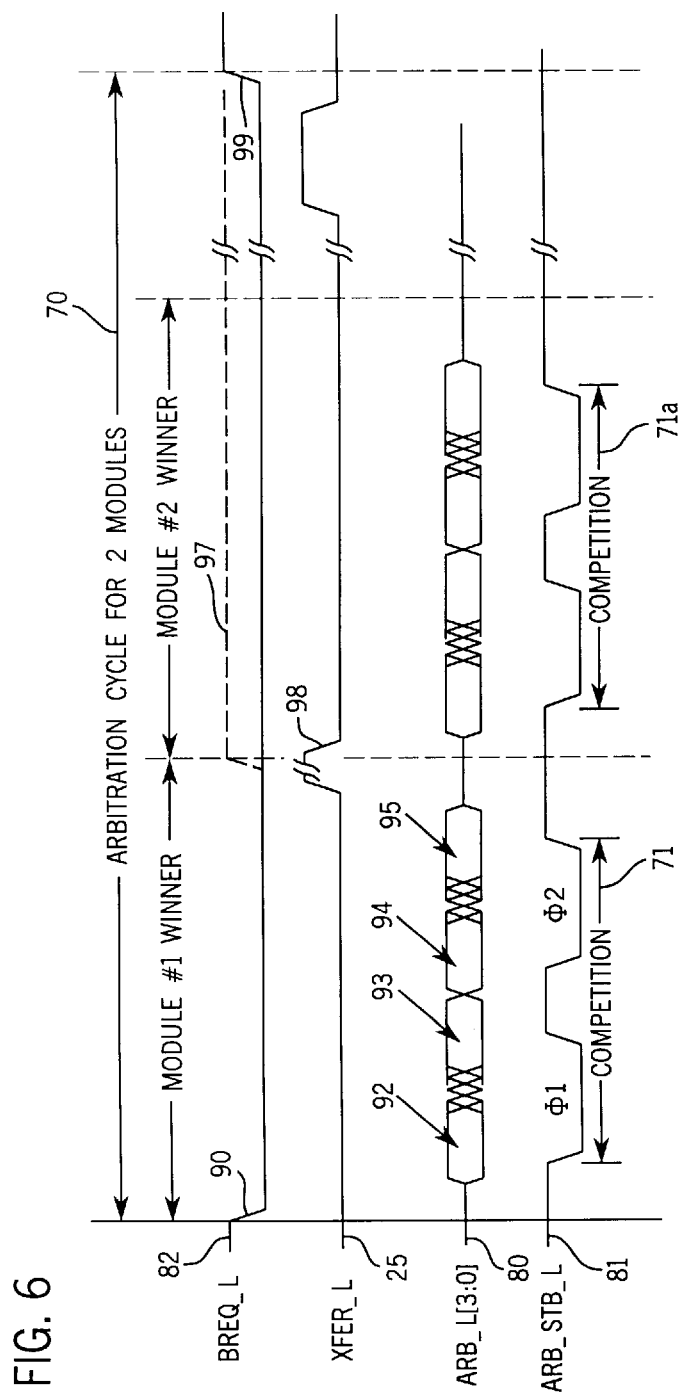
FIG. 6 is a timing diagram of the bus arbitration used in the interface circuit of FIG. 4.

Referring now to FIGS. 6 and 7A, the arbitration cycle 70 is defined by the active low condition of the BREQ_L line 82, and may include one or more separate repetitions of the above described competition 71. The arbitration cycle 70 begins when one or more modules 11 assert the BREQ_L line 82 (low logic level), as shown by the falling edge 90 of the BREQ_L line 82 (i.e., high to low logic level transition). The BREQ_L line 82 is an open drain, wired-or connection among all the modules 11, such that the BREQ_L line 82 will be pulled low, and remain low, whenever any module 11 on the backplane 10 is asserting it. Therefore, a module 11 enters, and participates in the arbitration cycle 70 by asserting its own BREQ_L line 82, while the overall arbitration cycle 70 continues as long as any connected module 11 is asserting the BREQ_L line 82.

Upon initiating the arbitration cycle 70, the modules 11 which are contending for bus mastership begin a series of one or more individual competitions 71. During each competition 71, a single "winning" module 11 is determined by mutual consent among the modules 11 participating in the competition 71 in a manner described in detail below. The winning module 11 for each competition 71 will then be the next module 11 to assume bus mastership. In order to assure fair bus access, the invention also requires that once a module 11 has "won" a competition 71, that winning module 11 will not be permitted to participate in any more competitions 71 until the current arbitration cycle 70 has been completed. Thus, any single arbitration cycle 70 would normally include a number of competitions 71 at most equal to the number of modules 11 in the system. For example, if a given system includes N modules 11, all of which are contending for bus mastership during the same arbitration cycle 70, then the arbitration cycle 70 would include N competitions 71. of course, an arbitration cycle 70 in the above example may have fewer than N competitions 71 if less than all of the connected modules 11 are simultaneously contending for bus mastership, and may in fact include only a single competition 71 if only a single module 11 is currently contending for bus mastership.

The invention also contemplates that a module 11 may include auxiliary, special purpose circuits which may separately participate in the arbitration cycle 70. For example, one of the modules 11 may be designated as a master timer module, in which a timer circuit (not shown) may periodically enter the arbitration process to send a special purpose "timer" broadcast message. In that case, the timer circuit acts autonomously from the host module message circuits, and the arbitration cycle 70 might therefore have a few more competitions 71 than the number of modules 11, in the worst case.

As the overall arbitration cycle 70 progresses, exactly one module 11 drops out (i.e. the winning module 11) for each successive competition 71. Other modules 11 may newly enter the arbitration cycle 70 already in progress, and participate in successive competitions 71 until winning. The number of modules 11 which are participating in the competitions 71 may therefore fluctuate, with the winning module 11 dropping out, and new modules 11 entering. The overall arbitration cycle 70 proceeds in that manner until there are no more modules 11 asserting the BREQ_L line 82, meaning that every module 11 has either (a) already won a competition 71 during the current arbitration cycle 70, or (b) does not currently require bus mastership, and has therefore never entered the arbitration cycle 70. This guarantees that any module 11 which requires bus mastership will eventually "win" one of the competitions 71, and can not be locked out of the arbitration cycle 70 by another module 11 repeatedly winning competitions 71.

Since the BREQ_L line 82 is a common, open drain line connected to all modules 11, a high logic state on the BREQ_L line 82 indicates that none of the modules 11 are currently asserting the BREQ_L line 82. A high logic state on the BREQ_L line 82 therefore indicates the end of the arbitration cycle 70, as shown by rising edge 99. Each module 11 monitors the BREQ_L line 82, and upon detecting a high logic state, considers the previous arbitration cycle 70 to be ended, and is then free again to enter into competitions 71 of a new arbitration cycle 70 by again asserting the BREQ_L line 82.

Referring now to FIG. 6, a specific example in which two modules are contending for bus mastership is shown. The resulting arbitration cycle 70 consequently includes the two competitions 71 and 71a. During the first phase, $\Phi_1$, of the competition 71, each module 11 participating in the competition 71 places a "phase one" weight code 92 on the ARB_L lines 80. The four bits which make up the phase one weight code 92 are derived from the module' geographic address 30 and the priority of the module' message as described in detail below. The asserted phase one weights 92 from each participating module 11 are used in a novel manner according to the invention, as described below, to determine the "winner" of the $\Phi_1$ phase of the competition 71 (numerically highest weight wins). Concurrently with asserting the phase one weight code 92, each participating module 11 drives the open drain ARB_STB_L line 81 low initiating phase one of the competition 71. All modules 11 involved in the competition 71 examine the ARB_L[3:0] lines 80 and determine the highest weight 92 being asserted. Specifically, as each participating module 11 determines that its own phase one weight 92 is less than the aggregate, or "wired-or" phase one weight 92 appearing on the ARB_L[3:0] lines 80, then that module 11 drops out of the competition 71 which it has lost, and releases the ARB_L[3:0]

lines 80. Alternatively, when one or more modules 11 determine that their own phase one weight 92 is the highest weight being asserted on the ARB_L[3:0] lines 80, then these modules consider themselves to have won the first phase of the competition 71. After a period of time to allow the ARB_L[3:0] lines 80 to settle to the winning value, each module 11 releases the ARB_STB_L line 81. Note that several different modules 11 may have an identical phase one weight 92, and thus all be "winners" of phase one. A subsequent phase two will then determine a single, ultimate winner for the complete competition 71. When all participating modules 11 have reached a conclusion during the $\Phi_1$ phase (i.e., drop out or "win"), all of the modules 11 release the ARB_STB_L line 81, which then goes high signaling the end of the first phase $\Phi_1$. At the end of phase $\Phi_1$, a final, or "winning" phase one weight code 93 appears on the ARB_L[3:0] lines 80. Modules 11 which have determined that their own phase one weight is less that the winning phase one weight 93 then consider themselves to be "losers" of phase $\Phi_1$. The losing modules 11 of phase $\Phi_1$ will continue to assert the BREQ_L line 82 so as to remain in the overall arbitration cycle 70, but they will not participate in phase two, or $\Phi_2$, of the competition 71.

Every module 11 installed on the backplane bus 12, including modules 11 which "lost" phase $\Phi_1$, and even modules 11 not participating in the arbitration cycle 70, have access to the winning phase one weight 93 appearing on the ARB_L[3:0] bus 80, and all of these modules 11 simultaneously latch the winning phase one weight 93 at the conclusion of phase $\Phi_1$ (i.e., the first rising edge of the ARB_STB_L signal 81) The latched phase one weight 93 is thus saved for later inclusion into their respective arbitration vectors 62.

Phase two ($\Phi_2$) of the competition 71 begins with each winning module 11 from phase $\Phi_1$ reasserting the ARB_STB_L line 81 and applying a second, or phase two weight code 94 onto the ARB_L[3:0] lines 80. As in phase $\Phi_1$, each module 11 still participating in the competition 71 determines if it has won the second phase by comparing its own phase two weight code 94 with the aggregate, or "wired-or" phase two weight 94 appearing on the ARB_L[3:0] lines 80. Each module 11 then releases the ARB_STB_L line 81 after again waiting a period of time to allow the ARB_L[3:0] lines 80 to settle. After the last module 11 finally releases the ARB_STB_L line 81 line, a final phase two weight code 95, corresponding to the phase two weight code 94 of the winning module 11, appears on the ARB_L[3:0] lines 80 and is latched by all modules 11 in the system.

Together, the latched values for the final phase one weight code 93 and the final phase two weight code 95 form the arbitration vector 62, which in turn identifies the geographic address of the winning module 11 and the message priority of the next message to be transmitted. Each module 11 examines this final result, and determines if the winning geographic address is equal to its own geographic address, in which case the module 11 latches its "winning" status and activates the OWN signal 60.

Referring momentarily to FIGS. 4 and 6, activation of the OWN line 60 by the bus arbitration logic circuit 40 in the winning module 11 signals the module'data transfer logic circuit 42 that it may commence transmission as soon as the currently ongoing transmission (if any) has ended. The end of an ongoing transmission, or indeed the lack of an ongoing transmission, is determined by monitoring the XFER_L line 25. If the XFER_L line 25 is asserted (low logic level), then an ongoing transmission is in progress, and the winning module 11 waits until the XFER_L line 25 is released before commencing the next transmission. Alternatively, if the XFER_L line 25 is found to be already in a released condition (high logic level), then the transmission lines 23–26 are idle and the next transmission can be commenced without delay. In either case, the data transfer logic circuit 42 of the winning module 11 waits until the XFER_L line 25 goes high, and then commences transmission by applying its own assertion (logic low) to the XFER_L line 25 (via the OUT_XFER_L line 46).

Referring again to FIG. 6, the above described release of the XFER_L line 25, and subsequent re-assertion thereof, indicates that a prior transmission has ended, and a new transmission has begun. Upon detecting this condition, the bus arbitration logic circuits 40 in each module 11 are triggered to begin another competition, such as shown by competition 71a. However, the beginning of the new transmission also forces the winning module 11, e.g. the module 11 which is now transmitting, to release its BREQ_L line 82. The release of the BREQ_L line 82 by the winning module 11 is shown by dashed line 97, since the BREQ_L line 82 itself may remain low by virtue of being asserted by other modules 11 remaining in the arbitration cycle 70.

If the BREQ_L line remains low, even after being released by the winning module 11, then other modules 11 are still awaiting bus access, and the arbitration cycle is continued by performing another competition 71a. The new competition 71a starts when the module(s) remaining in the arbitration cycle. 70 observe the falling edge 98 of the XFER_L line 25, i.e. the beginning of the new data transmission. In that manner, the competitions 71 are maintained in synchronization with the data transmission, such that the same may be conducted in parallel, with each competition determining the next module 11 to transmit.

Subsequent competitions 71 are repeated until all modules 11 asserting the BREQ_L line 82 have won access to the backplane bus 12. Once all modules 11 requesting access have obtained the same, the BREQ_L line 82 is released (rising edge 99), signaling the end of the arbitration cycle 70. When the BREQ_L line 82 thus assumes the released condition (high logic state), modules 11 which had gained access to the backplane bus 12 during the previous arbitration cycle 70, and were thus locked out of further participation in that arbitration cycle 70, are now free to re-assert the BREQ_L line 82 if and when a further bus access is desired. Of course, re-assertion of the BREQ_L line 82 by one or more modules 11 begins a new arbitration cycle 70, and the above described process is repeated.

The detailed structure and operation of the bus arbitration logic 40 will now be described with reference to FIGS. 7A–7C.

Referring particularly to FIG. 7A, the arbitration lines 80–82 are buffered through receiver/driver circuits 100, which break out each respective bi-directional lines 80–82 into separate inputs and outputs. Specifically, each separate line in the ARB_L bus 80 is connected though an input buffer in the receiver/driver circuit 100 to respective lines in an IN_ARB_L[3:0] bus 80a. Note that the notation used for the IN_ARB_L[3:0] bus 80a indicates a four line bus, where each separate line, or range of lines, may be referred to by a single number, or a range of numbers, within the square brackets, respectively. For output to the ARB_L bus 80, the receiver/driver circuit 100 includes an open drain driver for each separate line, with the inputs of the open drain drivers being connected to respective lines from an OUT_ARB_L[3:0] bus 80b. In a similar manner, the ARB_STB_L line 81 is broken out to a corresponding input line IN_ARB_STB_L 81a and an output line OUT_ARB_STB_L 81b, while the BREQ_L line 82 corresponds to input line IN_BREQ_L 82a and output line OUT_BREQ_L 82b. Since the REMOTE_L line 83 is an output only line as far as the modules 11 are concerned (reception is performed by the extension module 17, if any), only an open drain driver 100a is required.

Still referring to FIG. 7A, the decoding for detecting a "remote" transmission request is now described. The TX_FIRST_BYTE bus 61 is connected to a decoding circuit 102. In the message format used in the present invention, which is described in greater detail below, the contents of the first byte that will be transmitted specifies the destination address for the message, and this "first" byte is available on the TX_FIRST_BYTE bus 61 prior to beginning the transmission. Certain address codes are reserved for "multicast", or multiple destination broadcast messages. Since the exact location, or address, of the multiple destinations is not maintained by the modules 11, it may be possible that at least some destinations of a multicast message reside on a remote rack, if included in the system. For that reason, all multicast messages are considered to address a remote destination. The decoding circuit 102 checks for a multicast address code appearing on the TX_FIRST_BYTE bus 61. If the destination is indeed multicast, the decoding circuit 102 activates an output line 103, which is connected to one input of an OR gate 104.

The other input of OR gate 104 is connected to the output of an exclusive OR (equivalence) gate 105. The inputs of the exclusive OR gate 105 are connected to; (1) a line DATA[5] 107 from the TX_FIRST_BYTE bus 61, and (2) the RACK_ADDRESS line 31 from the geographic address bus 30. In the format of the invention (described below), the DATA[5] line 107 from the TX_FIRST_BYTE bus 61 contains the "rack address" portion of the destination address, while the RACK_ADDRESS line 31 represents the module'own rack address. If these two rack addresses are the same, then the destination is on the same rack (not "remote"), and the output of exclusive OR gate 105 is false (logic low). However, if the DATA[5] line 107 and RACK_ADDRESS line 31 are different, then a remote transmission is indicated, and the output of exclusive OR gate 105 is true (logic high).

The separate inputs from the decoding circuit 102 and the exclusive OR gate 105 are combined in OR gate 104, the output of which on line 108 is true when a remote transmission is required. The output 108 of OR gate 104 is connected as one input of a NAND gate 110. The other input of NAND gate 110 is connected to the OUT_BREQ_L signal 82b through an inverter 111. The NAND gate 108 thus propagates the remote indication on line 83 only when the module 11 is actually contending for bus access, as indicated by a low logic level (asserted) on the OUT_BREQ_L line 82b. When the OUT_BREQ_L signal 82b is asserted (logic low), and if a remote destination is indicated (line 108 high), then the output of NAND gate 110 is low, which forces assertion of the REMOTE_L line 83 through the open drain driver 100a. A further discussion is presented below as to the use of the REMOTE_L signal 83 by the extension module 17 in coordinating transfers between separate racks.

Again referring to FIG. 7A, the host processor 21 initiates a transmission by writing a priority value for the message to be transmitted into the priority register 65. The latched priority value is provided on an output bus 112 from the priority register 65. The act of writing to the priority register 65 by the host 21 also causes the priority register 65 to generate a strobe pulse on a TX_REQ_STB line 113. The TX_REQ_STB line 113 is used by other circuits described below in relation to FIG. 7B for initiating participation in the arbitration cycle 70. Thus, the act of writing to the priority register 65 triggers either entry into an ongoing arbitration cycle 70, or initiation of a new arbitration cycle 70.

Once more referring to FIG. 7A, the above described arbitration process referred to "weight codes" 92 and 94 which were used in resolving the arbitration. In the following detailed description, these weight codes 92 and 94 are equivalently referred to as busses $\Phi\_1\_ARB$ and $\Phi\_2\_ARB$, respectively, which contain the signal lines defining the respective $\Phi_1$ and $\Phi_2$ weight codes. Specifically, the most significant bits (i.e. highest priority) of the phase one weight code bus $\Phi\_1\_ARB$ 92 are connected to the two bit latched priority value on bus 112 from the priority register 65. The two low order bits of the phase one weight code bus $\Phi\_1\_ARB$ 92 are connected to the two highest order bits of the geographic address 30, namely the RACK_ADDRESS line 31 and the high order slot address bit, SLOT_ADDRESS[4]. The phase two weight code bus $\Phi\_2\_ARB$ 94 is connected to the remaining, low order bits of the geographic address 30, namely SLOT_ADDRESS[3:0]. The exact use of these two weight code busses 92 and 94 is described later in relation to FIG. 7C.

Figure 7B:
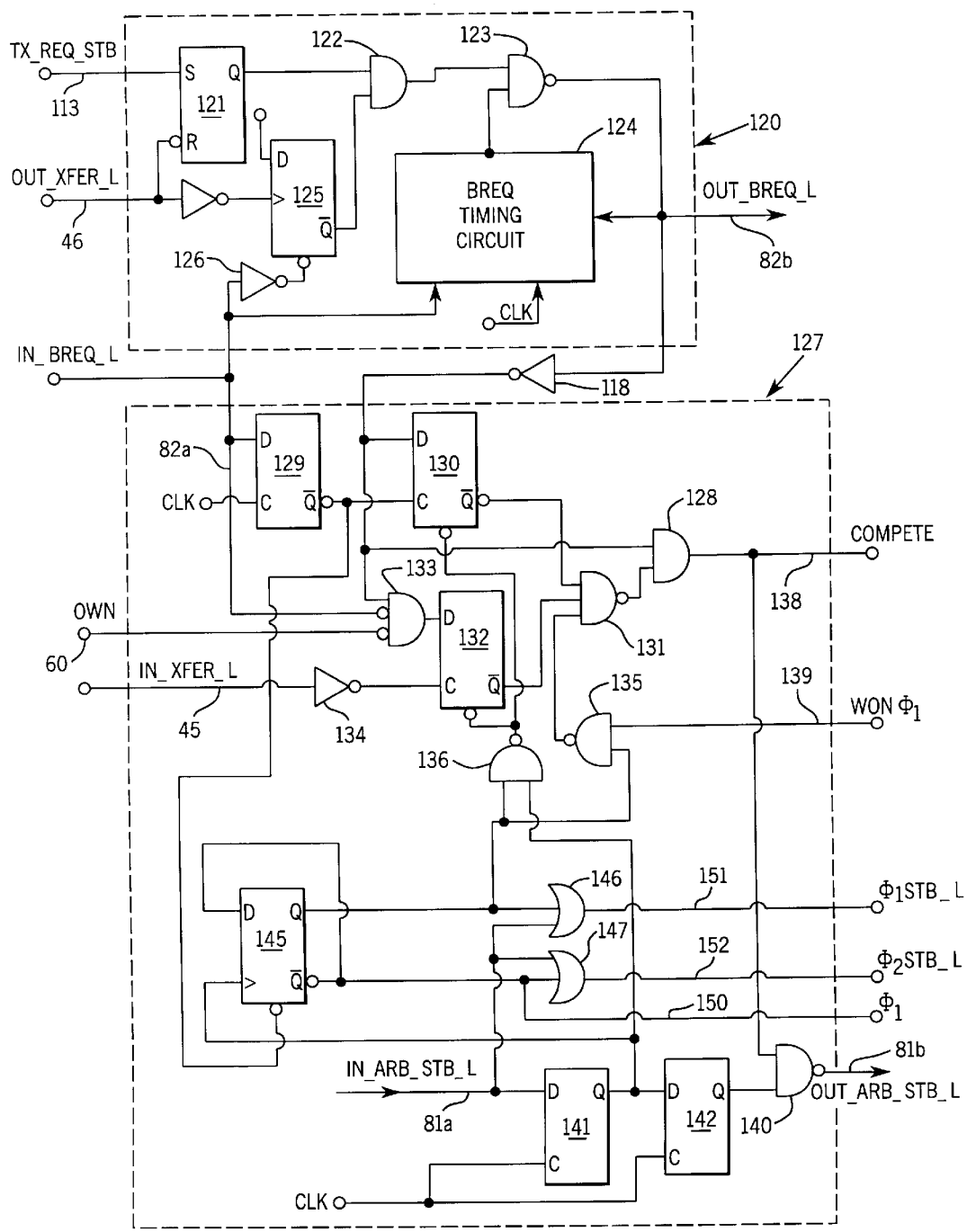

Referring to FIG. 7B, an arbitration enable circuit 120 is used to generate the OUT_BREQ_L signal 82b. The strobe pulse on the TX_REQ_STB line 113 initiates participation in an arbitration cycle 70 by setting a flip-flop 121 within the bus request enable circuit 120. The Q output of the flip-flop 121 holds the request and applies it through an AND gate 122 and a NAND gate 123 to the OUT_BREQ_L line 82b. The other input on NAND gate 123 is driven by a BREQ timing circuit 124, which disables the NAND gate 123 unless either of two limiting conditions holds. The two limiting conditions are that either (1) the IN BREQ_L line 82a is already asserted by another module 11, or (2) the IN_BREQ_L line 82a has been at a logic high, unasserted state for at least two clock pulses. This delay insures that all modules 11 in the system have ample opportunity to recognize the beginning of a new arbitration cycle 70. The assertion of the OUT_BREQ_L line 82b by NAND gate 123 in turn asserts the BREQ_L line 82 on the backplane bus 12 through the open drain buffer 100, and also enables activation of the REMOTE_L signal 83, both of which have been described above in relation to FIG. 7A.

The flip-flop 121 which holds the bus request status is reset when the module 11 has been granted bus mastership and commences transmission. This condition is indicated by activation of the OUT_XFER_L line 46 by the data transfer logic circuit 42. Specifically, the OUT_XFER_L line 46 is connected to a reset input R on the flip-flop 121. When the OUT_XFER_L line 46 is asserted (logic low), flip-flop 121 resets, and the OUT_BREQ_L line 82b is released. The OUT_XFER_L line 46 is also inverted, and connected to the clock input of a lockout flip-flop 125. Once the lockout flip-flop 125 is set, due to the obtaining of bus access by the module 11, the inverted output $\overline{Q}$ of flip-flop 125 disables AND gate 122, and the OUT_BREQ_L signal 82b is forced to the unasserted (logic high) state. In that condition, the module 11 cannot participate in the current arbitration cycle 70, which lasts until the BREQ_L line 82 is released by all other arbitrating modules 11. In order to reset the lockout flip-flop 125 at the end of the current arbitration cycle 70, the IN_BREQ_L signal 82a is connected through an inverter 126 to a reset input on flip-flop 125. Then, when the BREQ_L line 82 is released by all modules 11, the IN_BREQ_L signal 82a goes high, and resets flip-flop 125.

The arbitration enable circuit 120 thus enables the module 11 to join in each arbitration cycle 70 conducted on the backplane bus 12 and to remain in the arbitration until it wins a competition 71. Once a competition 71 has been won, however, the arbitration enable circuit 120 prevents this module from entering any further competitions during the current arbitration cycle 70. After all modules 11 wanting to transmit have had their turn, the BREQ_L line 82 on the backplane bus 12 is released, and another arbitration cycle 70 may start in which all modules 11 may again compete.

Still referring to FIG. 7B, the arbitration logic circuit 40 also includes an arbitration timing circuit 127, a principle function of which is to generate pulses on the OUT_ARB_STB_L line 81b. The OUT_ARB_STB_L line 81b then combines with the corresponding wired-or signals from other modules 11 to define the two phases $\Phi_1$ and $\Phi_2$ of the competition 71 on the composite ARB_STB_L line 81. The arbitration timing circuit 127 also produces a COMPETE signal 138, which is activated (high logic level) to indicate that the module 11 is a participant in the current competition 71.

The COMPETE signal 138 is generated as the output of AND gate 128. One input of AND gate 128 is connected to the OUT_BREQ_L line 82b through an inverter 118. Assertion of the OUT_BREQ_L line 82b by the module 11 places a high logic level on the input to AND gate 128, and is thus a general enabling condition for participation in a competition 71. The other input of AND gate 128 is connected to the output of a three input NAND gate 131. The output of NAND gate 131 is activated (high logic level) when any one of the three inputs is pulled low, and thus forms three separate conditions under which the competition 71 will be entered.

The first condition under which a competition 71 is entered is a case in which the BREQ_L line 82 is first pulled low (falling edge), beginning a new arbitration cycle 70. When a new arbitration cycle 70 begins, the first competition 71 thereof may be commenced without delay, since there were no previously competing modules 11. The falling edge of the BREQ_L signal 82 is detected by flip-flop 129, which is clocked by a system clock for synchronization, and has a D input connected to the IN_BREQ_L line 82a. A falling edge on the IN_BREQ_L line 82a produces a positive, or rising edge on the $\overline{Q}$ output of flip-flop 129, and this signal is connected as a clock input to another flip-flop 130. The output of inverter 118 (inverted OUT_BREQ_L signal 82b) is connected as the D input of flip-flop 130, so that flip-flop 130 is clocked to a "set" state if the OUT_BREQ_L signal 82b was asserted when the falling edge of the IN_BREQ_L signal 82a occurred. If flip-flop 130 becomes set in that manner, a low logic level is produced at its $\overline{Q}$ output, and this signal is connected as one of the inputs to NAND gate 131. Therefore, if the module 11 was contending for bus access (OUT_BREQ_L signal 82b asserted) when a new arbitration cycle 70 starts, then the COMPETE signal 138 is activated, and the module 11 participates in the competition 71. But if the module 11 first asserts the OUT_BREQ_L signal 82b after the start of a new arbitration cycle 70 (i.e. more than one clock cycle after the falling edge of IN_BREQ_L signal 82a), then the module 11 does not participate in the first competition 71, since that first competition may already be in progress and may be corrupted if a module 11 joins in mid-competition. Instead, a module 11 which joins an arbitration cycle 70 already in progress waits for the start of a subsequent competition 71 to become synchronized therewith. The start of each such subsequent competition 71 is the second condition under which a module 11 asserts the COMPETE signal 138, and that condition is described next.

As just alluded to, the second case in which a module 11 activates the COMPETE signal 138 is when an arbitration cycle 70 is already in progress (IN_BREQ_L signal 82b asserted), and a new transfer cycle 72 is started. When the new transfer cycle 72 is started, the XFER_L line 25 is pulled low by the transmitting module 11, and this serves as the synchronization point for beginning a new competition 71 as discussed above in relation to FIG. 5. Specifically, the IN_XFER_L signal 45 is applied through an inverter 139 to the clock input of a flip-flop 132. Thus, the falling edge of the IN_XFER_L signal 45 clocks flip-flop 132. The flip-flop 132 has a D input connected to a three input AND gate 133, which forms the conditions for setting the flip-flop 132. Those conditions are (1) the OUT_BREQ_L signal 82b is asserted (logic low level), and applied as a high logic level through inverter 118, (2) the IN_BREQ_L signal 82a is asserted (logic low level) and applied to an inverting input of the AND gate 133, and (3) the OWN signal 60 is false (logic low level), and is also applied to an inverting input of the AND gate 133. The first two conditions establish that a competition cycle 70 is in progress, and that the module 11 wants to compete in it, while the third condition (OWN signal 60 false) establishes that the module 11 is not the one which is currently beginning the transmit cycle 72, and thus is still eligible to compete. If all three of these conditions are satisfied, then the output of AND gate 133 will be true (logic high level), causing flip-flop 132 to be set when clocked by the falling edge of the IN_XFER_L signal 45. If flip-flop 132 becomes set in the manner described, a logic low level appears on the $\overline{Q}$ output of flip-flop 132. The $\overline{Q}$ output of flip-flop 132 is applied as the second input to NAND gate 131, and serves to activate the COMPETE signal 138 when flip-flop 132 becomes set as just described.

The third case in which the COMPETE signal is activated is when the module 11 was one of the winning modules 11 for the first phase of the competition, and is now enabling the COMPETE signal 138 to remain in the second phase of the competition. A "win" of phase one is indicated by a WON $\Phi_1$ signal 139, the production of which is described in detail below. The WON $\Phi_1$ signal 139 is gated through a NAND gate 135 to the third input of NAND gate 131, and thus serves to maintain assertion of the COMPETE signal 138 if the module 11 was indeed one of the winning modules 11 for phase one. Another NAND gate 136 detects the completion of phase one, as described in more detail below. The output of NAND gate 136 is connected to reset inputs on the flip-flops 130 and 132 which had latched the first two competition conditions. Therefore, the flip-flops 130 and 132 are automatically reset whenever phase two begins, and so the COMPETE signal 138 may remain active only if the module 11 was one of the phase one winners, and is thus still in the competition 71. If on the other hand, the WON $\Phi_1$ signal 139 was not activated by the end of phase one, then the COMPETE signal 138 is de-asserted at that time by virtue of flip-flops 130 and 132 being reset, and the module 11 does not compete in the second phase of the competition 71. Of course, any module 11 which drops out of the competition 71 after phase one may compete in subsequent competitions 71 when the flip-flop 132 is again set in response to the start of the next transfer cycle 72.

Referring still to FIG. 7B, the remainder of the arbitration timing circuit 127 drives the OUT_ARB_STB_L line 81b during the competition 71 and produces other timing signals for use within the module 11 in conducting the competition 71. More specifically, the OUT_ARB_STB_L line 81b is connected as the output of a NAND gate 140. One input of NAND gate 140 is connected to the COMPETE signal 138, while the other input of NAND gate 140 is connected to the Q output of a flip-flop 142. The complete operation of flip-flop 142 is described later, although it may be assumed that the flip-flop 142 begins in a "set" condition (Q output at a logic high) when the COMPETE signal 138 is first asserted. Under those conditions, both inputs to NAND gate 140 are at a high logic level. With both inputs high, the output of NAND gate 140, and consequently the OUT__ARB__STB_L line 81*b*, is driven to the asserted, or low logic level.

The OUT__ARB__STB_L line 81*b* is applied through the receiver/driver circuit 100 to drive the ARB__STB_L line 81 on the backplane bus 12, where all modules 11 monitor the same wired-or signal. The state of the ARB__STB_L line 81 on the backplane bus 12 is fed back on the IN__ARB__STB_L line 81*a* to a D input of a flip-flop 141. Flip-flop 141, and the previously mentioned flip-flop 142, are both clocked by an internal system clock for internal synchronization of the IN__ARB__STB_L line 81*a*. The flip-flops 141 and 142 are connected to form a two stage delay, with the Q output of flip-flop 141 being connected to the D input of flip-flop 142, and the Q output of flip-flop 142 being connected back as an input to NAND gate 140. Therefore, after initially driving the OUT__ARB__STB_L line 81*b* low, the resulting low logic level is propagated through to the IN__ARB__STB_L line 81*a*. The low logic level on the IN__ARB__STB_L line 81*a* is in turn delayed by two clock cycles through flip-flops 141 and 142, and then applied as a low logic level to force the NAND gate 140 back to a de-asserted, logic high level. When the NAND gate 140 is de-asserted, the OUT__ARB__STB_L line 81*b* is released by the module 11.

The above described sequence for generating the OUT__ARB__STB_L signal 81*b* has thus far only considered the action of a single module 11. Of course, other modules 11 may simultaneously be asserting their own OUT__ARB__STB_L lines 81*b*, and so the composite, wired-or ARB__STB_L line 81 line on the backplane 12 may remain low even though it has been released by an individual module 11. However, the backplane line ARB__STB_L 81 will eventually be released by all of the modules 11, and will then assume a logic high, de-asserted state. When this happens, the resulting logic high state is recirculated through the flip-flops 141 and 142 during the next two clock cycles.

In normal operation, each module 11 participating in the competition 71 would quickly release its OUT__ARB__STB_L line 81*b*, and the composite, wired-or signal ARB__STB_L 81 on the backplane bus 12 would thus have been asserted (i.e. driven low) for approximately two clock pulses ($\Phi_1$). The two stage delay afforded by flip-flops 141 and 142 then continues to circulate the OUT__ARB__STB_L line 81*b*, as long as the COMPETE signal 138 remains active. The normal sequence following the approximate two clock pulse assertion of the OUT__ARB__STB_L line 81*b* would therefore be an approximate two clock pulse release, or de-assertion of the OUT__ARB__STB_L line 81*b*. If the COMPETE signal 138 remains asserted (for phase two), the continuing circulation of the OUT__ARB__STB_L signal 81*b* would then result in assertion thereof for another period of approximately two clock pulses ($\Phi_2$), and then release back to a logic high level.

The ARB__STB_L signal 81 on the backplane bus 12 reflects the joint assertions of the OUT__ARB__STB_L lines 81*b* by the modules 11 participating in the competition, and therefore also exhibits the same two consecutive assertions forced by the OUT__ARB__STB L lines 81*b* of the modules 11. The two consecutive assertions of the ARB__STB_L signal 81 are thus the defining points for the two phases of the competition 71, and are synonymous with the respective phase labels $\Phi_1$ and $\Phi_2$. As previously mentioned, the different modules 11 participating in the competition 71 may hold the ARB__STB_L line 81 low for slightly different times, and the ARB__STB_L line 81 will actually be released only when the last participating module 11 is ready. This rising edge at the end of the $\Phi_1$ and $\Phi_2$ pulses is thus the best time to latch data since all modules are ready at these times.

As will be described in detail below, the extension module 17, if present, may substantially elongate the competitions 71 by holding the ARB__STB_L line 81 in the asserted, low logic level state when the REMOTE_L line 83 is also activated. In that case, the competition 71 is being conducted across both racks 10 in a dual rack configuration, and the extension module 17 holds the ARB__STB_L line 81 low on both racks to maintain synchronization of the competition 71.

Continuing to refer to FIG. 7B, another flip-flop 145 indicates whether the competition 71 is in phase one or phase two. Flip-flop 145 is reset by the $\overline{Q}$ output of flip-flop 129 when the IN__BREQ_L line 82*a* goes high between arbitration cycles 70 as described above. When reset, a logic high is forced onto the $\overline{Q}$ output of flip-flop 145, indicating that phase one ($\Phi_1$) is enabled. The $\overline{Q}$ output of flip-flop 145 is connected as an output signal 150, labeled $\Phi_1$, which is used by other circuits described below to indicate the phase one status of the arbitration timing circuit 127.

When flip-flop 145 is in the reset, or "phase one" state, the Q output is low and the $\overline{Q}$ output is high. The Q output is connected as one input to an OR gate 146, while the $\overline{Q}$ output is connected as one input to another OR gate 147. The other input of both OR gates 146 and 147 is connected in common to the IN__ARB__STB_L line 81*a*. The OR gates 146 and 147 serve to generate active low strobe pulses $\Phi_1$STB_L 151 and $\Phi_2$STB_L 152 for the first and second phases of the competition 71, respectively. With the flip-flop 145 in the "phase one" state, the high logic level on the $\overline{Q}$ output forces the output of OR gate 147 high, disabling the $\Phi_2$STB_L signal 152. At the same time, the low logic level on the Q output enables OR gate 146 for activating the $\Phi_1$STB_L signal 151 as soon as the IN__ARB__STB_L line 81*a* is also pulled low.

Flip-flop 145 is connected for toggle operation, with the $\overline{Q}$ output being connected back as the D input. The clock input to flip-flop 145 is connected to the Q output of flip-flop 141. Therefore, when the IN__ARB__STB_L line 81*a* is released, signifying the end of phase one, flip-flop 145 is toggled to the "phase two" state after the one clock pulse delay imposed by flip-flop 141. In the "phase two" state, the outputs of flip-flop 145 are the inverse of the "phase one" state, i.e. with the Q output at a high logic level and the $\overline{Q}$ output low. In that state, OR gate 146 is disabled, forcing the $\Phi_1$STB_L signal 151 high, while the other OR gate 147 is enabled for activating $\Phi_2$STB_L signal 152. With OR gate 147 enabled, the next time that the IN__ARB__STB_L line 81*a* goes low (i.e. the start of phase two), the $\Phi_2$STB_L signal 152 is likewise pulled low. The Q output of flip-flop 145, which is high in the "phase two" state, is also used to enable the NAND gates 135 and 136 as described above. At the end of phase two, flip-flop 145 is again clocked when the IN__ARB__STB_L line 81*a* is released, except now the flip-flop 145 toggles back to the reset, or "phase one" state in preparation for the start of another competition 71.

Figure 7C:
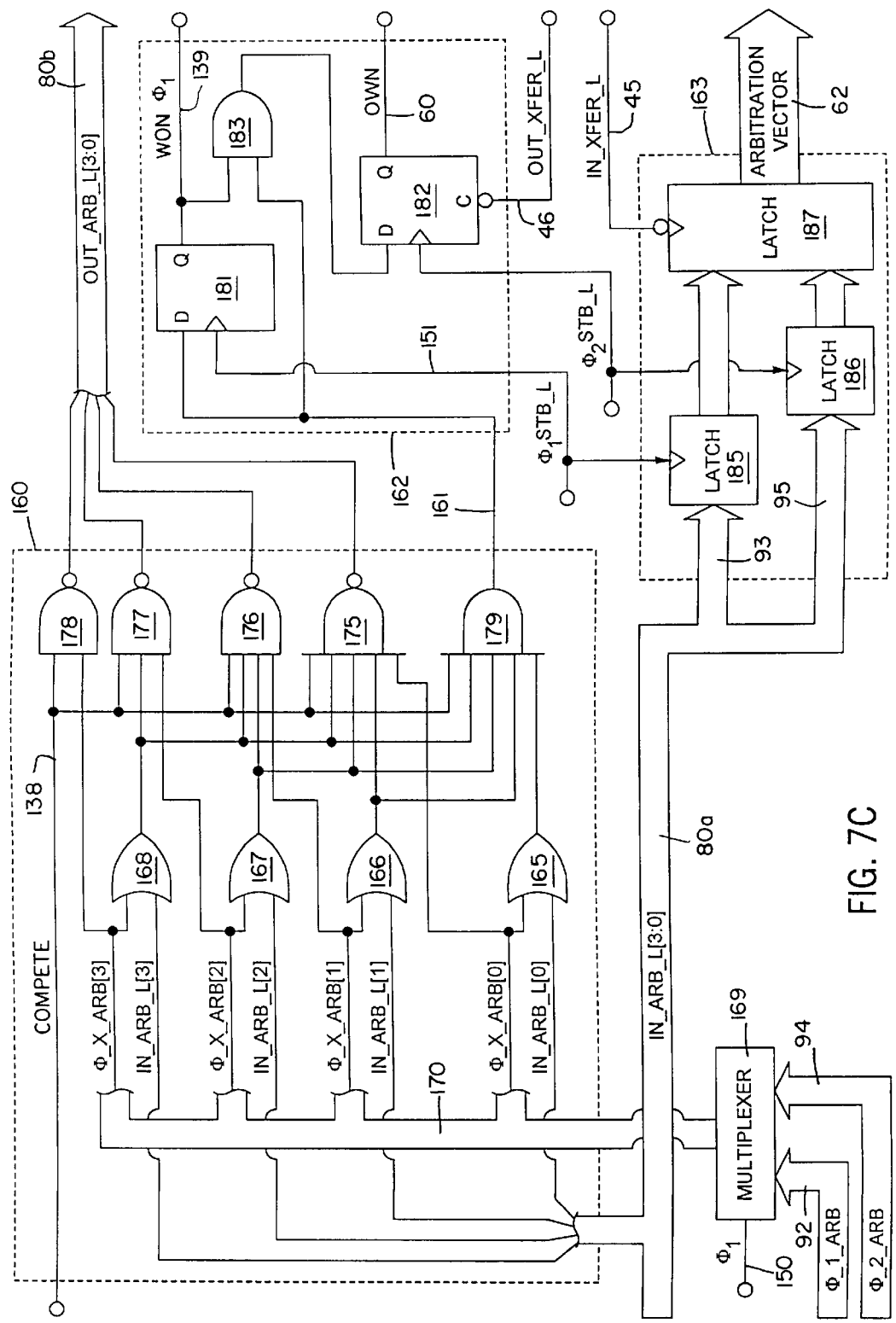

Referring now to FIG. 7C, a comparison circuit 160 is used to determine whether or not the local module 11 is asserting the highest weight code 92 or 94 on the ARB_L bus 80 during each of the two separate phases, respectively. An output line 161 from the comparison circuit 160 is ultimately asserted (logic high level), as described in detail below, if the local module 11 is in fact asserting the numerically highest weight code 92 or 94. A detector circuit 162 latches the state of output line 161 at appropriate times in order to form the WON $\Phi_1$ signal 139 and the OWN signal 60. Finally, a latch circuit 163 stores the information from the two respective resultant weight codes 93 and 95 in order to form the arbitration vector 62.

Still referring to FIG. 7C, the four separate leads IN_ARB_L[0] through IN_ARB_L[3], which represent the current state of the ARB_L bus 80 on the backplane 12, are applied to one input on each of four OR gates 165–168, respectively. A multiplexer 169 drives the other input on each OR gate 165–168 with a corresponding bit, represented as $\Phi$_X_ARB[0] through $\Phi$_X_ARB[3], respectively. The individual lines $\Phi$_X_ARB[0] through $\Phi$_X_ARB[3] are collectively referred to as $\Phi$_X_bus 170. The multiplexer 169 alternatively connects the $\Phi$_X_ARB bus 170 to either the phase one weight vector 92 or the phase two weight vector 94. The above described control signal $\Phi_1$ 150 is connected as the control input to the multiplexer 169, and thus determines which of the weight codes 92 or 94 is applied to the $\Phi$_X_ARB bus 170. Specifically, the $\Phi$_1_ARB lines 92 are applied to the $\Phi$_X_ARB bus 170 when the $\Phi_1$ control line 150 is asserted (logic high value), signifying that phase one of the competition 71 is in progress. Conversely, the $\Phi$_2_ARB lines 94 are applied to the $\Phi$_X_ARB bus 170 when the $\Phi_1$ control line 150 is de-asserted (logic low value), and the competition 71 is in phase two.

The comparison circuit 160 also includes a set of NAND gates 175–178 and an AND gate 179. The COMPETE signal 138 is connected to one input on each of the NAND gates 175–178 and to one input on AND gate 179, and thus serves as an overall enabling signal. Together, the OR gates 165–168 and the NAND gates 175–178 combine the module'"local" weight code from the $\Phi$_X_ARB bus 170 with the aggregate codes from all other modules 11 which are wire-or'ed onto the ARB_L bus 80. The result of this combination is obtained on the outputs of NAND gates 175–178, which are connected to the corresponding OUT_ARB_L lines 80b.

When enabled by the COMPETE signal 138, the "local" weight code from the $\Phi$_X_ARB bus 170 is eligible for transfer onto the OUT ARB_L lines 80b in inverted form, i.e., a high logic level on the $\Phi$_X_bus 170 would be asserted as a low logic level on the OUT_ARB_L lines 80b. However, a gating scheme, described in detail below, is formed by OR gates 165–168 and NAND gates 175–178, and is employed to selectively block the assertion of lower order bits from the $\Phi$_X_ARB bus 170 when the local weight code is found to have a lower numerical value than the aggregate, wired-or weight code appearing on the IN_ARB_L lines 80a. When such blocking occurs, the module 11 has effectively "dropped out" of the competition 71, since its lower order weight bits do not appear on the wired-or ARB_L lines 80. Contrarily, if no such blocking occurs, then the local weight code on the $\Phi$_X_ARB lines 170 is numerically equal to any other weight code being asserted on the wired-or ARB_L lines 80. In that case, all of the inputs to AND gate 179 are enabled, and the output of AND gate 179 on line 161 becomes true (active high logic level) to indicate the "winning" status of the local weight code $\Phi$_X_ARB 170. Also note that when other modules 11 determine that their local weight codes are numerically less than the aggregate wired-or weight code on the ARB_L lines 80, those modules 11 discontinue assertion of their "losing" low order local weight codes bits. Eventually, only those modules 11 which have a weight code which is equal to the aggregate wired-or weight code on the ARB_L lines 80 will still be asserting all of their weight code bits, and these stations are the "winners".

In particular, the interaction between the local and aggregate weight codes is performed on a bit-by-bit basis, starting from the most significant bit and working down to the least significant bit. Each OR gate 165–168 "decides" if the related bit in the local weight code 170 is at least as great (i.e. not less than) the corresponding bit input from the IN_ARB_L lines 80a. In particular, a logic high is output from each OR gate 165–168 if either; (a) the local bit on the $\phi$_X_ARB bus 170 is "1" (logic high level), or (b) the input bit from the IN_ARB_L bus 80a represents "0" (also logic high level, since the IN_ARB_L bus 80a has an active low format). Note that the foregoing two cases are indicative of the local weight bit from bus 170 being numerically at least as great as the corresponding bit from the IN_ARB_L bus 80a. Conversely, a condition in which the inputs to the OR gates 165–168 are both low represents a "losing" situation for the particular bit being compared, i.e. the local bit is indeed less than the corresponding bit input from the IN_ARB_L bus 80a. The "losing" case occurs when the local bit is "0" (logic low level), while the input bit is "1" (also low logic level due to the inverted format on the IN_ARB_L bus 80a ).

The output from each of the three high order OR gates 166–168 is connected to an input of each NAND gate 175–177 at every lower significant bit stage. The output from each of the three high order OR gates 166–168 is also connected to respective inputs of AND gate 179. The low order OR gate 165, which does not have a lower significant bit stage, is connected directly to AND gate 179. With these connections, a "losing", or low logic level from any OR gate 165–168 serves both: (a) to inhibit the NAND gates 175–177 of all lower stages from propagating the local weight code onto the OUT_ARB_L bus 80b, and (b) to disable AND gate 179, thereby indicating a "losing" comparison on output line 161. However, a "winning" or high logic level from an OR gate 166–168 enables the NAND gates 175–177, which then continue to impress the module's local weight code bits onto the OUT_ARB_L[2:0] lines 80b. Note that NAND gate 178, which drives the OUT_ARB_L[3] line of bus 80b, requires only the COMPETE signal 138 to be enabled, and thus drives the high order bit, (i.e., the OUT_ARB_L[3] line of bus 80b) whenever the module 11 is participating in the competition 71. If the module's local weight code $\Phi$_X_ARB 170 persists as the highest weight code being asserted, then the outputs of all of the OR gates 165–168 remain true (logic high level), and the output of AND gate 179 remains asserted (logic high level) to indicate the "winning" status for the comparison.

To further illustrate the operation of the comparison circuit 160 in FIG. 7C, reference is made to the following Comparison Circuit Logic Table:

Comparison Circuit Logic Table

| Backplane ARB_L line | Local Φ_X_ARB Line | OR-gate Output | Lower Order NAND-gates | Local Priority Code Transfer |
|---|---|---|---|---|
| Asserted (low) | not asserted (low) | low | disabled | blocked at low levels |
| asserted (low) | asserted (high) | high | enabled | yes |
| not asserted (high) | not asserted (low) | high | enabled | yes |
| not asserted (high) | asserted (high) | high | enabled | transition state (ARB_L line will eventually be forced low by the high on the Φ_X_ARB Line). |

Still referring to FIG. 7C, the detector circuit 162 includes D flip-flops 181 and 182 for latching the respective results of the phase one and phase two comparisons. The output of AND gate 179 on line 161 is connected to the D input of flip-flop 181, and flip-flop 181 is clocked by the $\Phi_1$STB_L signal 151. The Q output of flip-flop 181 therefore reflects the state of AND gate 179 at the end of phase 1, and is connected as the WON $\Phi_1$ signal 139 to the arbitration timing circuit 127 (FIG. 7B). The WON $\Phi_1$ signal 139 will therefore be set true (logic high level) when the weight code on the IN_ARB_L[3:0] lines 80a at the end of phase one is the same as the module'phase one weight code on the Φ_1_ARB bus 92. If those conditions are not met, then of course the WON $\Phi_1$ signal 139 will be reset (logic low level), indicating a "loss" of phase one.

If the WON $\Phi_1$ signal 139 is activated at the end of phase one, then the module 11 remains in the competition 71 for phase two. Flip-flop 182 is used to latch the combined outcomes of both phases one and two by utilizing an AND gate 183. One input of AND gate 183 is connected to the WON $\Phi_1$ signal 139, while the other input of AND gate 183 is connected directly to the output line 161 of AND gate 179. At the end of phase two, the output of AND gate 183 will therefore be true (logic high level) only if both: (a) a "winning" condition of the preceding phase one was clocked into flip-flop 181, and (b) the output of AND gate 179 indicates another "win" condition for phase two. The output of AND gate 183 is connected to the D input of flip-flop 182, and flip-flop 182 is clocked by the rising edge of the $\Phi_2$STB_L signal 152 (i.e. the end of phase two). The Q output of flip-flop 182 is connected as the OWN signal 60, and is thus set true (logic high level) to indicate successive "wins" for both phase one and phase two for the competition 71. Likewise, a "loss" of either phase one or phase two will result in a false (low logic level) being latched as the OWN signal 60. Of course, if the module 11 does not win both phases of the competition 71 (e.g. the OWN signal 60 was not set), then the module 11 will continue to participate in successive competition cycles 71 until it is ultimately successful, as described above.

The flip-flop 182 also includes a clear input connected to the OUT_XFER_L line 46, which resets flip-flop 182 and the OWN signal 60 when the module 11 actually assumes its ownership of the backplane bus 12. Note that the OUT_XFER_L line 46 is asserted (logic low level) only by the local module 11, and not by the aggregate wired-or connection on the XFER_L backplane signal 25. When the module 11 wins bus mastership, by virtue of the assertion of the OWN signal 60, the subsequent assertion of the OUT_XFER_L line 46 resets flip-flop 182 and the OWN signal 60.

Again referring to FIG. 7C, whether or not the module 11 wins the competition 71, or even if the module 11 is not participating in the competition 71, the latch circuit 163 operates to capture the information used to form the arbitration vector 62. More specifically, at the end of phase one, the contents of the IN_ARB_L[3:0] lines 80a reflect the numerically highest, or "winning" weight code 93. The winning weight code 93 is clocked into a latch 185 by the rising edge of the $\Phi_1$STB_L signal 151 at the end of phase one. Similarly, at the end of the phase two, the "winning" phase two weight code 95 is available on the IN_ARB_L[3:0] lines 80a, and is clocked into a latch 186 by rising edge of the $\Phi_2$STB_L signal 152. When the winning module 11 subsequently begins to transfer data across the backplane 12 by asserting the XFER_L line 25, the falling edge of the IN_XFER_L signal 45 clocks the respective outputs of latches 185 and 186 into another latch 187. The output of latch 187 is then connected as the arbitration vector 62, and thus contains the results of the previous arbitration. Once the latch 187 has been loaded, the separate latches 185 and 186 are then available for use in another competition 71.

Figure 8:
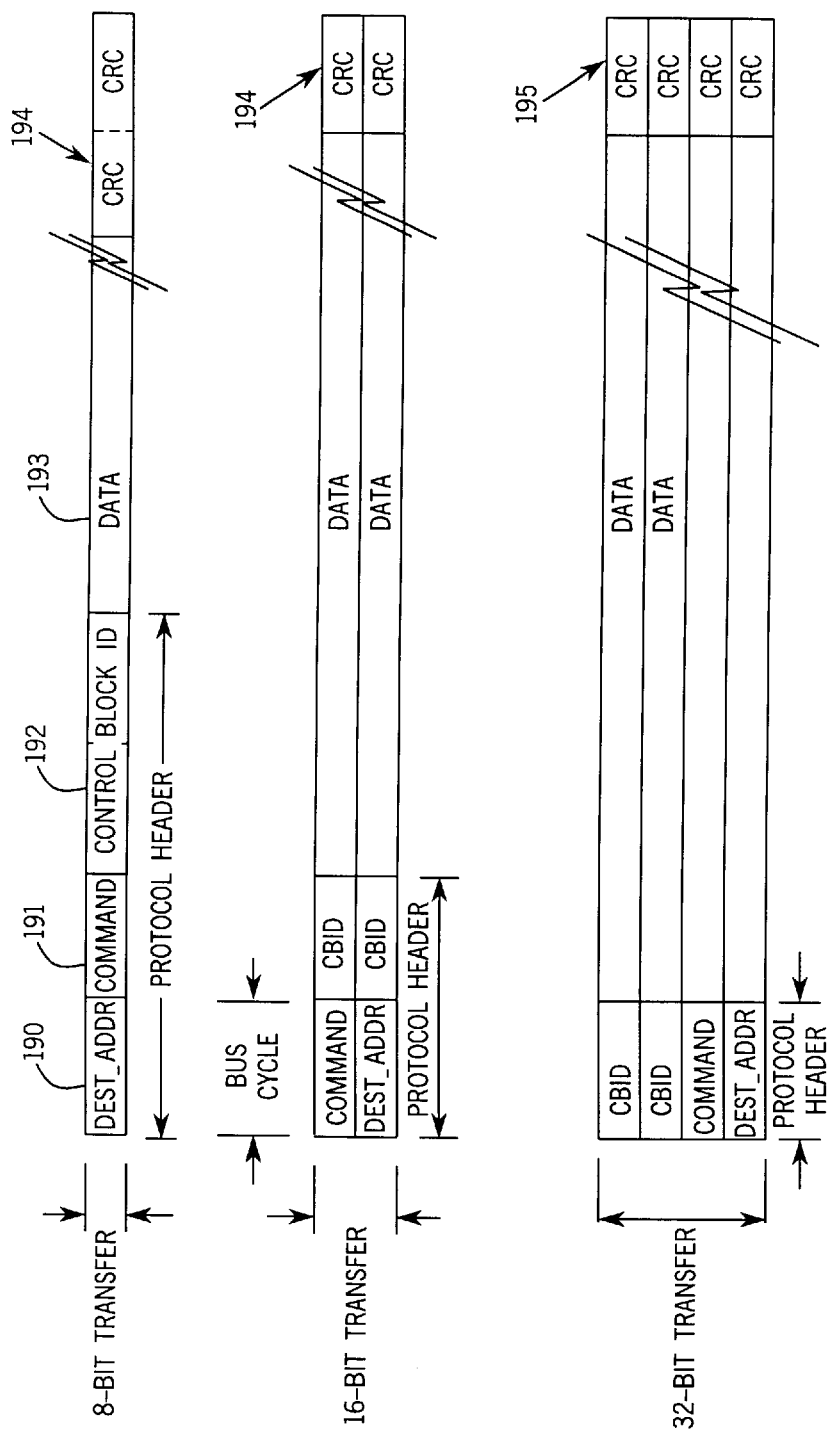
FIG. 8 is a diagram of the frame structure for messages exchanged by the interface circuit of FIG. 4.

Before describing how a winning module performs a data transfer on the backplane bus 12, the format of the message data will be described with reference to FIG. 8. The bus transfer protocol is defined in terms of bus cycles, frames and messages. A bus cycle transfers a set of data bits over the backplane bus 12. If there are 32 data bus signals in the backplane bus 12, for example, up to 32 bits of data may be transferred in a single bus cycle. A series of such bus cycles form a frame, and one or more frames may be required to convey a complete message. Frames are limited in their length and a module 11 can send only one frame during each possession of the backplane bus 12.

When a module 11 wins control of the backplane bus 12, it transmits a single frame comprised of a series of bus cycles. The format of a frame is shown in FIG. 8 and includes a protocol header comprised of an 8-bit Destination Address 190, an 8-bit Command 191 ahd a 16-bit Control Block ID (CBID) 192. This protocol header requires four bus cycles to transfer using an 8 bit wide data transfer, two bus cycles using a 16 bit wide data transfer, and one bus cycle using a 32 bit wide data transfer. The protocol header is followed by the message data 193 which may vary in length, but which cannot exceed a specified frame length. The frame concludes with a 16-bit CRC code 194 or a 32-bit CRC code 195 that is employed to insure the integrity of the data transfer. In the case of an 8-bit wide data transfer, the 16-bit CRC code 194 is sent as two consecutive bus cycles, while a 16-bit transfer sends the 16-bit CRC code 194 during a single bus cycle. For a 32-bit wide data transfer, the 32-bit CRC code 195 is used, and is sent in a single bus cycle. If the message data exceeds the frame limit in length, then the message data is transferred in a series of these-frames, each requiring that the sending module 11 arbitrate for access to the backplane bus 12.

The 8-bit Destination Address 190 in the protocol header identifies the module, or modules, to which the frame is being transferred. The bits in the Destination Address 190 serve the following functions:

ds0–ds5 A 6-bit address designator, which specifies either: (a) a multi-cast (group) address, or (b) the geographic address of a single destination module 11, including rack number and slot number.

ds6 A start of message bit which is set to "1" for the first frame in a message and is set to "0" in subsequent frames.

ds7 Protocol escape bit which is set to "0" when this protocol is used and is set to "1" when another protocol is used.

The Command byte 191 follows the Destination Address byte 190, and its 8 bits define a command code. The possible command codes specify a variety of specific message types, but are generally classified into three categories: (1) connected messages for which a control block in the receiving module is preallocated, (2) unconnected messages which do not have preallocated control blocks, and (3) a PING command, which requests the receiving module to unconditionally respond with a "busy" indication to show that it is still alive. The decoding and use of these command types are described more fully below.

The 16-bit Control Block ID 192 (abbreviated "CBID") follows the Command byte 191 and includes 15 bits that manage the complete message transfer at the receiver host. The CBID 192 is used by the receiving host as a pointer to a control block containing information pertaining to the transfer of message data, such as the address of the data and the quantity of data. The interpretation of the CBID 192 is local to the receiving host, and may be a physical memory address, an index, or some other construct known only to the receiving host. The sixteenth bit in the CBID 192 is an "end of message" bit which is set to "1" when this frame is the last frame in the message and is set to "0" when it is not the last frame.

All information in the message, including higher layer protocol information, is transferred in the Data field portion 193 of the frame. The length of the Data field 193 varies and its maximum length is limited by the number of bus cycles allowed in any single frame.

The 16-bit CRC code 194 used for eight and sixteen bit wide data transfers is computed according to a standard algorithm such as those described by W. W. Peterson et al in "Cyclic Codes for Error Detection", *Proceedings Of The IRE*, January, 1961, while a modified version for thirty-two bit data transfers would be apparent to those skilled in the art. As will be described below, the transmitting module 11 asserts backplane control line STATUS_L[2] when these CRC bytes are being sent so that the receiving module 11 knows that the Data 193 has been transferred and the CRC calculations can be made and compared with the CRC data 194 or 195 currently being transferred.

Figure 9:
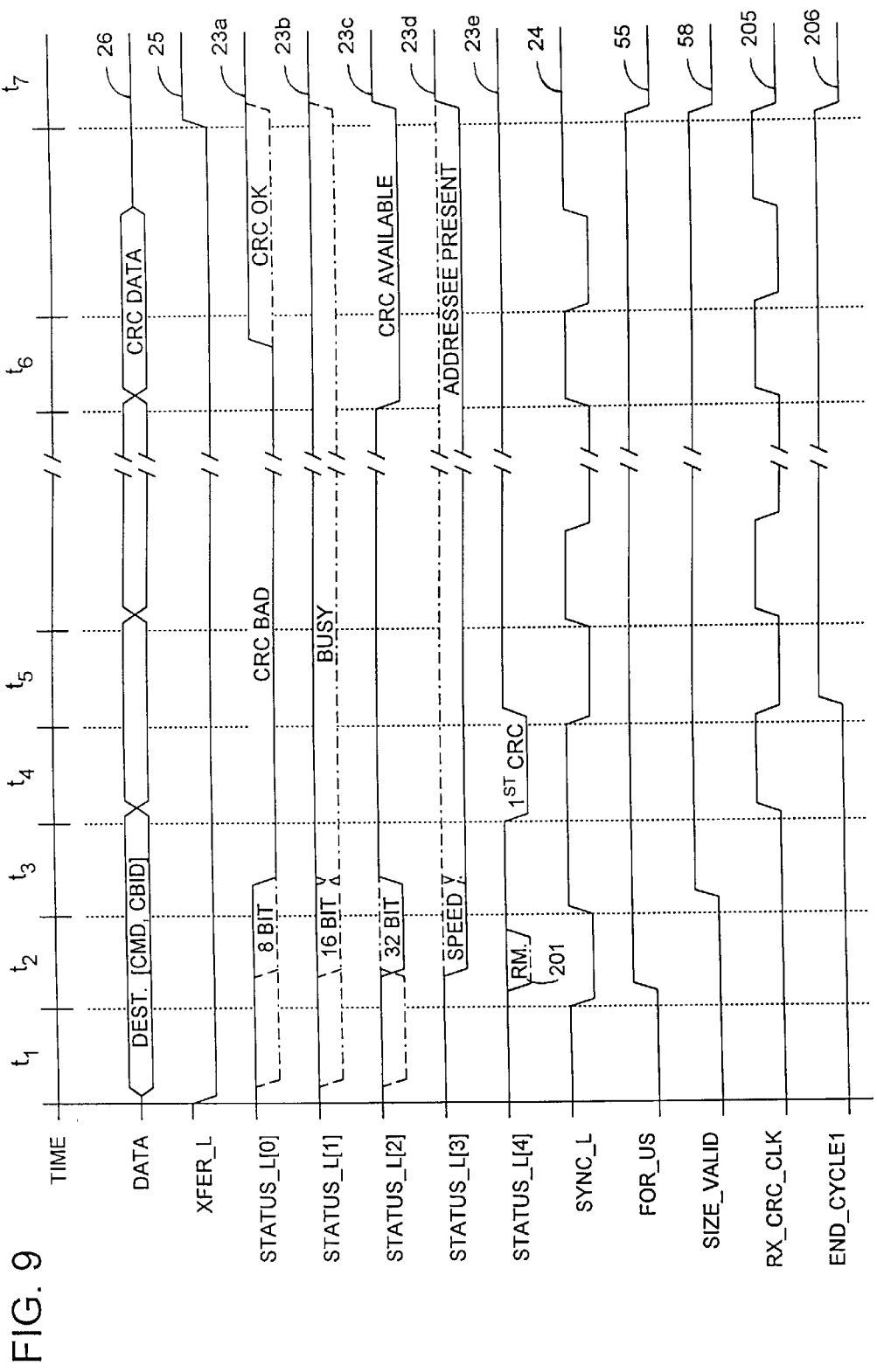
FIG. 9 is a timing diagram for the data exchange performed by the interface circuit of FIG. 4.

Referring now to FIG. 9, a general timing diagram for the data transfer process is presented to illustrate several additional novel aspects of the invention. Specifically, in one important aspect of the invention, the STATUS_L lines 23 are utilized in a time multiplexed manner to perform multiple functions, thereby allowing the data transfer protocol to be executed using a reduced number of lines on the backplane bus 12. Specifically, the STATUS_L lines 23 are utilized during the first bus cycle for negotiating the data transfer width and the data transfer speed to be used for the current data transfer. After the first bus cycle, each of the STATUS_L lines 23 assumes an alternate function, which are described in detail below, thus avoiding the need for additional, dedicated lines for those alternate functions. A second novel aspect of the invention provides a high level control over the flow of data between the modules 11. The flow control capability of the invention permits one or more receiving modules 11 to send a "busy" signal back to the transmitting module 11 when the receiver is unable to receive the message due to the unavailability of resources. Specifically, the receiving module 11 requires certain resources to be available for message reception, including memory buffers for the message itself, in addition to control information, and other criteria according to the invention. The particular circumstances for control of the "busy" indication are themselves a part of the invention and are generally referred to as a resource availability criteria, as described in detail below. Specifically, one of the STATUS_L lines 23 is used to indicate a "busy" status for the receiving module(s) 11 as its alternate function following the first bus cycle. The "busy" signal is monitored by the transmitting module 11, and if the transmitting module 11 detects an activation of the "busy" signal after the first cycle has been completed, then the transmitting module 11 will abort the transmission immediately. By aborting the transmission early in the transmission cycle, a significant amount of time can be saved over the prior method of transmitting a complete message followed by a responsive non-acknowledgement message (NACK) back to the sender. The "busy" condition may be generated by one or more receiving modules 11 based on the resource availability criteria described below, but in all cases indicates that at least one module 11 is not ready to receive the message frame. Therefore, the frame will need to be retransmitted at a later time anyway, and is aborted without further waste of transmission time.

Still referring to FIG. 9, the data transfer process starts when the transmitting module 11 asserts the XFER_L line 25, starting at the time period labeled $t_1$. At essentially the same time, the transmitting module 11 applies the first output word of data to the DATA[31:0] lines 26, and further applies a 3-bit data width capacity code onto the STATUS_L[2:0] lines 23c–23a. As discussed previously, the invention supports a variable width for data transfers, and so the data asserted by the transmitting module 11 during time $t_1$ may use all, or only part of, the full number of data lines 26 which are available on the backplane bus 12. In this exemplary embodiment, the data bus 26 is four bytes wide, and the transfer may be from one to four bytes wide. At time $t_1$ however, the negotiation for the actual bus width to be used for the current transfer has not yet been completed, and so the transmitting module 11 initially asserts data during time $t_1$ according to the maximum data width supported by the transmitting module 11. Thus, two things should be noted regarding the data asserted by the transmitting module 11 during time $t_1$. First, the ultimately negotiated data transfer width can not exceed the maximum data width supported by the transmitting module 11, since the transmitting module 11 itself is a participant in the negotiation process, as described in detail below. Consequently, some of the data presented during the first bus cycle may need to be repeated in subsequent bus cycles, but no additional data bytes can be necessary in the first bus cycle. Secondly, the data presented by the transmitting module 11 during time $t_1$ must include at least the destination byte 190 for the current frame. As described above, the destination byte 190 is the first frame byte, and will therefore be asserted during the first bus cycle, even if the transmitting module 11 supports only single byte wide transfers.

At the beginning of time period $t_2$, the transmitting module 11 asserts the SYNC_L line 24 to an active low state. The active, or falling edge of the SYNC_L line 24 serves as a strobe for sampling the data lines 26. At the falling edge of the SYNC_L line 24, valid data is present and stable on the data lines 26. On the first assertion of the SYNC_L line 24, therefore, each module 11 is able to decode whether or not it is an addressee of the frame currently being transmitted, based upon the destination byte 190 available on the data lines 26. Each module 11 which determines that it is indeed an addressee of the current frame sets the internal signal FOR_US 55. The FOR_US signal 55 in turn enables each addressed module 11 to assert its own data width capacity code and speed capacity code onto the status lines 23. The data width capacity code is a three bit code which is asserted onto the STATUS_L[2:0] lines 23c–23a to indicate the data transfer width which the module 11 supports. Both the transmitting module 11 and the addressed modules 11 use the same codes for data width capacity, which are shown in the following table:

| STATUS_L[2:0] | | Data Transfer Width Supported |
| --- | --- | --- |
| 111 | = | 64 bits |
| 011 | = | 32 bits |
| x01 | = | 16 bits |
| xx0 | = | 8 bits | where x means "don't care".

FIG. 9 shows in solid line an exemplary illustration in which the STATUS_L[2] line 23c is asserted (low logic level), while the STATUS_L[1:0] lines 23b–23a are high, and this combination corresponds to a data width code of 32 bits.

Simultaneously with asserting the data width capacity code during time period $t_2$, the addressed modules 11 further apply a 1-bit speed capacity code onto the STATUS_L[3] line 23d. The particular speeds utilized in this embodiment are a low speed of 10 MHz or high speed of 20 MHz for the bus cycle rate. Note that the transmitting module 11 does not need to assert a speed capacity code, since the transmitting module 11 can only transmit at the speeds which it does support. Again, the exemplary solid line illustration in FIG. 9 shows the STATUS_L[3] line 23d asserted (low logic level), which indicates that at least one of the addressed receiving modules 11 supports only the low transfer rate.

The first assertion of the SYNC_L signal 24 is performed at the low speed data transfer rate to make sure that all modules 11 can timely decode the destination address 190 and participate in the data transfer width and speed negotiation. While the transmitting module 11 does not participate in the speed negotiation, it does monitor the result on STATUS_L[3] line 23d. If the STATUS_L[3] line 23d remains de-asserted (high logic level) at the first rising edge of the SYNC_L signal 24, then the transmitting module 11 is free to switch to the high speed data transfer rate, provided of course that the transmitting module 11 also supports the high speed data transfer rate. In that event, the timing periods after the first rising edge of the SYNC_L signal 24 will be half of the low speed illustration in FIG. 9.

Together, the STATUS_L[3] line 23d and the STATUS_L[2:0] lines 23c–23a are asserted in a wired-or fashion by the transmitting module 11 and each of the addressed modules 11 to perform a real time negotiation as to the width and speed to be used for the data transfer. The results of the negotiation are thus available to all participating modules 11 on the STATUS_L lines 23, and that result is latched on the first rising edge of the SYNC_L signal 24 at the end of time period $t_2$.

Also in response to the first falling edge of the SYNC_L signal 24 at the beginning of time period $t_2$, a bus expansion module 16, if present, is able to determine if the current frame addresses a destination on the opposite rack. In this context, any multicast, or "group" destination address is considered to address the opposite rack, if present. If such a remote addressee is detected, then the bus expansion module 16 asserts the STATUS_L[4] line 23e until synchronization with the other rack has been achieved. As long as the STATUS_L[4] line 23e remains asserted during the first assertion of the SYNC_L signal 24, the transmitting module 11 elongates the first assertion of the SYNC_L signal 24. The assertion of the STATUS_L[4] line 23e, as shown at 201, may be extended for longer than the exemplary representation in FIG. 9, for example, since the opposite rack may need to complete an ongoing data transfer. When the other rack becomes available, the DATA[31:0] lines 26, the STATUS_L[3:0] lines 23d–23a, and the control lines SYNC_L 24 and XFER_L 25 are reflected between the racks, and the STATUS_L[4] line 23e is released by the bus expansion module 16. Upon release of the STATUS_L[4] line 23e, the transmitting module 11 resumes execution of the first bus cycle by continuing at time period $t_3$.

At the beginning of time period $t_3$, the transmitting module 11 releases the SYNC_L line 24. The resulting first rising edge of the SYNC_L line 24 is used to indicate that the negotiated data transfer width and speed are stable on the STATUS_L[3:0] lines 23d–23a. The first rising edge of the SYNC_L line 24 is thus used to latch the results of the negotiation, as described above. The first rising edge of the SYNC_L line 24 also sets a SIZE_VALID signal 58 within the participating modules 11. The SIZE_VALID signal 58 thus indicates that the latched values of the negotiation results are valid and may then be used for conducting the remainder of the data transfer. The SIZE_VALID signal 58 is also used to switch the STATUS_L[3:0] lines 23d–23a to their respective alternate functions, as described fully below.

Even though the negotiation for the data transfer width and speed is completed during time period $t_3$, there is one more task which must be performed according to the invention before proceeding with the data transfer. That remaining task pertains to the running computation of the residual value for the CRC. Note that the data which is first presented by the transmitting module 11 may not conform to the ultimately negotiated data transfer width. In fact, neither the transmitting module 11 nor any of the receiving modules 11 know what the negotiated width will be at the time that the first cycle of data is presented by the transmitting module 11. The data itself is preserved during the first cycle transfer, since the transmitting module 11 initially asserts data according to its maximum width, and each receiving module 11 likewise latches data according to its greatest supported width. Any subsequent reduction in the actual data transfer width can then be accommodated by retransmitting and relatching the higher order bytes. However, the CRC residual value which must be computed during the first cycle does depend on the data transfer width, since the bits from each byte are combined in a different manner when different data transfer widths are used. Consequently, the CRC value for the first cycle can not be computed until after the negotiation for the bus width is completed.

A strobe for performing the first CRC computation during time period $t_4$ is generated by using the STATUS_L[4] line 23e. Specifically, the transmitting module 11 asserts the STATUS_L[4] line 23e to an active low state at the beginning of time period $t_4$. This activation of the STATUS_L[4] line 23e occurs approximately one half cycle after the SYNC_L line 24 has been released, so there can be no ambiguity with respect to the above described use of the STATUS_L[4] line 23e to extend the activation 201 of the SYNC_L line 24 at a low logic level for remote access. Each module 11 participating in the data transfer generates an internal signal called RX_CRC_CLK 205 which is based on both the STATUS_L[4] line 23e and the SYNC_L line 24. The RX_CRC_CLK signal 205 is then used to clock the running computation of the CRC during message transmission. As shown, the first active, or rising edge of the RX_CRC_CLK signal 205 occurs during the first bus cycle, but at a time following both the presentation of data by the transmitting module 11 and the completion of negotiation for the data transfer width. Subsequent active edges of the RX_CRC_CLK signal 205 are synchronized to the release of the SYNC_L signal 24 to the de-asserted, high logic level state. This affords the CRC computation circuits the maximum amount of time to settle before the data lines 26 are changed.

Meanwhile, since all receiving modules latched the contents of the DATA lines 26 at the falling edge of the SYNC_L signal 24 at the start of time period $t_2$, and since the transmitting module captured the negotiated transfer width at the rising edge of the SYNC_L signal 24 at the start of $t_3$, the transmitting module presents data according to the negotiated width on DATA lines 26 for the second bus cycle at the start of time period $t_4$.

At the beginning of time period $t_5$, the first bus cycle is considered to be complete, and the transmitting module 11 again asserts the SYNC_L signal 24 (logic low level) to begin the second bus cycle. By that time, the status lines STATUS_L[3:0] 23d–23a have assumed their respective alternate functions. These alternate indications are used for the remainder of the data transfer cycle, and are summarized below:

STATUS_L[0] Asserted (logic low level) by receiving module(s) 11 to indicate that the CRC residual is incorrect.

STATUS_L[1] Asserted (logic low level) by receiving module(s) 11 to indicate that the receiver is unable to accept the message at this time (i.e., "busy").

STATUS_L[2] Asserted (logic low level) by the transmitting module 11 to indicate that the CRC checksum is being presented on the data lines 26.

STATUS_L[3] Asserted unconditionally (logic low level) by the receiving module 11 to indicate that the receiving module is present (i.e., a logic high value indicates that the receiving module 11 is either not present, disabled, or defective).

Upon detecting this second assertion of the SYNC_L signal 24, each receiving module 11 generates an internal signal called END_CYCLE1 206 to indicate that the first cycle has indeed been completed. From time period $t_5$ on, the STATUS_L[3:0] lines 23d–23a are used to indicate the alternate functions shown above, and bus cycles are repeated as long as the transmitting module 11 has data to send (within maximum frame limits). Each falling edge of the SYNC_L signal 24 strobes data according to the negotiated data transfer width, and is the defining point for a new bus cycle.

The CRC indication on STATUS_L[0] line 23a will remain "bad" until the final CRC value is transmitted. Consequently, the STATUS_L[0] line 23a will be asserted (low logic level) as soon as the alternate function is assumed, and remain asserted until the CRC value is transmitted during the last bus cycle (time period $t_6$ in the example timing diagram of FIG. 9). The STATUS_L[2] line 23c is activated (low logic level) by the transmitting module 11 just after the rising edge of the SYNC_L signal 24 in the cycle prior to time period $t_6$ to indicate that the CRC value is in fact being transmitted at that time. When the CRC data is transmitted, the STATUS_L[0] line 23a will normally be released to a high logic level by the receiving modules 11, provided of course that there were no CRC errors detected. If a CRC error is detected, then the STATUS_L[0] line 23a will remain asserted, and serve as an indication to both the transmitting module 11 and all receiving modules 11 that an error occurred and that the frame will need to be re-transmitted.

The STATUS_L[1] line 23b is used to indicate the above described "busy" status for the receiving module(s) 11 on the second and subsequent bus cycles. Normally, the "busy" signal on STATUS_L[1] line 23b will become false (logic high level) once the alternate functions are assumed, and remain false for the remainder of the transmission. However, if any of the addressed receiving modules 11 experience a "busy" condition, the wired-or STATUS_L[1] line 23b will be asserted (low logic level), and the transmission will be aborted.

Following the completion of the CRC transmission, the XFER_L line 25 is released to a high logic level at time $t_7$ to signal the end of the transmission. The release of the XFER_L line 25 serves as a general reset to restore the STATUS_L lines 23 and control lines 55, 58, 205 and 206 to their respective default conditions in preparation for further transmission cycles.

Figure 10:
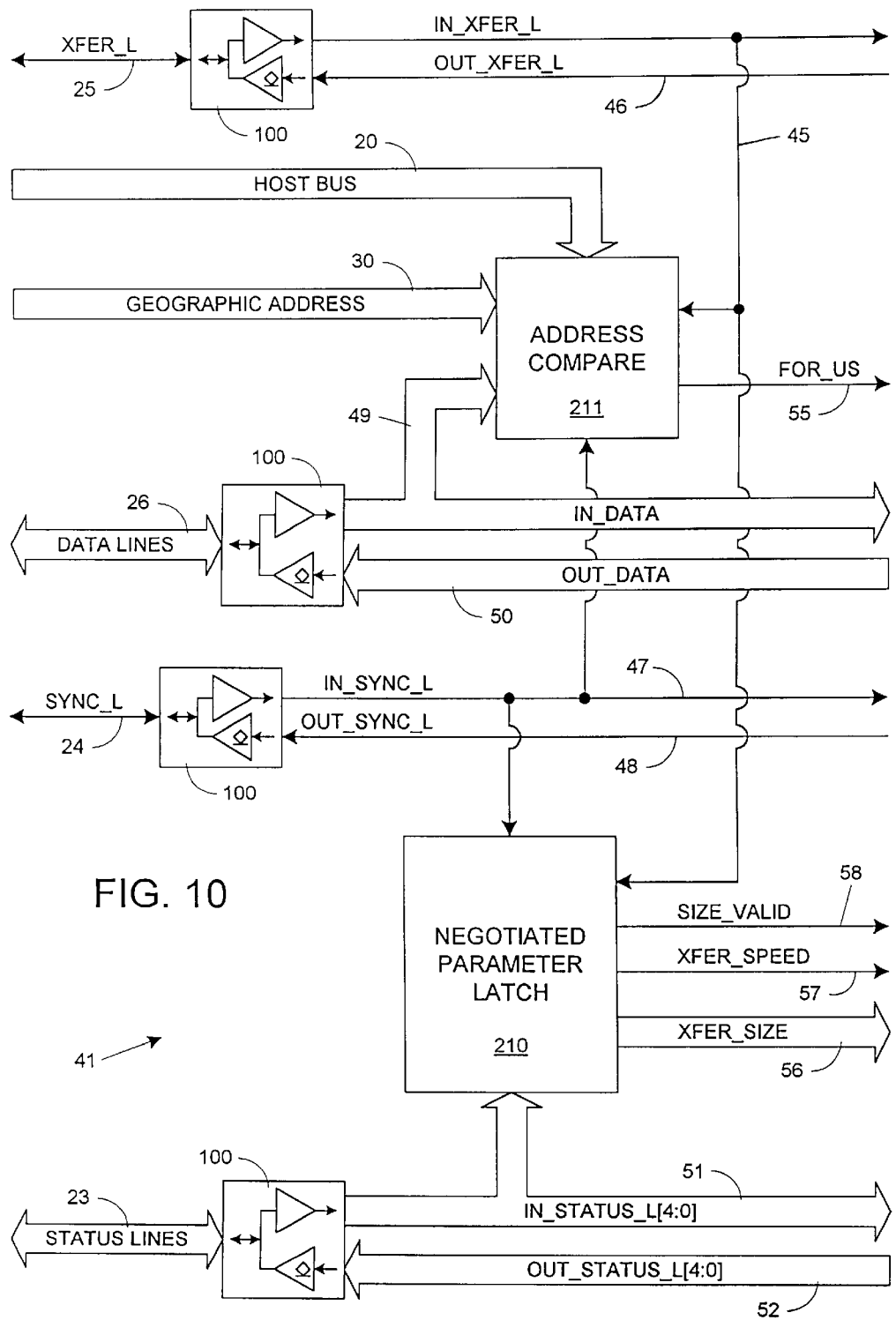
FIG. 10 is a block diagram of the buffer and decoding circuit which forms a part of the interface circuit of FIG. 4.

Referring again to FIG. 4, the data transfer process is carried out by the buffer and decoding circuit 41 and the data transfer logic circuit 42. The construction of the buffer and decoding circuit 41 is shown in FIG. 10, to which reference is now made. The buffer and decoding circuit 41 includes several receiver/driver circuits 100 for buffering the open-drain backplane bus lines XFER_L 25, SYNC_L 24, DATA 26, and STATUS_L 23 between their respective internal input and output lines. In addition, the buffer and decoding circuit 41 includes a negotiated parameter latch circuit 210 for latching the result of the above described data transfer width and speed negotiation.

Figure 11:
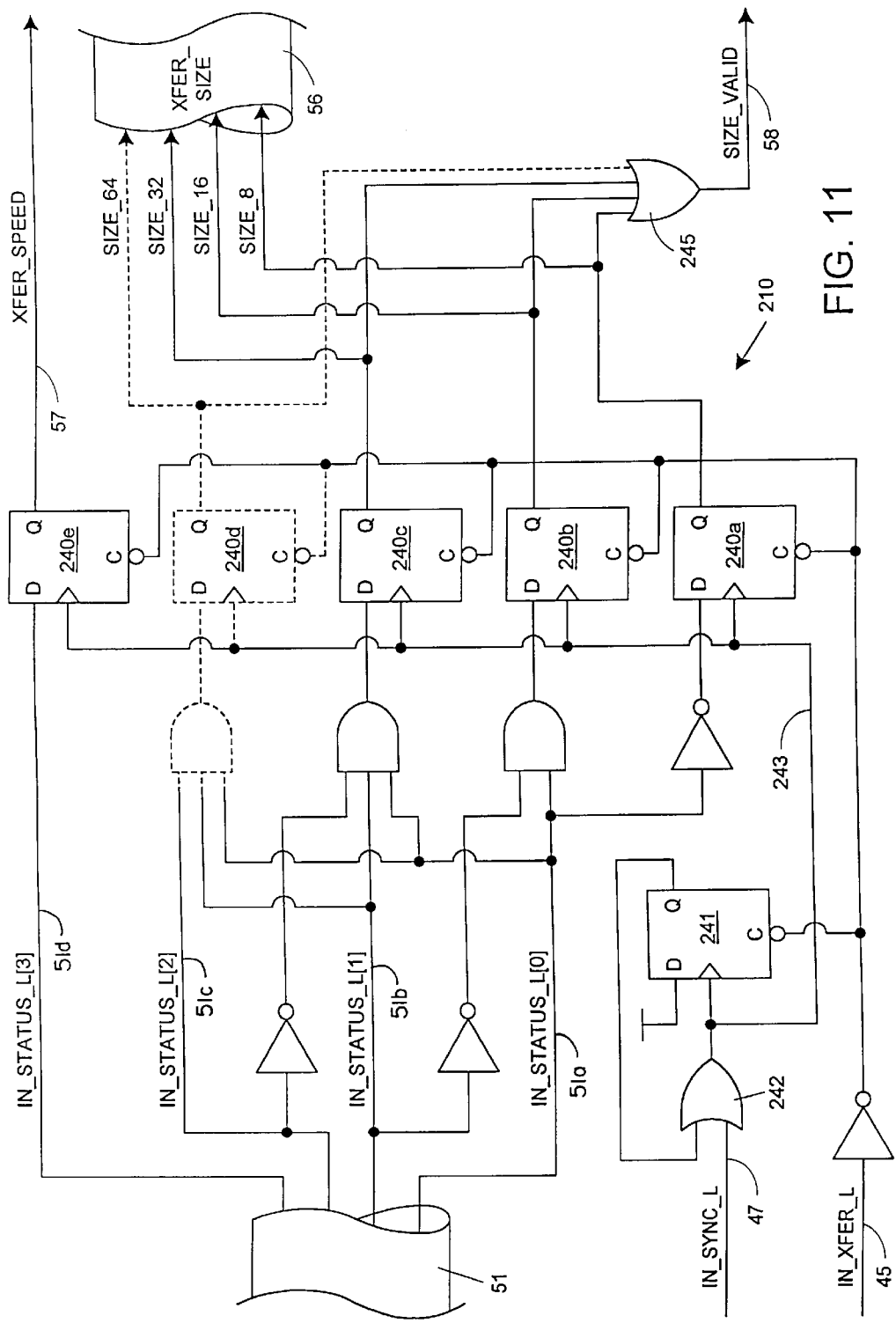
FIG. 11 is a block diagram of the negotiated parameter latch which forms a part of the buffer and decoding circuit of FIG. 10.

Referring to FIG. 11, the negotiated parameter latch circuit 210 includes a set of flip-flops 240a–240c for capturing the outcome of the width negotiation from the IN_STATUS_L[2:0] lines 51a–51c. Since this embodiment principally illustrates a 32-bit module 11, only the data transfer widths of 8, 16 and 32 bits need to be decoded and latched by the flip-flops 240a–240c. An additional flip-flop 240d and associated decoding circuitry are shown in dashed lines to illustrate circuitry as would be included in a 64-bit module 11 to further latch a negotiated outcome indicating a 64 bit transfer. Another flip-flop 240e is included to capture the outcome of the speed negotiation from the IN_STATUS_L[3] line 51d.

The flip-flops 240a–240e are all clocked on the first rising edge of the SYNC_L signal 47. Specifically, another flip-flop 241 and an OR gate 242 produce a signal 243 for clocking the flip-flops 240a–240e on only the first rising edge of the SYNC_L signal 47. Following the first rising edge of the SYNC_L signal 47, flip-flop 241 is set unconditionally, and blocks further transitions of signal 243 for the remainder of the transfer cycle. Flip-flop 240e latches the state of the IN_STATUS_L[3] line 51 at the end of the negotiation phase, and thus produces the XFER_SPEED signal 57 as the Q output. Each of the flip-flops 240d–240a are connected to decoding logic to determine the negotiated width for the current transfer according to width codes described above as presented on the IN_STATUS_L[2:0] lines 51c–51a. The decoding is exclusionary, such that only one of the flip-flops 240d–240a is set for each transfer cycle. The Q outputs of flip-flops 240d–240a are connected to form the XFER_SIZE bus 56 as the individual signals labeled SIZE_64, SIZE_32, SIZE_16, and SIZE_8 which correspond to transfer widths of 64, 32, 16 and 8 bits, respectively. The SIZE_64, SIZE_32, SIZE_16, and SIZE_8 signals are also connected to inputs of an OR gate 245 to produce the SIZE_VALID signal 58. The SIZE_VALID signal 58 will therefore be activated (high logic level) when the selected one of flip-flops 240a–240d is set. Finally, the IN_XFER_L signal 45 is connected through an inverter 246 to the clear input on each of the flip-flops 241 and 240a–240e, and serves to reset the negotiated parameter latch circuit 210 at the end of the transfer cycle, i.e., when the IN_XFER_L signal 45 is released to a high logic level.

Still referring to FIG. 11, it should be noted that the flip-flops 240a–240d and associated circuitry may be varied according to the data transfer width supported by a particular module 11. As previously mentioned, the illustrated embodiment is for a 32 bit module 11 (flip-flops 240a–240c), with the additional flip-flop 240d shown to illustrate a 64-bit module 11. Similarly, an 8-bit module 11 would include only flip-flop 240a, while a 16-bit module 11 would include only flip-flops 240a and 240b. It should also be noted that through hardware failure, a data transfer width wider than that supported by the module 11 can appear on the IN_STATUS_L[2:0] lines 51c–51a (without hardware error, the module 11 would force its own width code as the widest permissible width). If such an error does occur, and a data transfer width wider than that supported by the module 11 does appear on the IN_STATUS_L[2:0] lines 51c–51a, then that module 11 would not include flip-flops corresponding to the wider, erroneous width, and the SIZE_VALID signal 58 would not be activated even though the negotiation is completed. If the SIZE_VALID signal 58 fails to be activated, the message frame is ignored by the data transfer logic circuit 42.

Figure 12:
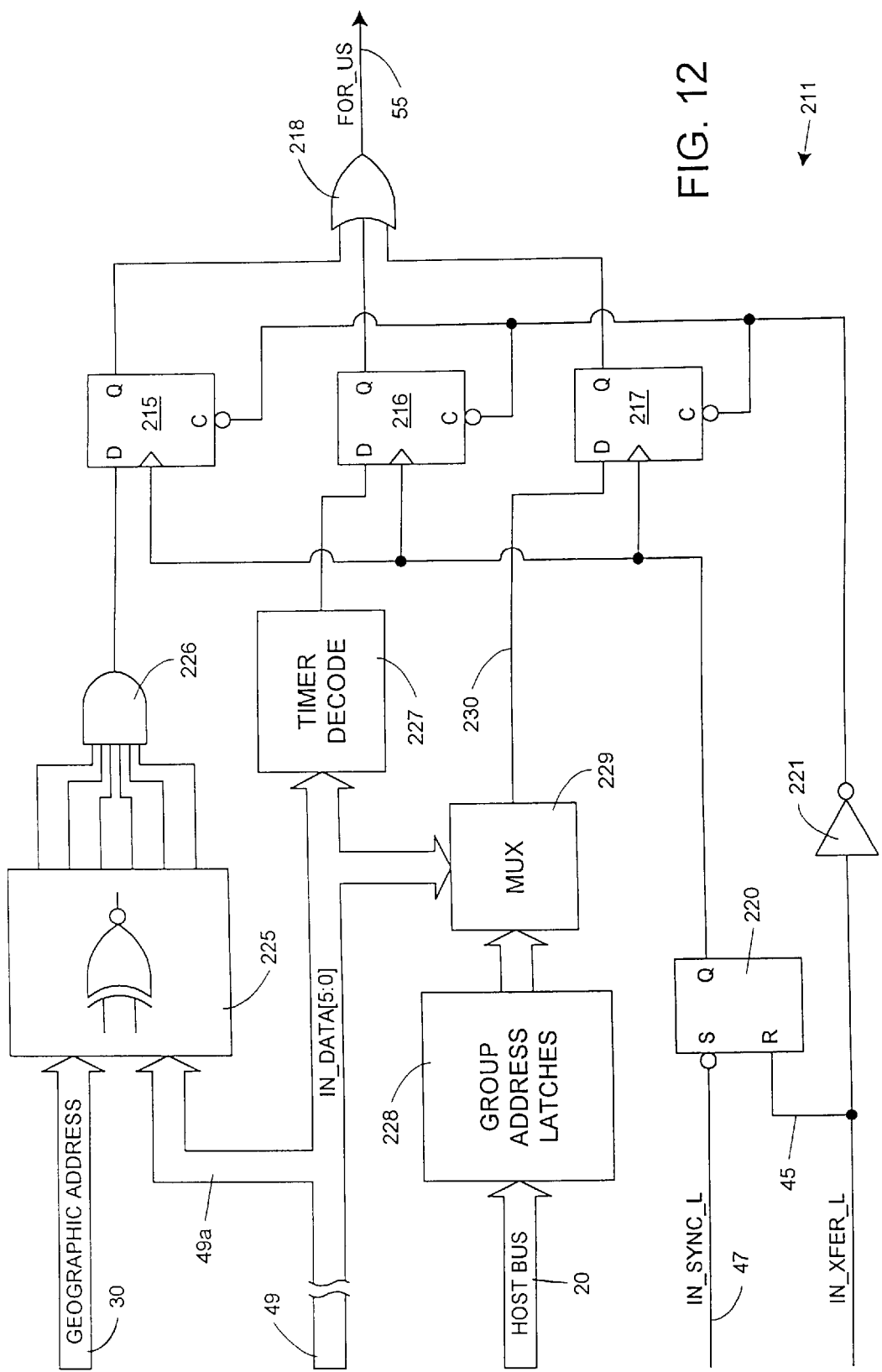
FIG. 12 is a block diagram of the address compare circuit which forms a part of the buffer and decoding circuit of FIG. 10.

Referring to FIGS. 10 and 12, the buffer and decoding circuit 41 also includes an address compare circuit 211 for producing the FOR_US signal 55. A set of three flip-flops 215–217 are provided within the address compare circuit 211 (FIG. 12) for latching three separate destination address conditions. As described above, the destination address 190 for the current message frame includes a 6-bit address designator presented on the six least significant bits of the IN_DATA lines 49 (i.e., IN_DATA[5:0] 49a) during the first bus cycle. The address designator identifies either (a) a single destination module 11 by its rack and slot number, (b) a variably defined group of modules 11 having a common group address, or (c) a fixed group address, such as a "timer" group. The particular destinations indicated by the 6-bit address designator portion of the destination address 190 are listed in the following table:

Destination Address Table

| Address Designator | | Destination Addressed | Address Designator | | Destination Addressed |
|---|---|---|---|---|---|
| 00 0000 | - | Rack 0, Slot 1 | 10 0000 | - | Rack 1, Slot 1 |
| 00 0001 | - | Rack 0, Slot 2 | 10 0001 | - | Rack 1, Slot 2 |
| 00 0010 | - | Rack 0, Slot 3 | 10 0010 | - | Rack 1, Slot 3 |
| . | | . | . | | . |
| . | | . | . | | . |
| . | | . | . | | . |
| 00 1111 | - | Rack 0, Slot 16 | 10 1111 | - | Rack 1, Slot 16 |
| 01 0000 | - | Rack 0, Slot 17 | 11 0000 | - | Rack 1, Slot 17 |
| 01 0001 | - | Rack 0, Slot 18 | 11 0001 | - | Rack 1, Slot 18 |
| 01 0010 | - | Rack 0, Slot 19 | 11 0010 | - | Rack 1, Slot 19 |
| 01 0011 | - | Rack 0, Slot 20 | 11 0011 | - | Rack 1, Slot 20 |
| 01 0100 | - | Timer Group Address | 11 0100 | - | Group Address 12 |
| 01 0101 | - | Group Addres 1 | 11 0101 | - | Group Address 13 |
| 01 0110 | - | Group Address 2 | 11 0110 | - | Group Address 14 |
| 01 0111 | - | Group Address 3 | 11 0111 | - | Group Address 15 |
| . | | . | . | | . |
| . | | . | . | | . |
| . | | . | . | | . |
| 01 1101 | - | Group Address 9 | 11 1101 | - | Group Address 21 |
| 01 1110 | - | Group Address 10 | 11 1110 | - | Group Address 22 (Input Group) |
| 01 1111 | - | Group Address 11 | 11 1111 | - | Group Address 23 (Broadcast Group) |

Still referring to FIGS. 10 and 12, the address compare circuit 211 operates to determine if this module 11 is an addressed recipient of the current message frame, and to set the appropriate one of flip-flops 215–217 according to the address condition from the above table which was successfully decoded. An OR gate 218 combines the Q outputs of the flip-flops 215–217 to produce the FOR_US signal 55, which will become true (high logic level) when any one of the three address conditions is satisfied. The flip-flops 215–217 are all clocked by the output of an R-S latch, which produces a rising edge only on the first falling edge of the IN_SYNC_L signal 47 and is not reset until the current frame is completed (i.e., IN_XFER_L signal 45 deasserts). The IN_XFER_L signal 45 is connected through an inverter 221 to a reset input on each of the flip-flops 215–217, thus enabling the flip-flops 215–217 only when the IN_XFER_L signal 45 is asserted (logic low level). The flip-flops 215–217 are thus enabled during a transmission, and reset (low logic level) between transmissions.

The first flip-flop 215 is set if the receiving module 11 is individually addressed. A set of exclusive-NOR gates 225 are connected to perform a bit-by-bit comparison between the address designator on the IN_DATA[5:0] lines 49a and the module's geographic address on bus 30. The output of each exclusive-NOR gate 225 is connected to one input of an AND gate 226, and the output of AND gate 226 is connected to the D input of flip-flop 215. If the address designator on the IN_DATA[5:0] lines 49a is indeed equivalent to the module's geographic address on bus 30, then the output of AND gate 226 will be true (high logic level) when the flip-flop 215 is clocked during the first bus cycle. Once flip-flop 215 is set, the logic high level on its Q output will force the FOR_US signal 55 true (high logic level), thus indicating that the module 11 is a recipient of the current message frame.

A timer decode circuit 227 connects to the IN_DATA[5:0] lines 49a and provides for fixed decoding of the "timer" group address. Certain groups of messages, such as the timing related messages in the "timer" group, have broad applicability to all modules 11 on the backplane 10, and warrant a dedicated decoding function. Although the timer group is illustrated here, other dedicated groups may be added in a similar fashion. The output of the timer decode circuit 227 is connected to the D input of the second flip-flop 216, and is activated (high logic level) when the bits on the IN_DATA[5:0] lines 49a are equal to the Timer Group Address (i.e., a binary value of '01 0100' as indicated in the Destination Address Table above). If this condition exists when flip-flop 216 is clocked during the first bus cycle, then flip-flop 216 is set and its Q output forces the FOR_US signal 55 true.

The third address condition corresponds to variable group addresses, where the membership of the module 11 in each of the groups is assigned by the host processor 21. The address compare circuit 211 includes a set of group address latches 228 which are interfaced to the host bus 20. Each individual latch within the set 228 corresponds to one of the group addresses from the above Destination Address Table. Using the host bus 20, the host processor 21 is able to control each "group" latch, and either set the latch to include the module 11 in the corresponding group, or clear the latch to exclude the module 11 from that group.

The individual outputs of the latches 228 are applied in parallel to the data inputs of a multiplexer 229. The selection input of the multiplexer 229 is connected to the IN_DATA [5:0] lines 49a. The output of multiplexer 229 on line 230 therefore selects the state of the "group" latch which corresponds to the group address present on the IN_DATA[5:0] lines 49a. The multiplexer 229 should be understood to include decoding circuits (not shown) as would be known in the art to select the proper group latch, since the group addresses shown in the Destination Address Table are not simply linear binary numbers. Similarly, the multiplexer 229 is adapted to produce a false (low logic level) output on line 230 when the IN_DATA[5:0] lines 49a do not in fact contain a valid group address according to the Destination Address Table. The output 230 of multiplexer 229 is applied to the D input of the third flip-flop 217, which will therefore be set when the message frame addresses a group for which the module 11 is a member. In that case, the FOR_US signal 55 is forced true (logic high level), and the message frame will be received.

As a final note on group addressing, some of the groups as shown in the Destination Address Table above may carry special designations, such as the "input group" and the "broadcast group". These special designations indicate the conventional use of the particular group, but do not require membership by the modules 11. Thus, a module 11 may be programmed by the host 21 to receive "broadcast" messages by writing a "1" to the latch for group address 23 in that module 11. In a similar manner, a module 11 could be excluded from receiving broadcast messages in that group, thereby saving the overhead of receiving unneeded messages. All of the general group addresses thus operate in the same, uniform manner, providing a highly flexible group addressing capability. By contrast, note that the dedicated group decoding as described above in relation to the "timer" group can not be overridden by the host processor 21; i.e., membership in that dedicated group is fixed and involuntary.

Figure 13:
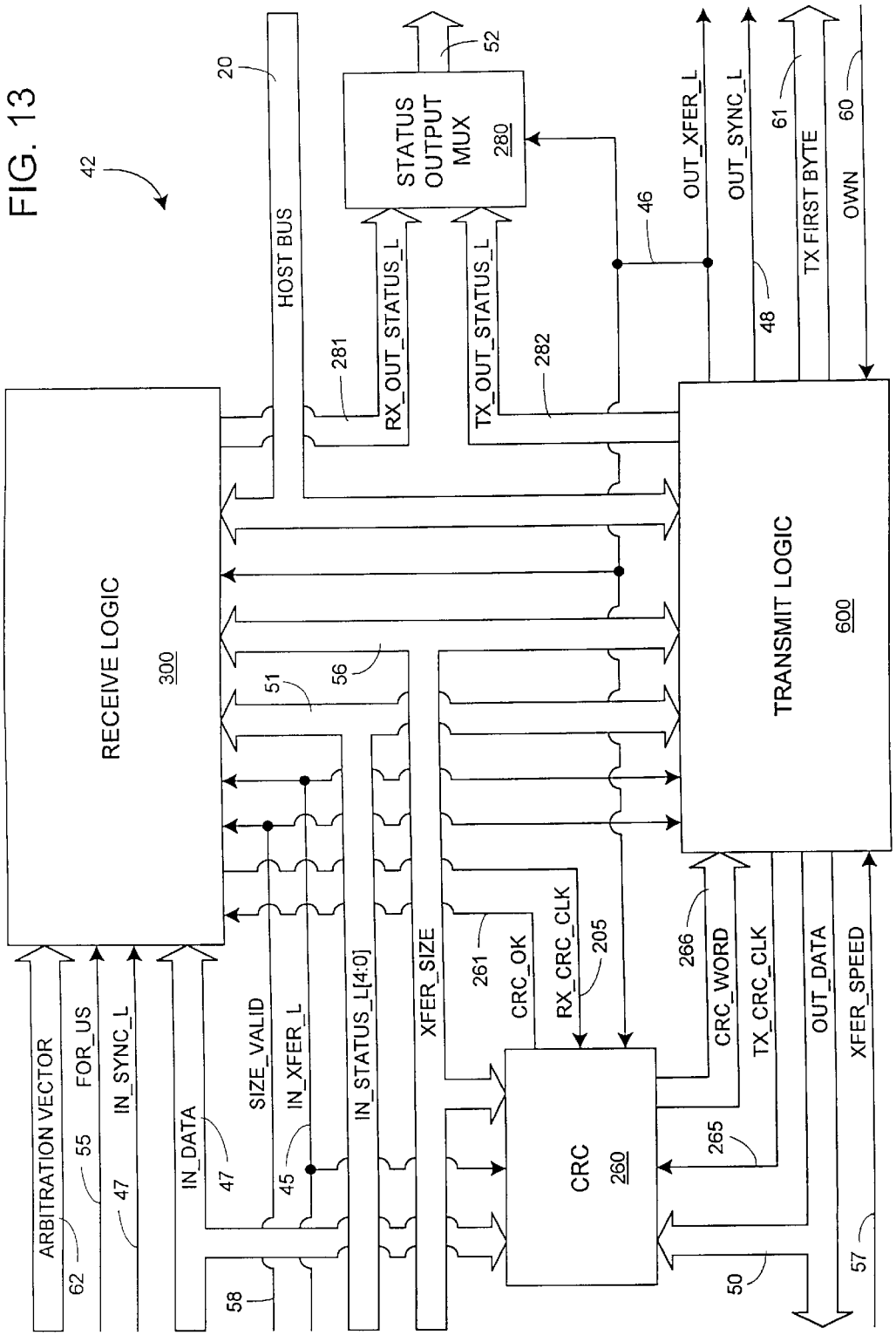
FIG. 13 is a block diagram of the data transfer logic circuit which forms a part of the interface circuit of FIG. 4.

Referring to FIG. 13, the data transfer logic circuit 42 includes a CRC circuit 260, a status output mux circuit 280, a receive logic circuit 300, and a transmit logic circuit 600. The receive logic circuit 300 and transmit logic circuit 600 are principle components of the data transfer logic circuit 42, and are described at length below. The CRC circuit 260 computes a conventional CRC value, and is shared between the receive logic circuit 300 and the transmit logic circuit 600. The IN_XFER_L signal 45 is connected to the CRC circuit 260 as a general reset signal, while the OUT_XFER_L signal 46 indicates to the CRC circuit 260 whether the CRC value should be computed based on input data from the IN_DATA bus 47, or based on output data from the OUT_DATA bus 50. In both cases, the XFER_SIZE bus 56 informs the CRC circuit 260 as to the correct data transfer width for the current transfer, and the CRC is computed on that basis. For reception (OUT_XFER_L signal 46 high), the CRC circuit 260 is clocked by the RX_CRC_CLK signal 205 mentioned above in relation to the timing diagram of FIG. 9. The RX_CRC_CLK signal 205 is actually generated by the receive logic circuit 300 in a manner to be described below. In response, the CRC circuit 260 produces a CRC_OK signal 261 connected back to the receive logic circuit 300 to indicate when the current CRC value is correct. In the case of transmission (OUT_XFER_L signal 46 low), the CRC circuit 260 is clocked by a TX_CRC_CLK signal 265 generated by the transmit logic circuit 600. At each bus cycle during the transmission, the CRC circuit 260 provides the residual value for the CRC back to the transmit logic circuit 600 on a CRC_WORD bus 266. At the end of the transmission, the transmit logic circuit 600 reads the residual value from the CRC_WORD bus 266, and transmits this data as the end of frame CRC value 194 or 195.

Still referring to FIG. 13, the status output mux circuit 280 produces the OUT_STATUS_L[4:0] bus 52 by selecting between either an RX_OUT_STATUS_L bus 281 or a TX_OUT_STATUS_L bus 282. The selection is controlled by the OUT_XFER_L signal 46, such that the RX_OUT_STATUS_L is selected when the OUT_XFER_L signal 46 is false (logic high level), and the TX_OUT_STATUS_L is selected when the OUT_XFER_L signal 46 is true (logic low level). Note that the selection made by the status output mux circuit 280 only selects between transmit and receive lines; each of the receive logic circuit 300 and transmit logic circuit 600 further include circuits to be described below which multiplex the respective RX_OUT_STATUS_L and TX_OUT_STATUS_L busses 281 and 282 as a function of time between the first bus cycle versus subsequent bus cycles as described above.

Figure 14:
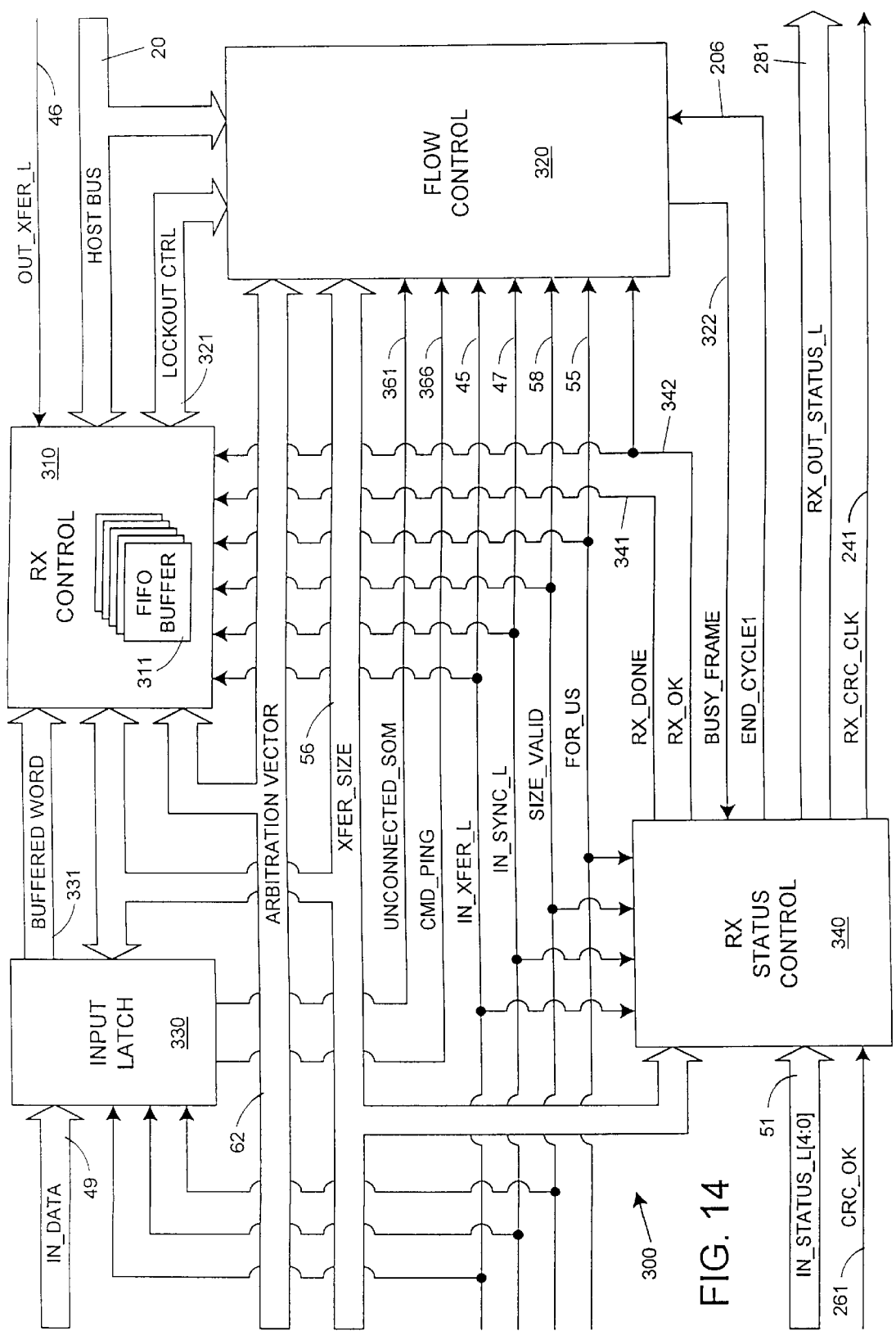
FIG. 14 is a block diagram of the receive logic circuit which forms a part of the data transfer logic circuit of FIG. 13.

Referring to FIG. 14, the receive logic circuit 300 includes an RX control circuit 310 for providing the principal interface to the host processor 21 via the host bus 20. The RX control circuit 310 employs a set of First-In-First-Out (FIFO) buffer memories 311 which are used to temporarily buffer incoming message frames before transferring them to the host processor 21. The orderly and efficient control of input frame buffering is an important advantage of this invention, and is performed under the direction of a flow control circuit 320. The flow control circuit 320 is described fully below, and coordination between the flow control circuit 320 and the RX control circuit 310 is provided by a LOCKOUT CONTROL bus 321.

Again referring to FIG. 14, the RX control circuit 310 receives incoming data from an input latch circuit 330 over a BUFFERED WORD bus 331. The BUFFERED WORD bus 331 is a fixed width bus based on the internal processing width of the interface circuit 15, which presents incoming data to the RX control circuit 310. Normally, the internal processing width of the interface circuit 15 will be at least as large as the transfer width supported by the interface circuit 15. The input latch circuit 330 provides any necessary intermediate buffering to pack fully the BUFFERED WORD bus 331, even if a lesser data transfer width is in use for a particular transfer cycle. By way of example, an interface circuit 15 with an internal processing width of 32 bits would normally employ a 32 bit width for the BUFFERED WORD bus 331. In that case, individual transfer cycles may be performed with 8, 16 or 32 bit widths. For 8 bit transfers, the input latch circuit 330 will pack four bytes from four consecutive bus cycles to form one word on the BUFFERED WORD bus 331. Likewise, two bytes from each of two consecutive bus cycles will be used to form one word on the BUFFERED WORD bus 331 when a 16 bit transfer is in progress, while 32 bit transfers will use all 32 bits from each bus cycle to form the word on the BUFFERED WORD bus 331.

The RX control circuit 310 is connected to the XFER_SIZE bus 56, the SIZE_VALID signal 58, and the IN_SYNC_L signal 47 to control the movement of data from the BUFFERED WORD bus 331 into one of the available FIFO buffers 311. The SIZE_VALID signal 58 indicates that the negotiation for the current transfer width has been completed and is valid on the XFER_SIZE bus 56. The RX control circuit 310 then determines how many bus cycles are required to fully pack each word on the BUFFERED WORD bus 331 based on the knowledge of the width of the BUFFERED WORD bus 331 and the indication of the current transfer width from the XFER_SIZE bus 56. Once the packing factor is determined, words from the BUFFERED WORD bus 331 are transferred to one of the FIFO buffers 311 accordingly (e.g. every pulse of IN_SYNC_L 47, every second pulse of IN_SYNC_L 47, every fourth pulse of IN_SYNC_L 47, etc.).

Still referring to FIG. 14, the RX control circuit 310 is enabled to receive a message frame by activation of the FOR_US signal 55. If a FIFO buffer 311 is available, the contents of the arbitration vector 62 are copied into buffer 311, indicating the source address of the transmitting module 11 and the priority of the message. As noted above, the arbitration vector 62 is available immediately at the start of the transmission, and is not part of any data transmission during the transfer cycle itself. If a FIFO buffer 311 is not available, the message frame will be refused by returning a "busy" indication back to the sender. The "busy" indication is formed as a BUSY_FRAME signal 322 by the flow control circuit 320, and is sent back to the message originator by an RX status control circuit 340 via the RX_OUT_STATUS_L lines 281.

Assuming that a FIFO buffer 311 is available, the RX control circuit 310 stores the arbitration vector 62 as noted above, and then begins sequentially transferring data words from the BUFFERED WORD bus 331 into the allocated FIFO buffer 311 for as long as data continues to be transmitted. The end of the transmit cycle is detected by the RX status control circuit 340, which activates an RX_DONE signal 341 to indicate the same. Also at the end of the transmit cycle, the RX status control circuit 340 further performs CRC verification and other status checks (described below), and activates an RX_OK signal 342 if the message frame was received without error. Upon receiving the RX_DONE and RX_OK indications 341 and 342, respectively, the RX control circuit 310 notifies the host processor 20 as to the receipt of the message frame, and allows transfer of the frame data from the appropriate FIFO buffer 311 to the host processor 21 via the host bus 20.

The RX control circuit 310 also receives the IN_XFER_L signal 45 as a general enabling signal during a transmission cycle, and as a general reset signal between transmission cycles. The OUT_XFER_L signal 46 is used by the RX control circuit 310 to detect when the active transmission cycle is outgoing from the current module 11. In that case, receipt of the message frame is suppressed, unless a loopback capability is also provided and enabled.

Figure 15A:
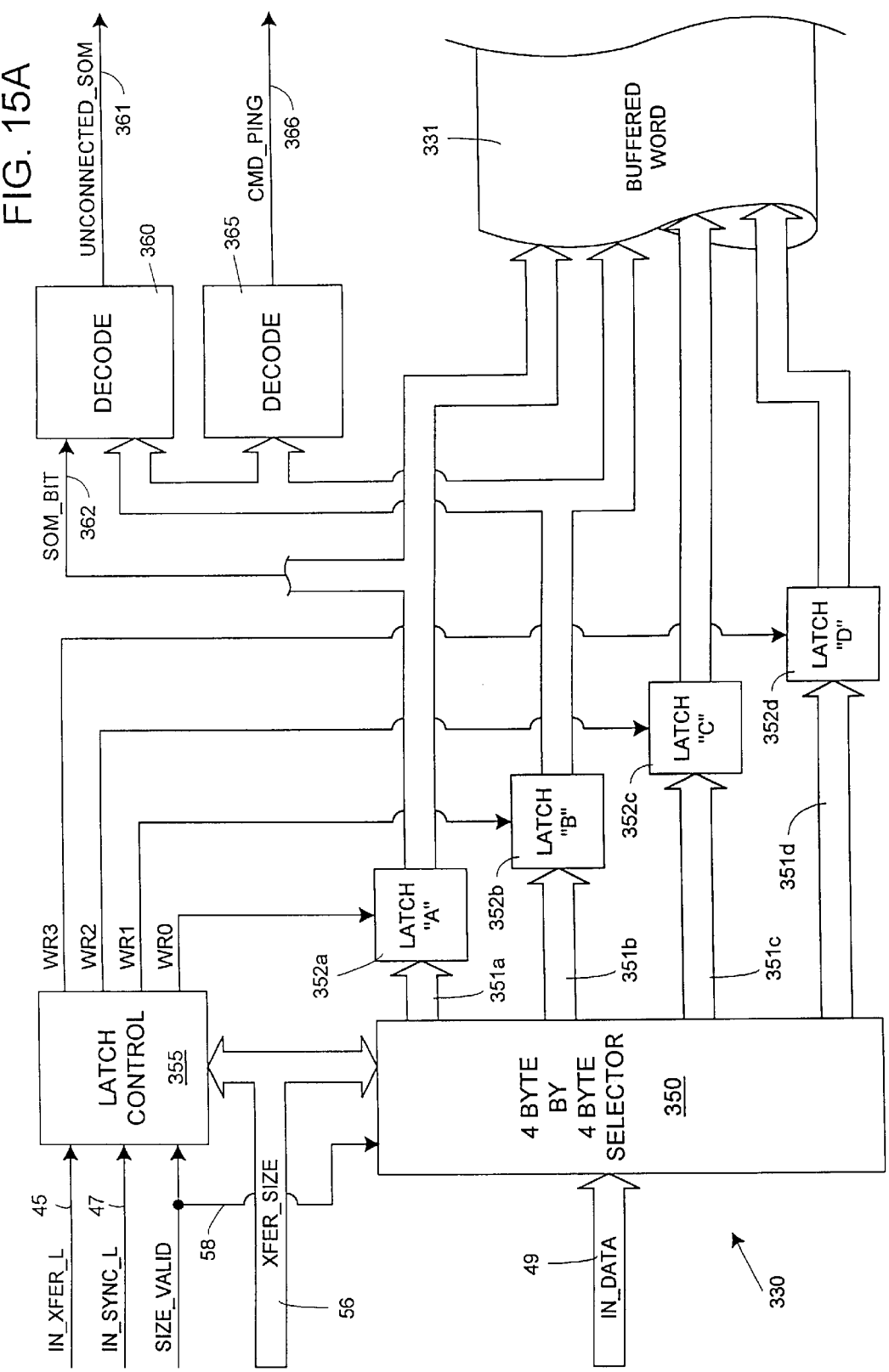
FIG. 15A is a block diagram of the input latch circuit which forms a part of the receive logic circuit of FIG. 14.

Referring now to FIG. 15A, the input latch circuit 330 receives data from the backplane bus 12 over the IN_DATA bus 49, and applies this data as an input to a 4 byte by 4 byte selector circuit 350. The 4 byte by 4 byte selector circuit 350 divides the input data from the IN_DATA bus 49 between output busses 351a–351d. Each of the output busses 351a–351d has a fixed width of one byte (8 bits), and the 4 byte by 4 byte selector circuit 350 thus operates to rearrange bytes from the IN_DATA bus 49 on a byte-by-byte basis. Each output bus 351a–351d is applied as an input to respective latch circuits "A" through "D" 352a–352d. The latch circuits 352a–352d are each clocked by respective "write" strobe signals WR0–WR3 generated by a latch control circuit 355. The strobe signals WR0–WR3 are individually timed to operate in conjunction with the 4 byte by 4 byte selector circuit 350 to assemble input bytes into the latches 352a–352d in proper order for application to the BUFFERED WORD bus 331.

The mapping performed by the 4 byte by 4 byte selector circuit 350 is based upon the negotiated width for the current transfer as presented on the XFER_SIZE bus 56 and the width of the BUFFERED WORD bus 331. The exemplary illustration in this embodiment is based on a 32 bit width for the BUFFERED WORD bus 331, and therefore uses four output busses 351a–351d and four latches 352a–352d. Another example based on an 8 bit width for the BUFFERED WORD bus 331 is presented below, while implementations based on other widths for the BUFFERED WORD bus 331 would be apparent to those skilled in the art from the descriptions herein.

Referring to FIGS. 15A and 15B, the latch control circuit 355 is connected to receive the IN_XFER_L signal 45, the IN_SYNC_L signal 47, the SIZE_VALID signal 58, and the XFER_SIZE bus 56. The IN_XFER_L signal 45 enables the latch control circuit 355 when active (logic low level) during the transmission cycle, and resets the latch control circuit 355 when deactivated (logic high level) between transmission cycles. Resetting of the latch control circuit 355 between transmission cycles is important because generation of the write strobe signals WR0–WR3 is performed on a sequential basis by counting bus cycles, beginning with the start of the transmission as bus cycle number one. Resetting the latch control circuit 355 therefore establishes the starting point for sequencing the write strobe signals WR0–WR3. After reset, the latch control circuit 355 counts bus cycles based upon activation of the IN_SYNC_L signal 47. The write strobes WR0–WR3 are timed to latch data into the respective latches A–D on the appropriate falling edge of the IN_SYNC_L signal 47, and the same falling edge of the IN_SYNC_L signal 47 is used to advance the bus cycle count.

Referring primarily to FIG. 15B, the particular generation of the write strobe signals WR0–WR3 by the latch control circuit 355 and the operation of the 4 byte by 4 byte selector circuit 350 are shown in table form. On the first active edge of the IN_SYNC_L signal 47, the SIZE_VALID signal 58 will be false (low logic level). At this point, the ultimate width that will be negotiated for the transfer has not yet been determined. Therefore, data is latched according to the widest possible format by applying each byte from the IN_DATA bus 49 in parallel to the respective latches 352a–352d, and simultaneously activating all write strobes WR0–WR3. Some of the data latched in this manner during cycle one may not be usable and therefore discarded later. For example, the transmitting module might only be transmitting one or two bytes per bus cycle, in which case the upper two bytes (i.e., IN_DATA[31:16]) would be undefined. Similarly, some bytes may be overwritten in later bus cycles, even if valid data was present in the first bus cycle. That case may occur, for example, when the transmitting module 11 indeed is capable of transmitting all four bytes in parallel, but the data transfer width is later negotiated to be a reduced width by another module 11, such as one or two bytes. In that case, the high order bytes are re-transmitted in later cycles on lower order lines in the IN_DATA bus 49. The operation of the latch control circuit 355 and the 4 byte by 4 byte selector circuit 350 for various combinations of data transfer widths will be understood from the following description of the second and subsequent bus cycles.

Still referring to FIG. 15B, all ambiguity in the data transfer width is resolved following the first bus cycle when the negotiation therefor is complete and the SIZE_VALID signal 58 is activated (logic high level). At that time, further operation of the 4 byte by 4 byte selector circuit 350 is dependent upon the data transfer width indicated by the XFER_SIZE bus 56. Each of the possible cases for data transfer width (8, 16, or 32 bit width) is shown as one column under the "SIZE_VALID=TRUE" heading, and is discussed in turn below.

If the SIZE_8 line in the XFER_SIZE bus 56 is activated (logic high level), then an 8 bit, single byte transfer is in progress. As soon as the SIZE_VALID signal 58 is activated, the 4 byte by 4 byte selector circuit 350 responds to the active state of the SIZE_8 line by connecting all of the output busses 351a–351d to the low order byte of the IN_DATA bus 49. The first byte of the message was automatically latched into latch A during the first bus cycle as described above. Then in the second bus cycle, strobe WR1 is activated to fill latch B with the second message byte. Strobe WR2 loads latch C in the third cycle, and WR3 places the fourth message byte in latch D. At that point, the buffered word on bus 331 is complete, and is transferred into a FIFO buffer 311 by the RX control circuit 310 (FIG. 14), and the latches 351a–351d are ready to acquire more data. In the fifth bus cycle, latch A is loaded with the fifth message byte, then latch B, latch C, and so on. Every fourth byte, the BUFFERED WORD bus 331 is filled, transferred to FIFO, and the cycle repeated.

For a 16 bit transfer width, the SIZE_16 line in the XFER_SIZE bus 56 is activated. The 4 byte by 4 byte selector circuit 350 then routes the low order input byte (IN_DATA[7:0]) to latches A and C on output busses 351a and 351c, respectively, and routes the second order byte (IN_DATA[15:8]) to the other latches B and D on output busses 351b and 351d, respectively. With this alternating arrangement, two bytes are transferred per bus cycle, being first loaded into latches A and B in the first bus cycle, and then being loaded into latches C and D in the second bus cycle. Thereafter, strobes WR0 and WR1 are activated on odd bus cycles, while strobes WR2 and WR3 are activated on even bus cycles. The BUFFERED WORD bus 331 will be complete after the even numbered cycles, and transferred to a FIFO buffer 311 at that time.

Finally, a 32 bit transfer width is indicated by activation of the SIZE_32 signal in the XFER_SIZE bus 56. In this case, the bytes from the IN_DATA bus 49 are routed straight through to respective latches A–D, and each strobe WR0–WR3 is activated on every bus cycle. Every bus cycle also completely fills the BUFFERED WORD bus 331, which is likewise transferred to a FIFO buffer 311 on every bus cycle. This embodiment has illustrated the operation of a 32 bit module in accommodating either full width or reduced width data transfers. The operation of modules 11 which support even wider data transfers, such as the 64 bit transfers contemplated by this invention, would be implemented as an extension of the above described embodiment.

Referring again to FIG. 15A, the input latch circuit 330 also includes decode circuits 360 and 365 for detecting specific command code conditions for an incoming message frame. As described above, the second byte of each message frame contains a command code 191 that indicates the type of frame which is being transmitted. Two specific frame types are utilized according to the invention for flow control purposes, and the presence of these frame types is decoded by the circuits 360 and 365.

The first frame type is decoded by circuit 360, and corresponds to an unconnected start-of-message (SOM) frame. Messages used in a system according to the invention are generally considered either "connected" or "unconnected". The set of connected messages contains messages for which resources are pre-allocated within the host processor 21 for timely processing of those messages. These resources include buffer space, control blocks, and processing time, and thus guarantee that connected messages may be received and processed without overloading the host processor 21. Mechanisms are contemplated within the invention for controlling the flow of connected messages, and those mechanisms are addressed in a later section. For unconnected messages, the interface circuit 15 includes a fixed amount of uncommitted resources which may be used to process unconnected messages so long as available resources are not exceeded. Other flow controls are also described below for determining whether or not resources for an unconnected message are available, and these flow controls determine whether to accept or reject the message. The decode circuit 360 detects a frame which starts an unconnected message and activates an UNCONNECTED_SOM signal 361 in order to inform the flow control circuits that an unconnected start-of-message frame is currently being received.

Activation of the UNCONNECTED_SOM signal 361 is performed by the decode circuit 360 dependent upon two conditions. The first condition is that the command byte 191 for the frame contains a code which specifies one of the "unconnected" message types mentioned above in relation to FIG. 8 (i.e., messages for which a control block is not preallocated in the receiving module 11). The other condition for activating the UNCONNECTED_SOM signal 361 is that the frame is a "start-of-message" frame. As noted above, messages which are too long to transmit in a single frame are divided into multiple frames which are transmitted sequentially. If multiple frames are used for a single message, the start-of-message bit (bit 6 of the first, or Destination Address byte per FIG. 8 above) is set true only for the first frame. Frames of the same message which follow the first frame will have the same command code value 191, but will have the start-of-message bit reset. Of course, messages which require only a single frame will still have the start-of-message bit set in that single message frame.

Consequently, detection of a start-of-message frame for an unconnected message requires both the input of bit 6 from the first message byte (start-of-message indication), as well as the command code 191 contained in the second message byte. As described above, the first message byte is routed into latch A 352a, and the second message byte is routed into latch B 352b. These byte assignments are always valid, regardless of the negotiated data transfer width, although the second byte may not be received until the second bus cycle. However, the decode circuit 360 only detects the requisite bit patterns, and the timing for use of the UNCONNECTED_SOM signal 361 is described later. The decode circuit 360 inputs bit 6 from latch A 352a as an SOM_BIT 362, which will be set (logic high level) if the current frame is indeed a start-of-message frame. The decode circuit 360 also connects to all eight bits output from latch 352b. The UNCONNECTED_SOM signal 361 is then activated when both the SOM_BIT 362 is true (logic high level) and the output of latch B 352b contains a command code corresponding to one of the unconnected message codes.

Still referring to FIG. 15A, the other decode circuit 365 also connects to the output of latch B 352b and detects a command code 191 corresponding to a "ping" command (in this embodiment, a hex code of '1F' is used to represent the PING command). The output of decode circuit 365 is provided as a CMD_PING line 366, and is used below to force a "busy" condition for flow control purposes. The ping command may thus be used, for example, to verify to the sender that the receiver is still functioning.

Figure 15C:
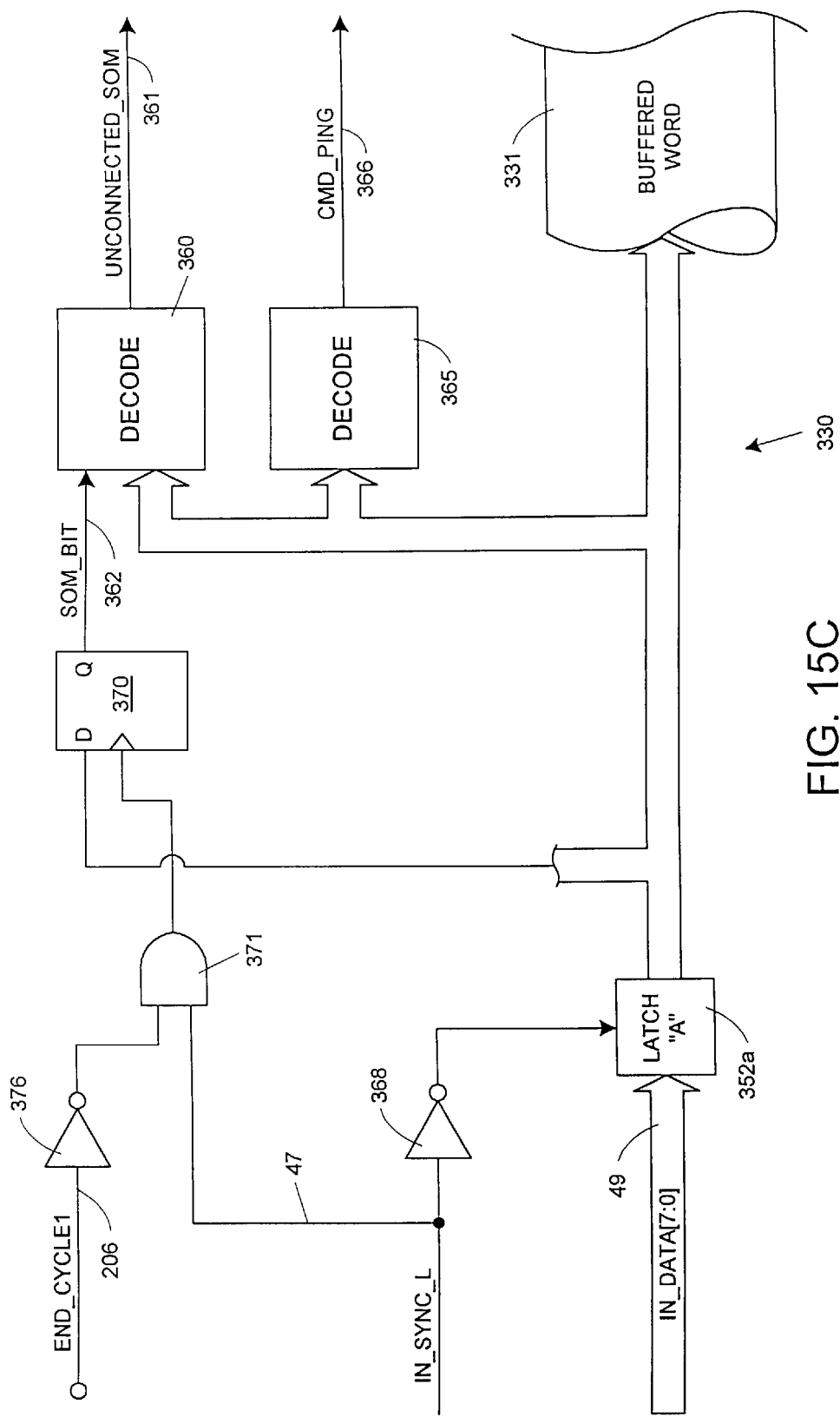
FIG. 15C is a block diagram of an alternate embodiment for the input latch circuit which forms a part of the receive logic circuit of FIG. 14.

Referring now to FIG. 15C, an alternate embodiment for the input latch circuit 330 may be greatly simplified if the interface circuit 15 employs an 8 bit internal processing width. In that case, the BUFFERED WORD bus 331 is also only 8 bits wide, and only a single latch, latch A 352a, is needed, since all data transfers in which this simplified module 11 participates will be forced to have a negotiated data transfer width of 8 bits. Because each bus cycle will transfer exactly one byte, the latch 352a may be clocked directly by the falling edge of the IN_SYNC_L signal 47 via inverter 368, and the low order data on the IN_DATA [7:0] lines 49 may be applied directly to the input of latch A 352a. Neither the latch control circuit 355 nor the 4 byte by 4 byte selector circuit 350 are needed.

However, there is one complication in the use of the simplified 8 bit circuit of FIG. 15C, in that the start-of-message bit from the first message byte must be separately buffered during the first bus cycle to permit subsequent combination with the command code 191 from the second bus cycle in order to decode the UNCONNECTED_SOM signal 361. This is accomplished by using a separate flip-flop 370 with a D input connected to bit 6 from the output of latch A 352a. The flip-flop 370 is clocked by the output of an AND gate 371. One input of the AND gate 371 is connected to the IN_SYNC_L signal 47, while the other input of AND gate 371 is connected to the END_CYCLE1 signal 206 through an inverter 376. The END_CYCLE1 signal 206 is generated within the RX status control circuit 340 in a manner described below, and is asserted (high logic level) at the end of the first bus cycle and remains asserted thereafter for the remainder of the transfer cycle (FIG. 9). Thus, the output of AND gate 371 produces a single rising edge to clock the flip-flop 370 on the first rising edge of the IN_SYNC_L signal 47, i.e., after the first data byte has been loaded into latch A 352a on the first falling edge of the IN_SYNC_L signal 47. The flip-flop 370 thus captures the SOM bit from the first data byte in latch A 352a, and applies the Q output as the SOM_BIT 362 to the decode circuit 360.

Figure 16:
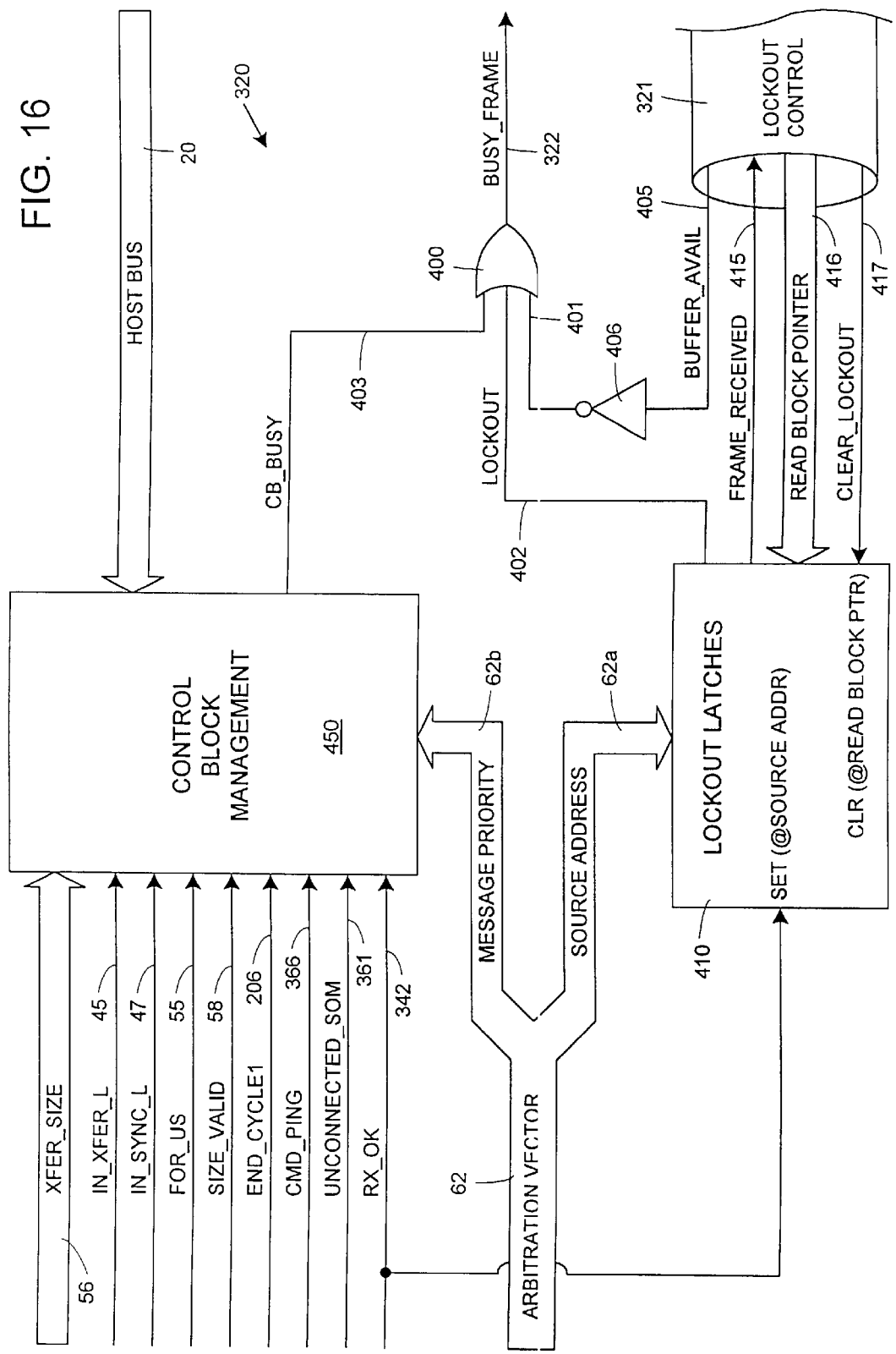
FIG. 16 is a block diagram of the flow control circuit which forms a part of the receive logic circuit of FIG. 14.

Referring now to FIGS. 14 and 16, the detailed operation of the flow control circuit 320 will now be described. The principal function of the flow control circuit 320 is to produce the BUSY_FRAME signal 322. The BUSY_FRAME signal 322 is activated by the flow control circuit 320 if the receiving module 11 is currently unable to accept the incoming message frame. In all, three separate conditions are evaluated as the resource availability criteria, and the failure of the receiving module 11 to meet any one of the criteria leads to refusal of the incoming message. As shown in FIG. 16, the BUSY_FRAME signal 322 is connected as the output of a three input OR gate 400, where each of the three inputs 401–403 of OR gate 400 represents one of the three conditions for generating a "busy" indication on the BUSY_FRAME signal 322, and thus refusing reception of the incoming message.

The first condition which will result in a busy condition is the lack of an available FIFO buffer 311 in the RX control circuit 310, as mentioned above in relation to FIG. 14. A BUFFER_AVAIL signal 405 is included as one of the signals in the LOCKOUT CONTROL bus 321, and is activated (logic high level) by the RX control circuit 310 when one of the FIFO buffers 311 is available for allocation to an incoming message. The BUFFER_AVAIL signal 405 is applied t hrough an inverter 406 to input 401 of OR gate 400. If no buffer 311 is available, the BUFFER_AVAIL signal 405 is false (logic low level), which applies a logic high level to the input 401 of OR gate 400, which in turn activates (logic high level) the BUSY_FRAME signal 322.

The second condition for returning a busy indication is referred to as a "lockout" condition. According to the invention, once a message frame has been received from a particular module 11, then that particular module 11 is "locked out" from further reception until the current message has been processed through the interface circuit 15. This form of flow control prevents any one module 11 from saturating the interface circuit 15 and host processor 21. The flow control afforded by the invention also prevents a transmitting module 11 from sending a new frame before the preceding frame has been processed. A set of lockout latches 410, also referred to herein as a lockout circuit 410, is used to keep tarack of which frames have been received, indexed by the source address of the module which transmitted the frame. This lockout condition applies to both connected and unconnected sources.

The lockout circuit 410 is connected to the low order six bits of the arbitration vector 62, which contain the source address 62a of the module 11 which is currently transmitting. The source address bus 62a selects one latch within the lockout circuit 410 which corresponds to the transmitting source module 11. The lockout circuit 410 has a SET input connected to the RX_OK signal 342. If the incoming message frame is received to completion without error, the RX_OK signal 342 will be activated at the end of the transmission and cause the latch selected by the source address 62a to be set.

The lockout circuit 410 includes additional logic (not specifically shown) which activates a FRAME_RECEIVED signal 415 whenever any one of the latches in the lockout circuit 410 is set. The FRAME_RECEIVED signal 415 is included as one of the signals in the LOCK-OUT CONTROL bus 321, and serves to inform the RX control circuit 310 that at least one FIFO buffer 311 contains a validly received frame. The RX control circuit 310 may then begin processing the frames residing in the FIFO buffers 311 by tra nsferring the frame data to the host processor 21. While reading the contents of a frame buffer 311 for transfer to the host processor 21, the RX control circuit 310 asserts the source address of the frame being processed on a READ BLOCK POINTER bus 416 which forms a part of the LOCKOUT CONTROL bus 321. When the RX control circuit 310 has completed transferring the contents of the FIFO buffer 311 to the host processor 21, the RX control circuit 310 activates a CLEAR_LOCKOUT signal 417 to indicate that the FIFO buffer 311 addressed by the READ BLOCK POINTER bus 416 has been successfully transferred to the host processor 21, and that the corresponding sending module 11 is no longer locked out; i.e., the receiver may again receive data from that module. The CLEAR_LOCKOUT signal 417 is connected via the LOCKOUT CONTROL bus 321 as an input to the lockout circuit 410, and causes the latch corresponding to the READ BLOCK POINTER bus 416 to be cleared back to a reset condition.

While a message is being received, the source address 62a selects the latch corresponding the source address transmitting, and the output of that selected latch is applied as a LOCKOUT output to the input 402 of OR gate 400. If the incoming message is from a source address for which the corresponding latch in the lockout circuit 410 has been set, but not yet cleared by the CLEAR_LOCKOUT signal 417, then the LOCKOUT output 402 is activated, which in turn forces the BUSY_FRAME signal 322 to be activated (high logic level). This results in refusal of the incoming message from that particular source address until such time as the above described processing of the previous message frame, and clearing of the lockout condition, has been accomplished.

Still referring to FIG. 16, the third condition for producing a busy indication is generated as a "control block busy" (CB_BUSY) signal 403 connected to an input of OR gate 400. The CB_BUSY signal 403 is output from a control block management circuit 450, which is used to manage the flow of unconnected messages based on the availability of control blocks allocated by the host processor 21. The host processor 21 may be an embedded microprocessor or other controller with a limited amount of memory which can be used for message processing. For each message received, the host processor 21 must allocate a control block to maintain the parameters associated with the reception as is known in the art. Control blocks for "connected" messages are preallocated for those messages which are expected to be received on a repetitive basis. As mentioned above, a pool of other control blocks is reserved for the receipt of "unconnected" messages. The control block management circuit 450 according to the invention provides for utilization of this pool of available control blocks, while at the same time providing positive control over message flow to ensure that the available resources are not exceeded.

As another aspect of the invention, the management of control blocks is further based upon the priority of an incoming unconnected message frame. The high order two bits 62b of the arbitration vector 62 are applied to the control block management circuit 450 to indicate the actual priority of the incoming message. This priority is used to determine whether or not to allocate one of the available control blocks to the incoming message. Specifically, the highest priority messages will always be accepted as long as there is any available control block remaining. Lesser priority messages, on the other hand, may be refused as "busy" when there are only a few available control blocks remaining, thus preserving the last few remaining control blocks for the potential future receipt of higher priority messages. The complete operation of the control block management circuit 450 will now be described in relation to FIG. 17.

Figure 17:
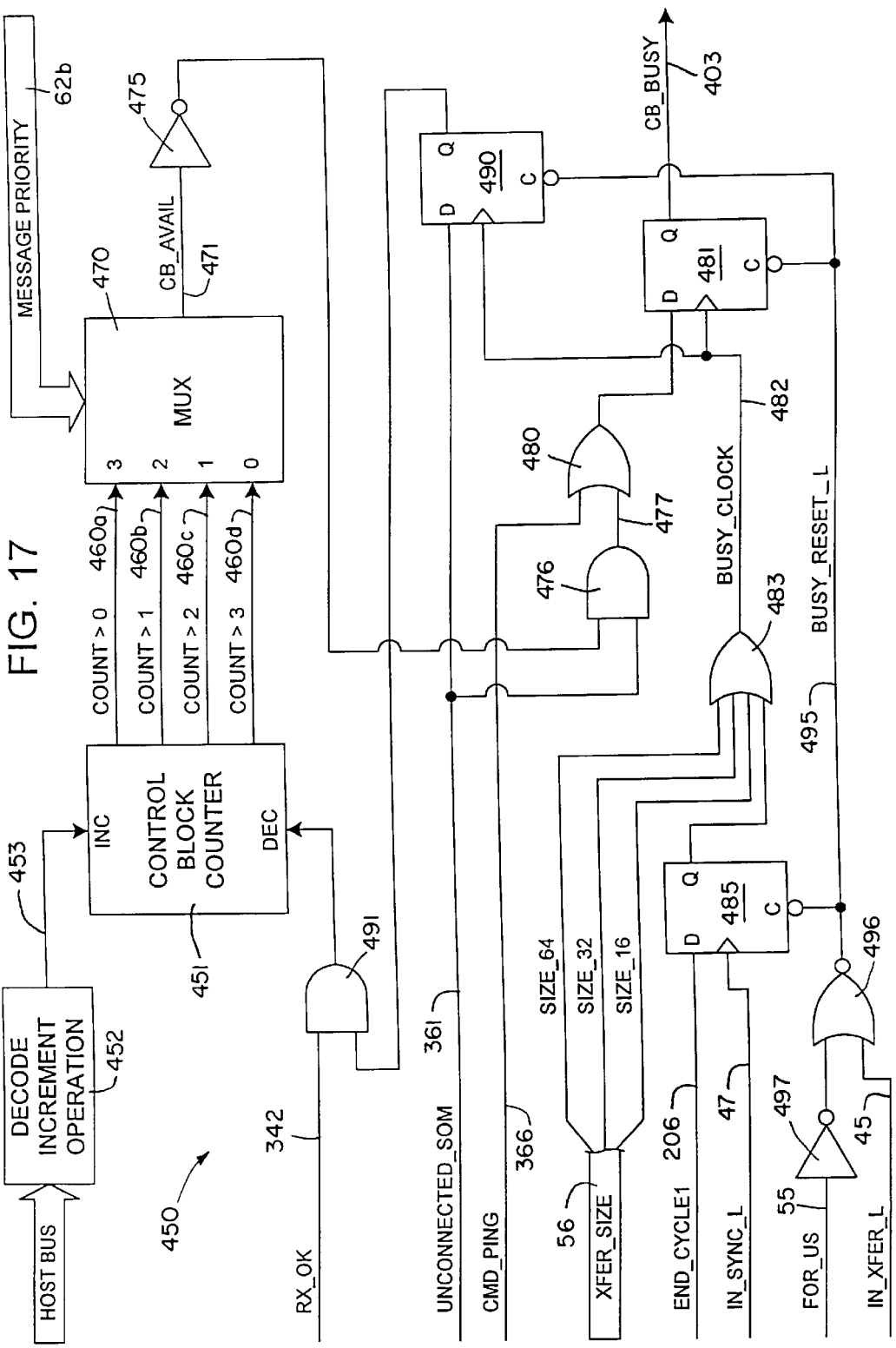
FIG. 17 is a block diagram of the control block management circuit which forms a part of the flow control circuit of FIG. 16.

Referring to FIGS. 16 and 17, the control block management circuit 450 includes a control block counter circuit 451 which maintains a running count of the number of control blocks allocated by the host processor 21. The host processor 21 is able to increment the count contained in the control block counter circuit 451 by issuing an appropriate "increment" operation on the host bus 20, such as a "write" operation to a predetermined address. A decode circuit 452 is connected to the host bus 20, and activates an output line 453 when the "increment" operation is generated by the host processor 21. The output line 453 is connected to an increment, or "INC" input on the control block counter circuit 451, and serves to increment the count contained in the control block counter circuit 451 by one each time that the "increment" operation is performed by the host processor 21. When the interface circuit 15 is first powered up, the count contained in the control block counter circuit 451 is automatically reset to zero. The host processor 21 may then increase the count sequentially by issuing a number of "increment" operations. The count is incremented in that manner until it is equal to the number of buffers that the host processor has allocated for unconnected messages.

The control block counter circuit 451 also includes a decrement, or "DEC" input, which is activated in a manner described below whenever a valid, unconnected message is received. The DEC input thus serves to reduce the count contained in the control block counter circuit 451 by one, reflecting the availability of one less control block. When the host processor 21 has completed processing of that input message, and the allocated control block has been freed up, then the host processor 21 may again issue an "increment" operation to increase the count in the control block counter circuit 451 to reflect the availability of the control block just released.

The output of the control block counter circuit 451 is provided on a set of lines 460a–460d which indicate the number of available control blocks remaining. The lines 460a–460d are decoded within the control block counter circuit 451 to indicate successively increasing count thresholds corresponding to count values of zero, one, two and three, respectively. Specifically, the "count>0" output 406a is true (logic high level) whenever the count contained by the control block counter circuit 451 is greater than zero. Likewise, the "count>1" output 406b is true (logic high level) whenever the count contained by the control block counter circuit 451 is greater than one. The "count>2" output 460c indicates a count greater than two, and the "count>3" output 460d indicates a count greater than three.

The output lines 460a–460d are connected as inputs to a multiplexer circuit 470. The select input of the multiplexer 470 is connected to the two bit message priority code 62b portion of the arbitration vector 62. Accordingly, the message priority code 62b of the incoming message selects one of the threshold output lines 460a–460d, and the selected line is coupled through to a "control block available" (CB_AVAIL) output 471 of the multiplexer 470. The CB_AVAIL signal 471 will therefore be true (high logic level) based on a combination of the message priority and the count of control blocks remaining. Specifically, messages with the lowest priority of "0" will result in a true output on the CB_AVAIL output 471 only if four or more control blocks are remaining. The second lowest priority of "1" requires three or more remaining control blocks, while messages of priority "2" require a count of at least two. The highest message priority of "3" selects the "count>0" line 406a, such that priority 3 messages will cause a true output on the CB_AVAIL output 471 as long as any control blocks remain. Of course, once the control block counter circuit 451 has decremented down to zero, all of the outputs 460a–460d will be false, and the CB_AVAIL output 471 will also be false no matter what priority code is present on bus 62b.

As a result of this priority based threshold selection according to the invention, unconnected messages will continue to be allocated control blocks until the count of available control blocks is decremented down to low levels of from zero to four blocks remaining. From then on, allocation of control blocks is provided on a prioritized basis, such that lower priority messages can not deplete the remaining control blocks and thereby prevent reception of higher priority messages. For example, only a message having the highest priority (priority="3") can be allocated the very last control block available. Only messages of the highest or second highest priority can receive control blocks when there are only two control blocks remaining, and so on.

The CB_AVAIL signal 471 is connected through an inverter 475 to one input of an AND gate 476. The other input of AND gate 476 is connected to the UNCONNECTED_SOM signal 361. The output of AND gate 476 on line 477 will therefore be true (high logic level)

when both (a) an unconnected start-of-message frame is being received, and (b) there is not a control block available for allocation to the message, based on its message priority. The output on line 477 therefore represents an unconnected message "busy" condition, and is applied as one input to an OR gate 480. The other input of OR gate 480 is connected to the CMD_PING signal 366, which is asserted (logic high level) in response to a command code 191 which specifies a "ping" command. The output of OR gate 480 will therefore be forced high in response to either a ping command code or an unconnected "busy" condition. Either of these conditions causes a "busy" response to be returned from the receiving module 11; the "ping" command is an artificially generated "busy" response, while the output 477 of AND gate 476 represents an actual "busy" condition within the receiving module 11.

The output of OR gate 480 therefore becomes true (logic high level) when a "busy" response is required, and this signal is connected to the D input of a flip-flop 481. Flip-flop 481 is clocked by a BUSY_CLOCK signal 482, which is derived as the output of an OR gate 483. The BUSY_CLOCK signal 482 is timed to clock the flip-flop 481 at the moment when the command code byte 191 from the incoming message has been received and decoded. As discussed above, the command code byte 191 is received in either the first or second bus cycle, depending upon the negotiated data transfer width being used for the transfer. If an 8 bit transfer is in progress, the command code byte 191 is received in the second bus cycle, while the command code byte 191 is available in the first bus cycle for 16 bit and wider transfers. Therefore, three inputs of OR gate 483 are connected to the SIZE_16, SIZE_32, and SIZE_64 lines of the XFER_SIZE bus 56. As soon as any one of these lines is asserted (logic high level), the BUSY_CLOCK signal 482 is forced high, and clocks flip-flop 481. If none of the lines SIZE_16, SIZE_32, or SIZE_64 are asserted, then the BUSY_CLOCK signal 482 remains low until the second bus cycle. A flip-flop 485 is used to activate the BUSY_CLOCK signal 482 when 8-bit transfers are in progress. Flip-flop 485 is clocked by the IN_SYNC_L signal 47, and has its D input connected to the END_CYCLE1 signal 206. The END_CYCLE1 signal 206 becomes true (logic high level) on the second falling edge of the IN_SYNC_L signal 47, i.e., the start of the second bus cycle. However, flip-flop 485 is not clocked until the rising edge of the IN_SYNC_L signal 47, which allows the incoming data to be latched and decoded as previously described. The Q output of flip-flop 485 is connected to a fourth input of OR gate 483, and thus asserts the BUSY_CLOCK signal 482 during the second bus cycle while 8-bit transfers are in progress. Once clocked by the BUSY_CLOCK signal 482, flip-flop 481 loads the value appearing on the output of OR gate 480. The Q output of flip-flop 481 will thereafter reflect the "busy" conditions described above, and is connected as the CB_BUSY signal 403. If the CB_BUSY signal 403 is set true (logic high level), the BUSY_FRAME signal 322 is also forced true, and the incoming message will be flagged as busy.

Still referring to FIG. 17, another flip-flop 490 is also clocked by the BUSY_CLOCK signal 482, and latches the state of the UNCONNECTED_SOM signal 361 at the time when it is valid (first or second bus cycle as described above). The Q output of flip-flop 490 will therefore become true (logic high level) as soon as it is determined that an unconnected start-of-frame message is being received. The Q output of flip-flop 490 is connected to one input of an AND gate 491. The other input of AND gate 491 is connected to the RX_OK signal 342, and the output of AND gate 491 is connected to the "decrement" input of the control block counter circuit 451. Consequently, AND gate 491 is enabled as soon as an unconnected start-of-frame is detected. When reception of the frame is complete, the RX_OK signal 342 will be asserted if no errors or busy conditions occurred during the reception. Upon such an error free reception, the output of AND gate 491 will become true (logic high level), and decrement the count within the control block counter circuit 451. Note that if any errors or other busy conditions were detected during the reception, the RX_OK signal 342 will not be asserted, and the count held by the control block counter circuit 451 will remain unaltered. This ensures that the count in the control block counter circuit 451 is decremented only when a control block is actually allocated to a validly received unconnected message.

Again referring to FIG. 17, the flip-flops 481, 485, and 490 which are used for operating the control block management circuit 450 are all reset by a BUSY_RESET_L signal 495. The BUSY_RESET_L signal 495 is connected as the output of a NOR gate 496, the inputs of which are connected to the IN_XFER_L signal 45 and the FOR_US signal 55 through an inverter 497. Thus, the BUSY_RESET_L signal 495 will be held at an active, low level when either (a) the FOR_US signal 55 is false (logic low level), or (b) the IN_XFER_L signal 45 is released to a logic high level. The flip-flops 481, 485, and 490 are therefore reset between transmission cycles, and are held reset if the module 11 is not an addressee of the message currently being transmitted. Modules 11 which are not addressed by a particular message leave the count in the control block counter circuit 451 unaltered, and do not activate the CB_BUSY signal 403.

Figure 18:
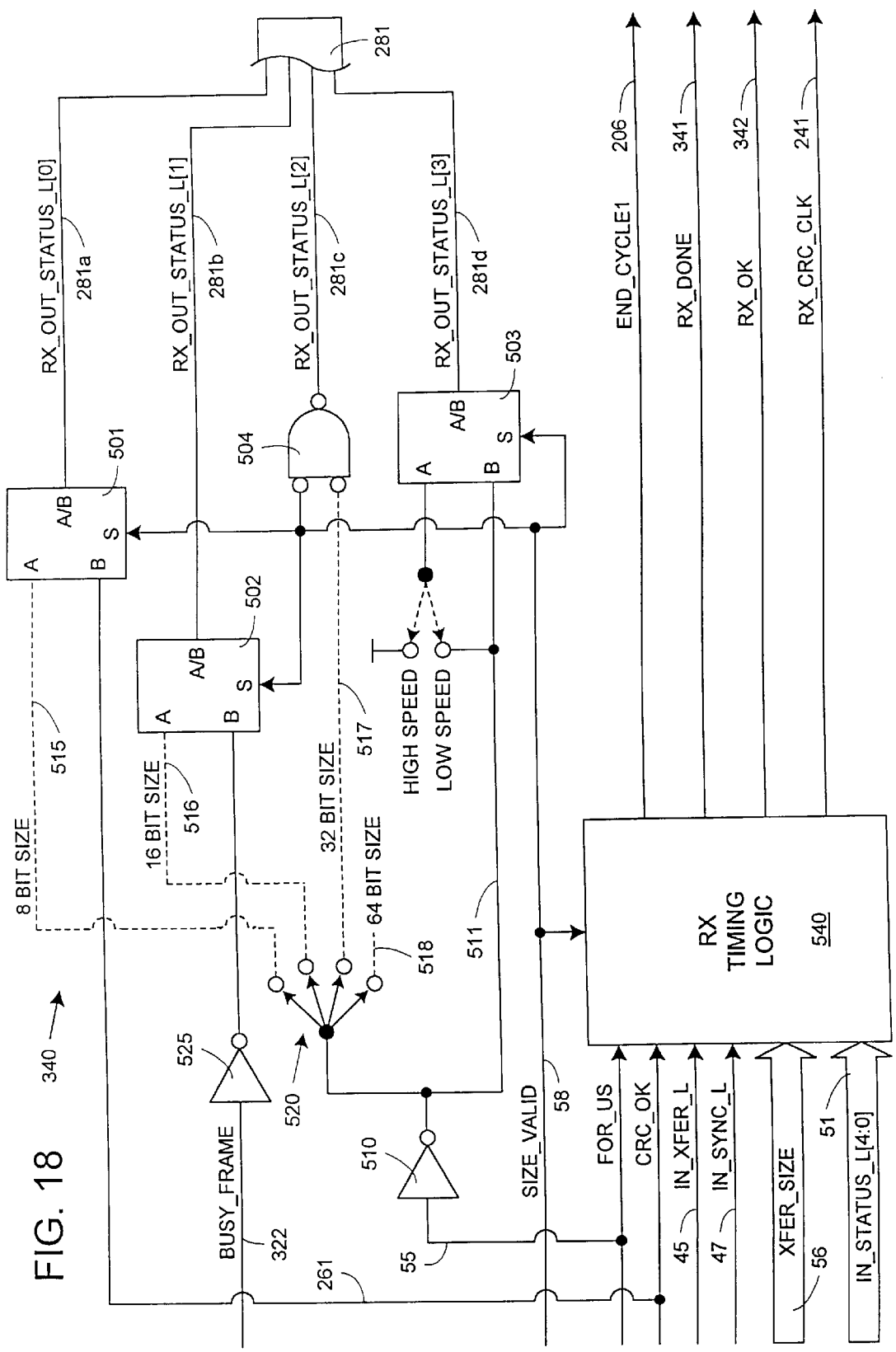
FIG. 18 is a block diagram of the RX status control circuit which forms a part of the receive logic circuit of FIG. 14.

Referring now to FIGS. 14 and 18, the RX status control circuit 340 is responsible for generating the status signals in the RX_OUT_STATUS_L bus 281, as well as the timing signals END_CYCLE1 206, RX_DONE 341, RX_OK 342, and RX_CRC_CLK 241. The RX_OUT_STATUS_L bus 281 contains four individual lines RX_OUT_STATUS_L[0] through RX_OUT_STATUS_L[3], numbered 281a–281d, respectively. During receive operations, the RX_OUT_STATUS_L bus 281 is coupled through the status output multiplexer 280 to corresponding lines in the OUT_STATUS_L bus 52.

Referring primarily to FIG. 18, lines RX_OUT_STATUS_L[0] 281a, RX_OUT_STATUS_L[1] 281b, and RX_OUT_STATUS_L[3] 281d are connected as the outputs of multiplexers 501–503, respectively, while RX_OUT_STATUS_L[2] line 281c is connected as the output of an OR gate 504 (represented as an inverted AND function). The multiplexers 501–503 each have a select input connected to the SIZE_VALID signal 58. The multiplexers 501–503 therefore couple their respective "A" inputs through to the "A/B" output while the negotiation for the data transfer width and speed is in progress, i.e., when the SIZE_VALID signal 58 is false (logic low level). At the end of the negotiation, the SIZE_VALID signal 58 is activated (high logic level), and the multiplexers 501–503 all switch to couple the "B" input to the "A/B" output. This provides for the alternating function of the status lines between the first bus cycle versus subsequent bus cycles as mentioned above. Since the RX_OUT_STATUS_L[2] line 281b does not have an alternate receive function, and is therefore used only during the negotiation, the OR gate 504 is used in lieu of a multiplexer to simply force the RX_OUT_STATUS_L[2] line 281c to an inactive state (logic high level) after the negotiation is complete. Specifically, the SIZE_VALID signal 58 is connected to one input of OR gate 504. At the end of the first bus cycle, the SIZE_VALID signal 58 is asserted to a high logic level, and thus forces the RX_OUT_STATUS_L[2] signal 281c to a high logic level for the second and subsequent bus cycles.

During the first bus cycle, only those modules 11 which are addressed by the incoming message participate in the negotiation, and so the FOR_US signal 55 is used to enable assertion of the negotiation signals during the first bus cycle. The FOR_US signal 55 is coupled through an inverter 510 to an output line 511. If the module 11 is an addressed recipient of the incoming message, then the FOR_US signal 55 will be true (logic high level), while the output line 511 of inverter 510 will be pulled low. Output line 511 is then used to assert the width and speed limitations for the module 11, as shown by dashed lines 515–518. If the module 11 is an 8-bit module (i.e., has an 8-bit internal processing width and therefore supports only 8-bit transfers), then line 511 would be connected to the "A" input on multiplexer 501 via line 515. In that case, assertion of the FOR_US signal 55 drives the RX_OUT_STATUS_L[0] line 281a low, which in turn pulls the backplane line STATUS_L[0] 23a low during the negotiation phase. If the module 11 is a 16-bit module, then the line 511 would instead be connected to the "A" input of multiplexer 502 via line 516, and thus be asserted on the RX_OUT_STATUS_L[1] line 281b and the STATUS_L[1] backplane line 23b. In a 32-bit module 11, line 511 would be connected to the other input of OR gate 504 via line 517, and is applied on the RX_OUT_STATUS_L[2] line 281c and STATUS_L[2] backplane line 23 while the negotiation is in progress. For a 64-bit module 11, all of the status lines STATUS_L[2:0] 23 are left unasserted by this module 11, and therefore there is no connection made for the line 518 with respect to the data transfer width negotiation.

For the purpose of illustration, a four way selector function 520 is represented to show how the various connections would be made in modules 11 with differing data transfer width capabilities. It should be appreciated that only one "width" connection is actually required in each type of module 11, and so only a single connection would actually be implemented. It would further be apparent to those skilled in the art that the logic associated with the unused connections could be simplified, in that the multiplexers 501–503 could be replaced by gates which enable the alternate functions described below only after the SIZE_VALID signal 58 is activated. As a further example, OR gate 504 is used only on 32-bit modules 11, and could be eliminated entirely on modules 11 with other width capabilities.

For the assertion of a "low speed" signal during the first bus cycle, the "A" input of multiplexer 503 is connected to line 511 for a low speed module 11. This will cause an addressed low speed module 11 to pull the RX_OUT_STATUS_L[3] line 281d low during the negotiation phase of the first bus cycle. If the module 11 is capable of high speed operation, then the "A" input of multiplexer 503 is instead tied to a logic high level, thereby leaving the RX_OUT_STATUS_L[3] line 281d released during the first bus cycle. As before, only one speed option is implemented in each module, although both options are shown for the purpose of illustration. Therefore, the multiplexer 503 may be replaced by more simplified logic.

The negotiation phase occurring in the first bus cycle is completed when the SIZE_VALID signal 58 is asserted to a high logic level. This causes each multiplexer 501–503 to select the alternate function appearing on the respective "B" input. The "B" input of multiplexer 501 is connected to the CRC_OK signal 261. The state of the CRC_OK signal 261 is thus applied to the RX_OUT_STATUS_L[0] line 281a and in turn to the STATUS_L[0] backplane line 23a for the second and subsequent bus cycles.

The BUSY_FRAME signal 322 is applied through inverter 525 to the "B" input of multiplexer 502. If a busy condition is detected, as described above, the BUSY_FRAME signal 322 is set true, which asserts a low logic level onto the "B" input of multiplexer 502, and this input is in turn asserted onto the RX_OUT_STATUS_L[1] line 281b beginning with the second bus cycle.

For a receiving module 11, the STATUS_L[2] line 23c is only monitored, and no output drive for this line is required for receive functions. The STATUS_L[3] line 23d is unconditionally driven low by an addressed receiving module 11 as a general indication of the module's presence. To provide this indication, the inverted FOR_US signal on line 511 is connected to the "B" input of multiplexer 503, and will thus drive the RX_OUT_STATUS_L[3] line 281d and the STATUS_L[3] line 23d to a low logic level on the second and subsequent bus cycles whenever the FORUS signal 55 is true (logic high level).

Figure 19:
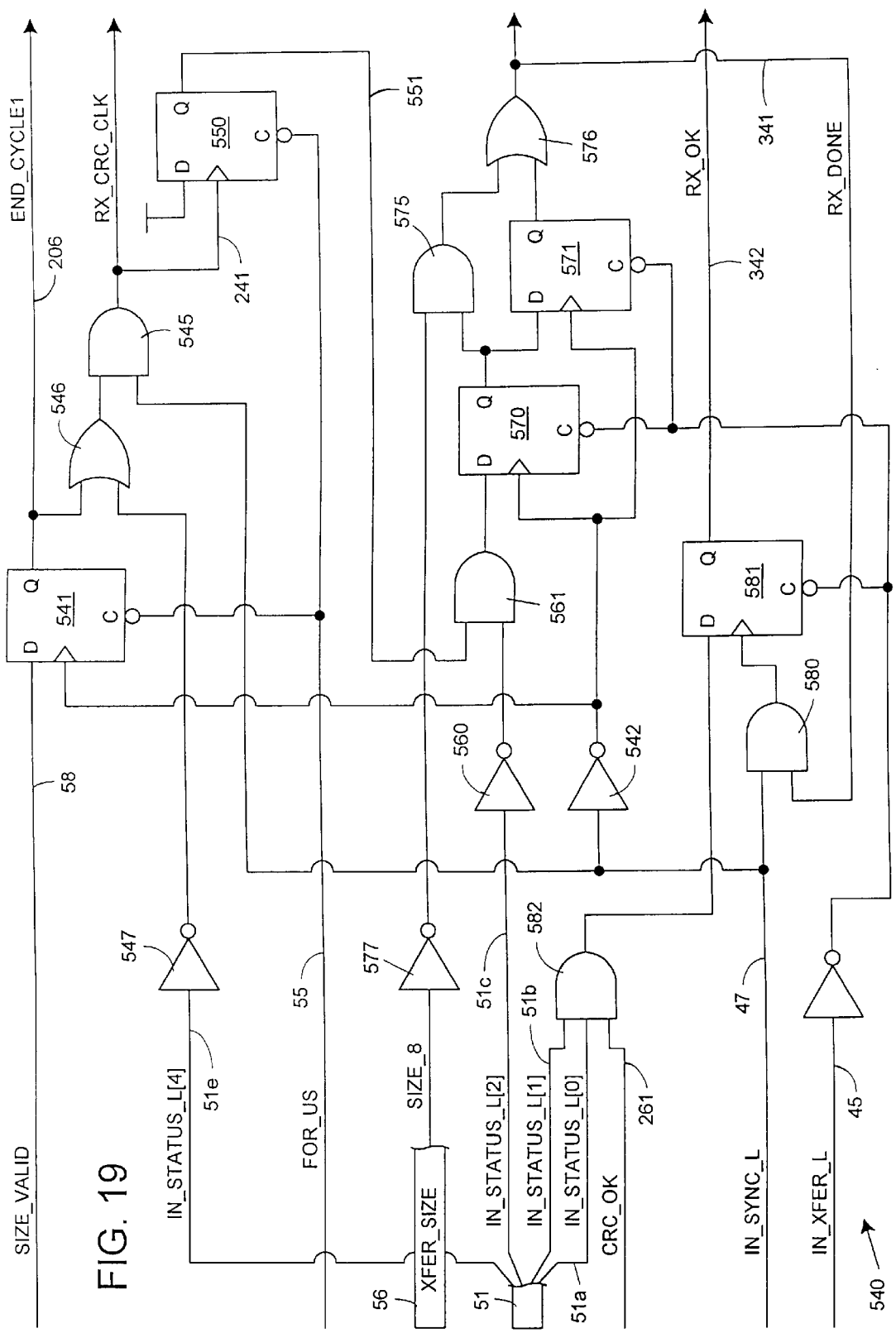
FIG. 19 is a block diagram of the RX timing logic circuit which forms a part of the RX status control circuit of FIG. 18.

Referring to FIGS. 14 and 19, the RX status control circuit 340 includes an RX timing logic circuit 540 for generating the timing signals END_CYCLE1 206, RX_DONE 341, RX_OK 342, and RX_CRC_CLK 241. Further reference may be made to FIG. 9 as to the exemplary timing of these signals. The END_CYCLE1 signal 206 is connected as the Q output of a flip-flop 541. The D input of flip-flop 541 is connected to the SIZE_VALID signal 58, and flip-flop 541 is clocked on the active, or falling edge of the IN_SYNC_L signal 47 (through inverter 542). Since the SIZE_VALID signal 58 is asserted (high logic level) after the first rising edge of the IN_SYNC_L signal 47, flip-flop 541 becomes set on the second falling edge of the IN_SYNC_L signal 47, i.e., the beginning of the second bus cycle. The END_CYCLE1 signal 206, as the Q output of flip-flop 541, is thus also asserted at the beginning of the second bus cycle, and remains set for the remainder of the transfer cycle.

The RX_CRC_CLK signal 241 is connected as the output of an AND gate 545. One input of AND gate 545 is connected directly to the IN_SYNC_L signal 47, while the other input is connected to the output of an OR gate 546. One input of OR gate 546 is connected to the END_CYCLE1 signal 206. The IN_STATUS_L[4] signal 51e is applied through an inverter 547 to the other input of OR gate 546. With these connections, the RX_CRC_CLK signal 241 is initially false (low logic level), since both inputs to the OR gate 546 are low. When the transmitting module 11 asserts the IN_STATUS_L[4] signal 51e to indicate that it is time to perform the first CRC computation as discussed above, the output of OR gate 546 is forced high, thereby enabling AND gate 545. At that point, the IN_SYNC_L signal 47 will have been previously released to a high logic level by the transmitting module 11, and the RX_CRC_CLK signal 241 on the output of AND gate 545 will then go high for the first time. Note that if the IN_STATUS_L[4] signal 51e is asserted earlier in the first bus cycle to extend the first sync pulse for the purpose of synchronizing with a remote rack, the SYNC_L signal 47 will be asserted (low logic level) at the same time, and AND gate 545 will therefore be disabled. As a result, the INSTATUS_L[4] signal 51e is used for two different functions as determined by the state of the SYNC_L signal 47. If the SYNC_L signal 47 is asserted to a logic low level, then the IN_STATUS_L[4] signal 51e is used to extend the first sync pulse, whereas when the SYNC_L signal 47 is released to a high logic level, the IN_STATUS_L[4] signal 51e is used to indicate the first CRC computation.

After asserting the IN_STATUS_L[4] signal 51e for the first CRC computation, the next action taken by the transmitting module 11 is to assert the IN_SYNC_L signal 47 to a low logic level to begin the second bus cycle. As discussed above, this action causes the END_CYCLE1 signal 206 to be set true, which will in turn hold AND gate 545 enabled (through OR gate 546) for the remainder of the transmit cycle. Once the AND gate 545 becomes enabled by the ENDCYCLE1 signal 206, the RX_CRC_CLK signal 241 on the output of AND gate 545 will follow the IN_SYNC_L signal 47 exactly for the remainder of the transmit cycle.

The RX_CRC_CLK signal 241 is also connected as the clock input to a flip-flop 550, the D input of which is tied to a logic high level. Flip-flop 550 is therefor set on the first rising edge of the RX_CRC_CLK signal 241, and remains set for the duration of the transmit cycle. The Q output of flip-flop 550 on line 551 thus indicates that the CRC computation has begun, and is used by other circuits described below to detect the end of the transmit cycle.

Both the flip-flop 550, and the previously mentioned flip-flop 541, have a reset input connected to the FOR_US signal 55. Consequently, the flip-flops 541 and 550 are held in a reset state if the FOR_US signal 55 is false (low logic level). Only those modules 11 which are addressed by the incoming message will activate the FOR_US signal 55 as described above, and thereby enable the flip-flops 541 and 550 for that transmit cycle. It is important to note that the flip-flops 541 and 550 will be reset between transmit cycles since, as previously noted, the FOR_US signal 55 is forced to a low logic level between transmit cycles by release of the IN_XFER_L signal 45 to a high logic level.

The RX_DONE signal 341 is activated to indicate the completion of frame reception. The IN_STATUS_L[2] signal 51c is asserted to a low logic level by the transmitting module 11 when the CRC residual value is being transmitted at the end of the message frame. The IN_STATUS_L[2] signal 51c is applied through an inverter 560 to one input of an AND gate 561. The other input of AND gate 561 is connected to the Q output of flip-flop 550 on line 551. The line 551 input to AND gate 561 serves to disable AND gate 551 until after the first assertion of the RXCRCCLK signal 241, thereby preventing assertions of the INSTATUS_L[2] signal 51c during the negotiation phase from being misinterpreted as the alternate "End of Frame" function. Line 551 will be asserted to a logic high level prior to the falling edge of the IN_SYNC_L signal 47 which begins the second bus cycle, such that AND gate 561 will be enabled prior to the beginning of the second bus cycle. The "End of Frame" indication on the IN_STATUS_L[2] line 51c is also set up so as to be stable at the beginning of the applicable bus cycle. Consequently, the output of AND gate 561 will be true (high logic level) at the beginning of the bus cycle (or cycles, in the case of an 8-bit transfer) in which the CRC residual value is being transmitted.

Because of the capability for variable data transfer widths provided by the invention, transmission of the CRC residual may require either two bus cycles (8-bit transfers) or a single bus cycle (16-bit or wider transfers). Therefore, the RX_DONE signal 341 is activated on the first CRC bus cycle for 16-bit and wider transfers, but is delayed until the second CRC bus cycle for 8-bit transfers. Two flip-flops 570 and 571 are connected as a two stage shift register to provide the variable delay for generating the RX_DONE signal 341. Both flip-flops 570 and 571 are clocked at the beginning of each bus cycle by the active, or falling edge of the IN_SYNC_L signal 47 (through inverter 542). The output of AND gate 561 is connected as the D input of flip-flop 570, and flip-flop 570 will therefore be set on the first CRC bus cycle. The Q output of flip-flop 570 is connected to one input of an AND gate 575. The other input of AND gate 575 is connected to the SIZE_8 line of the XFER_SIZE bus 56 through an inverter 577. If the SIZE_8 line is false (logic low level), then the current transfer is 16-bits or wider, and a high logic level is applied to AND gate 575. The output of AND gate 575 is connected to the RX_DONE signal 341 through an OR gate 576. The RX_DONE signal 341 will therefore be asserted to a high logic level on the first CRC bus cycle when the transfer is 16-bits or wider. Alternately, if an 8-bit transfer is in progress, the SIZE_8 line is asserted to a high logic level, and AND gate 575 is thereby disabled. The Q output of flip-flop 570 is connected to the D input of the second stage flip-flop 571, and so flip-flop 571 is set on the second CRC bus cycle. The Q output of flip-flop 571 is applied directly to the OR gate 576, and thus forces the RX_DONE signal 341 true (high logic level) on the second CRC bus cycle. In this manner, the RX_DONE signal 341 is always activated during the last bus cycle.

The RX_DONE signal 341 is also fed back to the input of an AND gate 580 for use in generating the RX_OK signal 342. The other input of AND gate 580 is connected to the IN_SYNC_L signal 47, and the output of AND gate 580 is connected to the clock input of a flip-flop 581. Since the RX_DONE signal 341 only becomes true (logic high level) during the last CRC bus cycle, flip-flop 581 will be clocked only once and on the rising edge of the IN_SYNC_L signal 47 in the last CRC bus cycle.

The D input of flip-flop 581 receives the output of an AND gate 582, while inputs to AND gate 582 are connected to the IN_STATUS_L[1] signal 51b, the IN_STATUS_L[0] signal 51a, and the CRC_OK signal 261. The output of AND gate 582 will therefore only be asserted if: (a) the IN_STATUS_L[1] signal 51b is high, indicating that none of the other addressed receiving modules 11 are returning a "busy" condition, (b) the IN_STATUS_L[0] signal 51a is high, indicating that none of the other addressed receiving modules 11 are returning a "bad CRC" condition, and (c) the local module 11 has computed a correct CRC for the incoming frame. Likewise, the failure of any of those conditions will cause the output of AND gate 582 to be false (logic low level). When the flip-flop 581 is clocked in the last bus cycle, the output of AND gate 582, and thus the state of the incoming frame, is latched and presented on the Q output of flip-flop 581 as the RX_OK signal 342.

Flip-flops 570, 571 and 581 are all cleared at the end of the current transfer. The IN_XFERL signal 45 is connected through an inverter 583 to a reset input on each of the flip-flops 570, 571 and 581. When the IN_XFER_L signal 45 goes high, the flip-flops 570, 571 and 581 are reset in preparation for subsequent data transfers.

Figure 20:
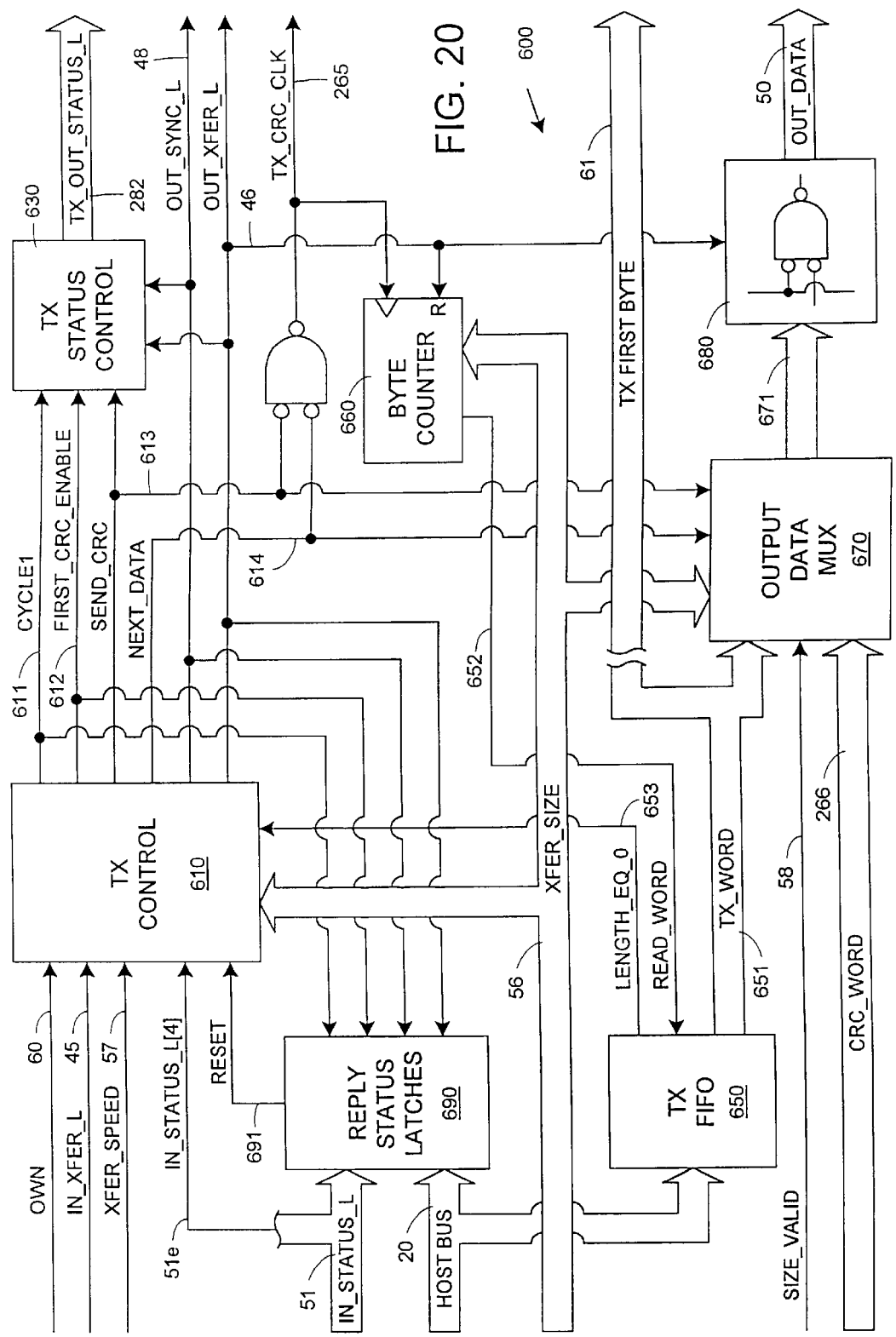
FIG. 20 is a block diagram of the transmit logic circuit which forms a part of the data transfer logic circuit of FIG. 4.

Now referring to FIGS. 13 and 20, the transmit logic circuit 600 includes a TX control circuit 610 for generating the above mentioned control signals OUT_SYNC_L 48, OUT_XFER_L 46 and TX_CRC_CLK 265. In addition, the TX control circuit 610 produces additional control signals CYCLE1 611, FIRST_CRC_ENABLE 612, SEND_CRC 613 and NEXT_DATA 614 for use within the TX control circuit 601 for control of the transmit cycle.

Figure 21:
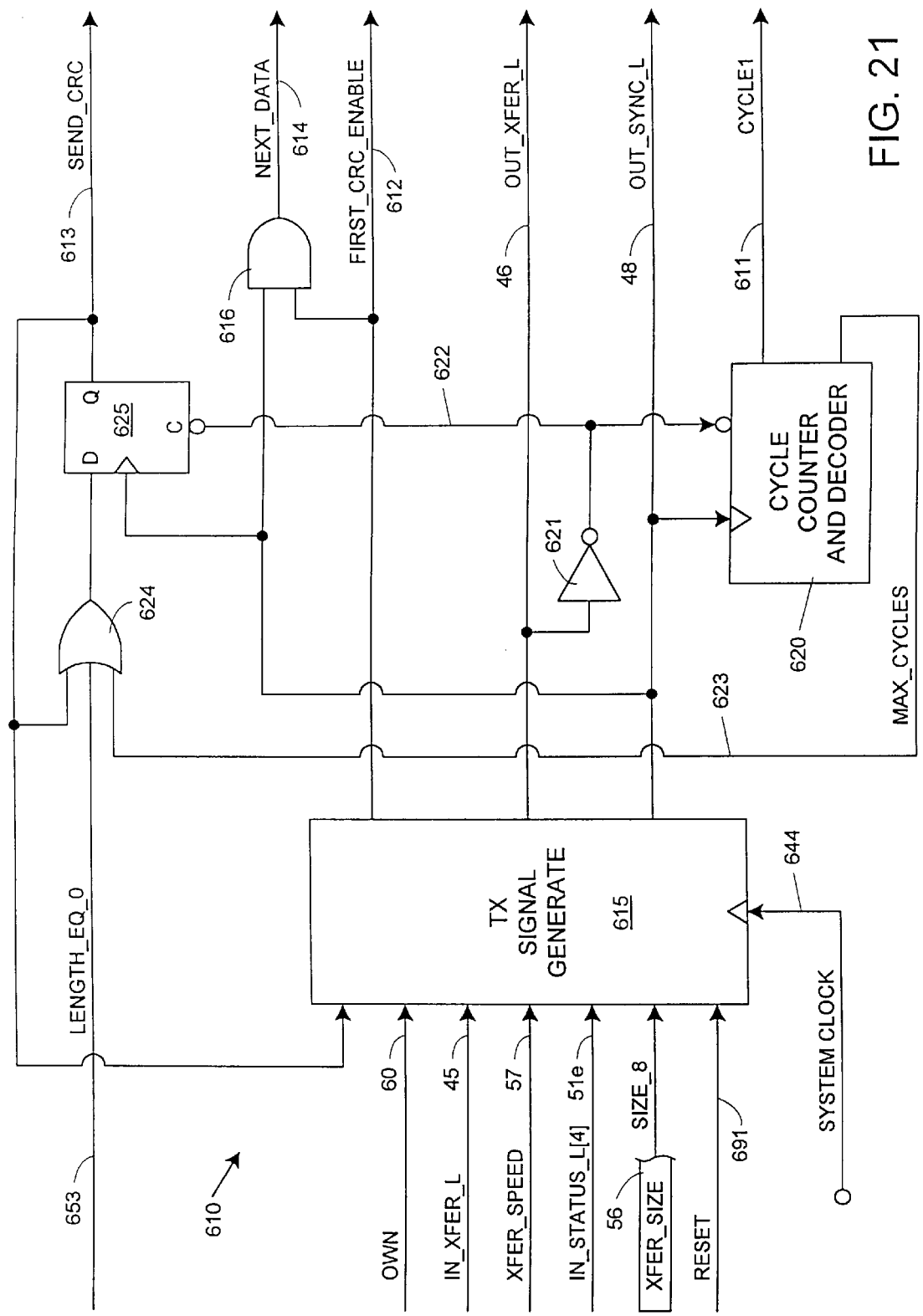
FIG. 21 is a block diagram of the TX control circuit which forms a part of the transmit logic circuit of FIG. 20.

Referring to FIGS. 20 and 21, a TX signal generate circuit 615 is used to generate the basic timing for the TX control circuit 610. The TX signal generate circuit 615 is preferably implemented as a state machine, and is illustrated as being clocked by a system clock signal 644. The OWN signal 60 is input to the TX signal generate circuit 615 to indicate that the preceding arbitration has been won by the this module 11. When the OWN signal 60 is asserted, the state machine within the TX signal generate circuit 615 is activated and begins monitoring the IN_XFER_L signal 45 to determine when the currently ongoing transmission (if any) has been completed. Once the IN_XFER_L signal 45 is released to a high logic level, the TX signal generate circuit 615 begins its own transmit cycle by waiting a predetermined period of time and then asserting the OUT_XFER_L signal 46 to a logic low level. The short delay before re-assertion of the XFER_L line 25, via the OUT_XFER_L line 46, is imposed to ensure that all of the modules 11 on the backplane bus 12 will detect the release of the XFER_L line 25 by the previously transmitting module 11, and thus be able to delineate between successive transmissions.

Once the OUT_XFER_L line 46 has been asserted, the TX signal generate circuit 615 begins cyclic assertions of the OUT_SYNC_L line 48 according to the timing described above in relation to FIG. 9. On the first falling edge of the OUT_SYNC_L line 48, the IN_STATUS_L[4] signal 51e is monitored to determine if coordination with a remote rack is required. If the IN_STATUS_L[4] signal 51e is pulled low by a bus expansion module 16 during the first assertion of the OUT_SYNC_L signal 48, then the normal timing is suspended, and the OUT_SYNC_L line 48 is held low until the IN_STATUS_L[4] signal 51e is released back to a high logic level. Once the IN_STATUS_L[4] signal 51e is released, normal timing resumes, and the first rising edge of the OUT_SYNC_L signal 48 is produced by releasing the OUT_SYNC_L signal 48 back to a high logic level. The initial speed used for generating the OUT_SYNC_L signal 48 is based on the low speed data transfer speed, and if the XFER_SPEED signal 57 indicates a high speed transfer at the first release of the OUT_SYNC_L signal 48, then subsequent transitions on the OUT_SYNC_L signal 48 may be based on the high speed transfer rate.

After the first rising edge of the OUT_SYNC_L signal 48, the TX signal generate circuit 615 delays for a period of time equal to one half of the bus cycle period. After the one half bus cycle delay, the TX signal generate circuit 615 activates the FIRST_CRC_ENABLE signal 612 to indicate that the first CRC computation can now be performed. This FIRST_CRC_ENABLE signal 612 is used as the basis for generating an appropriate output on the OUT_STATUS_L[4] line 52 (described below), and is also combined with the OUT_SYNC_L signal 48 in AND gate 616 to produce the NEXT_DATA signal 614. Prior to assertion of the FIRST_CRC_ENABLE signal 612, the NEXT_DATA signal 614 is held at a low logic level. When the FIRST_CRC_ENABLE signal 612 is asserted, the NEXT_DATA signal 614 is raised to a high logic level for the first time, since the OUT_SYNC_L signal 48 is also at a high logic level at that point. Once the FIRST_CRC_ENABLE signal 612 is set to a high logic level, it remains there for the duration of the transmit cycle, and so further transitions of the NEXT_DATA signal 614 will be synchronized with the OUT_SYNC_L signal 48. The rising edges of the NEXT_DATA signal 614 thus correspond to the times at which the data presented on the OUT_DATA bus 50 is changed, and is used as the basis for generating the TX_CRC_CLK signal 265 as described below.

As the transmit cycle progresses, the TX signal generate circuit 615 continues producing bus cycles by periodically asserting the OUT_SYNC_L signal 48. During the data transmission period, a RESET signal 691 may be activated in response to conditions described below which cause an abort of the message frame currently being transmitted. If the RESET signal 691 becomes activated at any time during the transmission, the TX signal generate circuit 615 immediately terminates the transmit cycle by releasing the OUT_XFER_L line 46 and the OUT_SYNC_L line 48, and by resetting the FIRST_CRC_ENABLE signal 612 back to a logic low level.

The TX control circuit 610 also includes a cycle counter and decoder circuit 620 for keeping a running count of the number of bus cycles generated. The cycle counter and decoder circuit 620 has a reset input connected to the OUT_XFER_L signal 46 through an inverter 621. Prior to assertion of the OUT_XFER_L signal 46, the output of inverter 621 on line 622 is at a logic low level, causing the count within the cycle counter and decoder circuit 620 to be reset to an initial count of "1". The CYCLE1 signal 611 is connected as an output of the cycle counter and decoder circuit 620, and is activated (logic high level) when the count contained in the cycle counter and decoder circuit 620 is equal to "1"; and a falling edge of the OUT_SYNC_L signal 48 occurs, i.e., during the first bus cycle. After the first rising edge of the OUT_SYNC_L signal 48, the count held by the cycle counter and decoder circuit 620 is incremented, and after the second falling edge of the OUT_SYNC_L signal 48, the CYCLE1 signal 611 is reset to a low logic level.

With successive rising edges of the OUT_SYNC_L signal 48, the count in the cycle counter and decoder circuit 620 continues to increment. If the count reaches a predetermined maximum limit for the number of bus cycles permitted in any one message frame, a MAX_CYCLES signal 623 is activated. The MAX_CYCLES signal 623 is connected as one input to an OR gate 624, the output of which is connected to the D input of a flip-flop 625. Flip-flop 625 is clocked on the rising edge of the OUT_SYNC_L signal 48, and produces the SEND_CRC signal 613 on the Q output. Consequently, flip-flop 625 will be set, asserting the SEND_CRC signal 613, to end the transmit cycle if the MAX_CYCLES signal 623 becomes true (logic high level). A second input of OR gate 624 is connected to a LENGTH_EQ_0 signal 653, which is activated when a transmit FIFO memory, described below, has been emptied down to a zero length. This also indicates the end of the data portion of the transmit cycle, and causes flip-flop 625 to be set, thereby activating the SEND_CRC signal 613.

The SEND_CRC signal 613 is fed back to a third input of OR gate 624, and is also connected to another input of the TX signal generate circuit 615. The connection of the SEND_CRC signal 613 to OR gate 624 serves to maintain the flip-flop 625 in a set condition once it has been set by the other conditions on OR gate 624. Thus the SEND_CRC signal 613, once asserted, will remain asserted for the remainder of the transmit cycle. After the SEND_CRC signal 613 is asserted, the transmit cycle will commence transmission of the CRC residual. Transmission of the CRC residual may require either one or two more bus cycles, depending upon the data transfer width used for the transfer. The inverted OUT_XFER_L signal on line 622 is connected to a reset input on flip-flop 625, causing the SEND_CRC signal 613 eventually to be reset when the OUT_XFER_L signal 46 is released at the end of the transmit cycle.

The connection of the SEND_CRC signal 613 to the other input to the TX signal generate circuit 615 is used in conjunction with the SIZE_8 line from the XFER_SIZE bus 56 to determine when to end the transmit cycle. If the SIZE_8 line is asserted (logic high level), then an 8-bit transfer is in progress, and two CRC cycles are required to transmit the CRC residual value. In that case, after the SEND_CRC signal 613 is asserted, the TX signal generate circuit 615 generates exactly two more assertions of the OUT_SYNC_L signal 48, and thereafter releases the OUT_XFER_L line 46. For transfers wider than 8 bits, the SIZE_8 line will be false (low logic level), and the TX signal generate circuit 615 generates only one more assertion of the OUT_SYNC_L signal 48 after the SEND_CRC signal 613 is activated.

Figure 22:
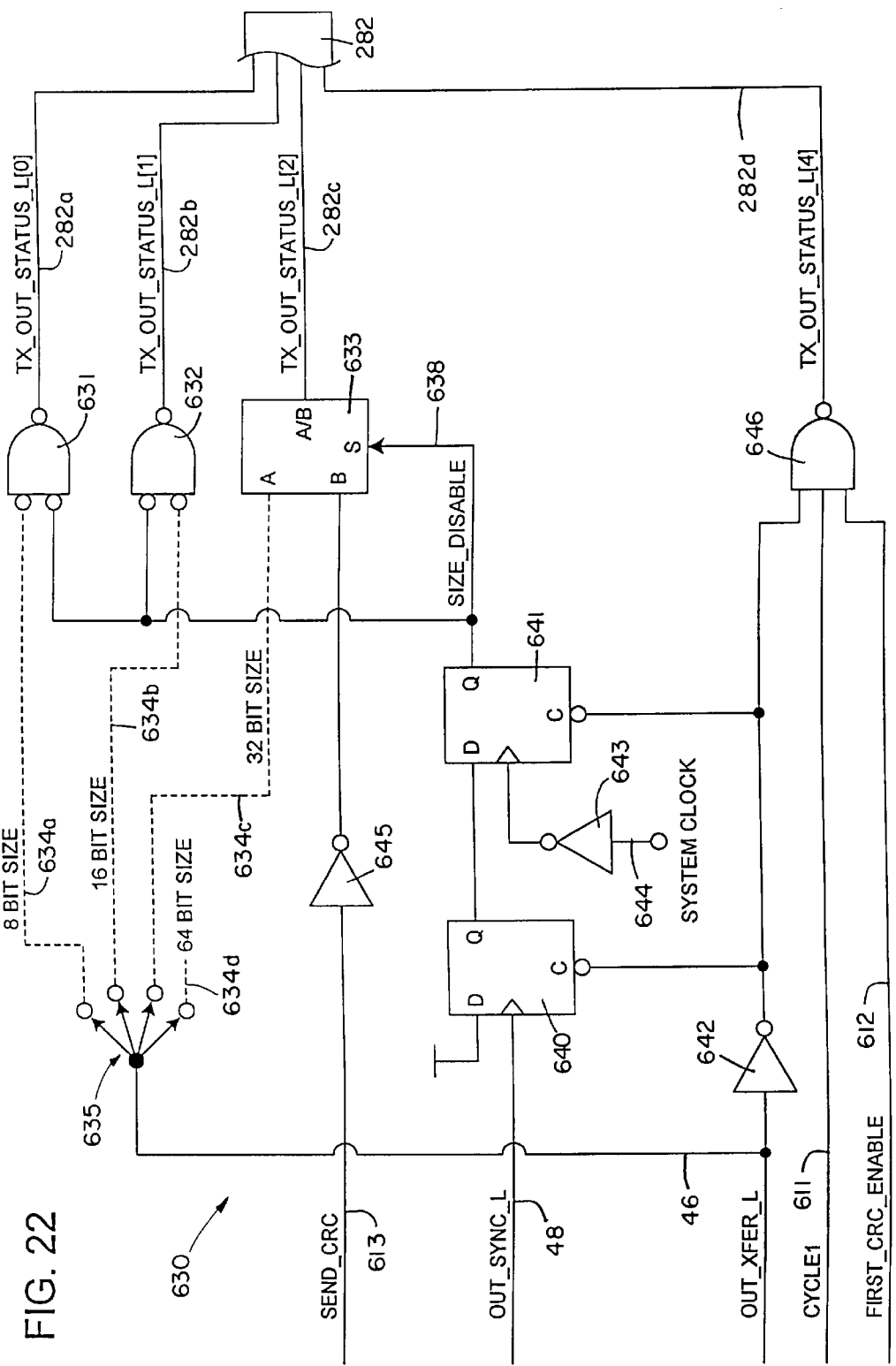
FIG. 22 is a block diagram of the TX status control circuit which forms a part of the transmit logic circuit of FIG. 20.

Referring to FIGS. 20 and 22, the control signals CYCLE1 611, FIRST_CRC_ENABLE 612, SEND_CRC 613, OUT_SYNC_L 48, and OUT_XFER_L 46 from the TX control circuit 610 are connected as inputs to a TX status control circuit 630. In response to these inputs, the TX status control circuit 630 produces the individual signals TX_OUT_STATUS_L[4] 282*d* and TX_OUT_STATUS_L[2:0] 282*c*–282*a* which form the TX_OUT_STATUS_L bus 282. Since there is no output function during transmission for the STATUS_L[3] line 23*d*, a corresponding tine in the TX_OUT_STATUS_L bus 282 is not required.

A pair of OR gates 631 and 632 (illustrated as an inverted AND function), and a multiplexer 633 have inputs which are shown with respective connections to width designation lines 634*a*–634*c* for 8-bit, 16-bit and 32-bits, respectively. In a manner similar to the receive function described above, only one of the width designation lines 634*a*–634*c* are normally used in any one module 11, as represented by selector 635. The width designation line 634*a*–634*c* is chosen to specify the largest data transfer width supported by that module 11. For a module 11 which supports 64-bit transfers, all of the STATUS_L[2:0] lines 23*c*–23*a* are released to a logic high level. Consequently, none of the width designation lines 634*a*–634*d* are needed, which is represented by leaving the 64-bit width designation line 634*d* open. The logic associated with unused width designation lines 634*a*–634*d* may of course be simplified or eliminated, although all possible connections of the width designation lines 634*a*–634*d* are shown for the purpose of illustration. A transmitting module may of course downsize the actual width used for conducting the data transfer, i.e. a 32 bit module would assert its bus width code for a 32 bit transfer, but may be forced to communicate at a reduced 8 or 16 bit data transfer width though the action of receiving modules which support only those narrower data transfer widths.

A SIZE_DISABLE signal 638 is used to enable assertion of the desired TX_OUT_STATUS_L[2:0] line 282*c*–282*a* only during the negotiation for the data transfer width as described above. The SIZE_DISABLE signal 638 is generated by two flip-flops 640 and 641. The flip-flops 640 and 641 are both initialized to a reset condition by the OUT_XFER_L signal 46 through an inverter 642 prior to commencing a transmit cycle. The first flip-flop 640 is clocked on the rising edge of the OUT_SYNC_L signal 48, and has its D input connected to a constant logic high level. The first stage flip-flop 640 thus becomes set on the first rising edge of the OUT_SYNC_L signal 48, which is the same point at which the receiving modules latch the result of the data transfer width negotiation. The second stage flip-flop 641 is used to ensure that all of the receivers have enough time to latch successfully the negotiation results prior to asserting the SIZE_DISABLE signal 638. The D input of flip-flop 641 receives the Q output of flip-flop 640. Flip-flop 641 is clocked through an inverter 643 on the falling edge of a system clock signal 644, and produces the SIZE_DISABLE signal 638 on its Q output. Flip-flop 641 thus imposes a delay equal to one half the period of the system clock 644. Therefore the SIZE_DISABLE signal 638 is activated shortly after the receivers have latched the size code.

Once the SIZE_DISABLE signal 638 is activated, the TX_OUT_STATUS_L[2] line 282*c* is switched by multiplexer 633 to the alternate function of indicating the end of the message frame. Specifically, the SEND_CRC signal 613 is connected through an inverter 645 to the B input of multiplexer 633. When the SEND_CRC signal 613 is asserted by the TX control circuit 610, the TX_OUT_STATUS_L[2] is driven to the active, low logic level, thereby providing the indication to the receiving modules 11 that the CRC residual value is now being transmitted.

As mentioned above in relation to FIG. 9, the STATUS_L[4] line 23*e* must be asserted by the transmitting module 11 at a point in the first bus cycle at which the first CRC computation is to be performed. The TX status control circuit 630 performs this function by asserting the TX_OUT_STATUS_L[4] line 282*d* based upon the FIRST_CRC_ENABLE signal 612 from the TX control circuit 610. Specifically, the TX_OUT_STATUS_L[4] line 282*d* is connected as the output of a NAND gate 646, while the FIRST_CRC_ENABLE signal 612 is connected as one input to the NAND gate 646. Two other inputs to the NAND gate 646 are connected to the CYCLE1 signal 611 and the OUT_XFER_L signal 46 (through inverter 642), respectively. Thus, the NAND gate 646 is enabled during the first bus cycle (CYCLE1 signal 611 at a true, high logic level) if the module 11 is currently transmitting (OUT_XFER_L signal 46 at a true, logic low level). Under those conditions, a true, logic high state on the FIRST_CRC_ENABLE signal 612 causes the TX_OUT_STATUS_L[4] line 282*e* to be asserted to a low logic level, providing the necessary indication to the receiving modules 11. At the start of the second bus cycle, the CYCLE1 signal 611 is dropped, and the TX_OUT_STATUS_L[4] line 282*e* is released back to a logic high level as shown in FIG. 9.

Referring again to FIG. 20, the transmit logic circuit 600 includes a TX FIFO buffer memory 650 for storing the message frame to be transmitted. The TX FIFO 650 is interfaced to the host bus 20, permitting the host processor 21 to place the data words which constitute the message frame into the buffer 650. After the complete message frame has been loaded into the TX FIFO 650, the host processor 21 enters the arbitration process as discussed above by writing to the priority register 65 in the bus arbitration logic circuit 40 (FIG. 4). The topmost word in the TX FIFO 650 is presented on a TX_WORD bus 651. Both the TX FIFO 650 and the TX_WORD bus 651 preferably are the same width as other internal data circuits, and are considered to be 32 bits wide in this exemplary embodiment. The lowest order byte from the TX_WORD bus 651 is broken out separately and connected as the TX FIRST BYTE bus 61. In that way, the very first byte of the first word in the message frame appears on the TX FIRST BYTE bus 61 while the above described arbitration process is in progress.

Data words are "popped" out of the TX FIFO buffer 650 by activation of a READ_WORD input 652. The READ_WORD signal 652 is produced by a byte counter circuit 660 based on the TX_CRC_CLK signal 265 and the current transfer width as indicated by the XFER_SIZE bus 56. The byte counter circuit 660 is reset by a high logic level on the OUT_XFER_L signal 46, and is enabled when the OUT_XFER_L signal 46 is asserted to a logic low level at the beginning of the transmit cycle. Thereafter, the byte counter circuit 660 increments on each rising edge of the TX_CRC_CLK signal 265, and each increment is made according to the current transfer width indicated on the XFER_SIZE bus 56. For example, if the current transfer width is 16-bit, then the byte counter circuit 660 increments its count by two bytes for each transition of the TX_CRC_CLK signal 265. When the number of bytes which have been transmitted which is equal to the internal width of the TX_WORD bus 651, then the READ_WORD signal 652 is activated to advance to the next word in the TX FIFO 650. Again by way of example, if the internal width of the TX_WORD bus is 32 bits, then the READ_WORD signal 652 is activated every fourth bus cycle for 8-bit transfers, every other bus cycle for 16-bit transfers, and on each bus cycle for 32-bit transfers.

When the last data word has been popped out and transmitted, the TX FIFO circuit 650 activates a LENGTH_EQ_0 signal 653, indicating that the TX FIFO 650 is now empty ("length equals zero"). The LENGTH_EQ_0 signal 653 is connected as an input to the TX control circuit 610 as described above to signal the end of the data portion of the message frame.

Figure 23A:
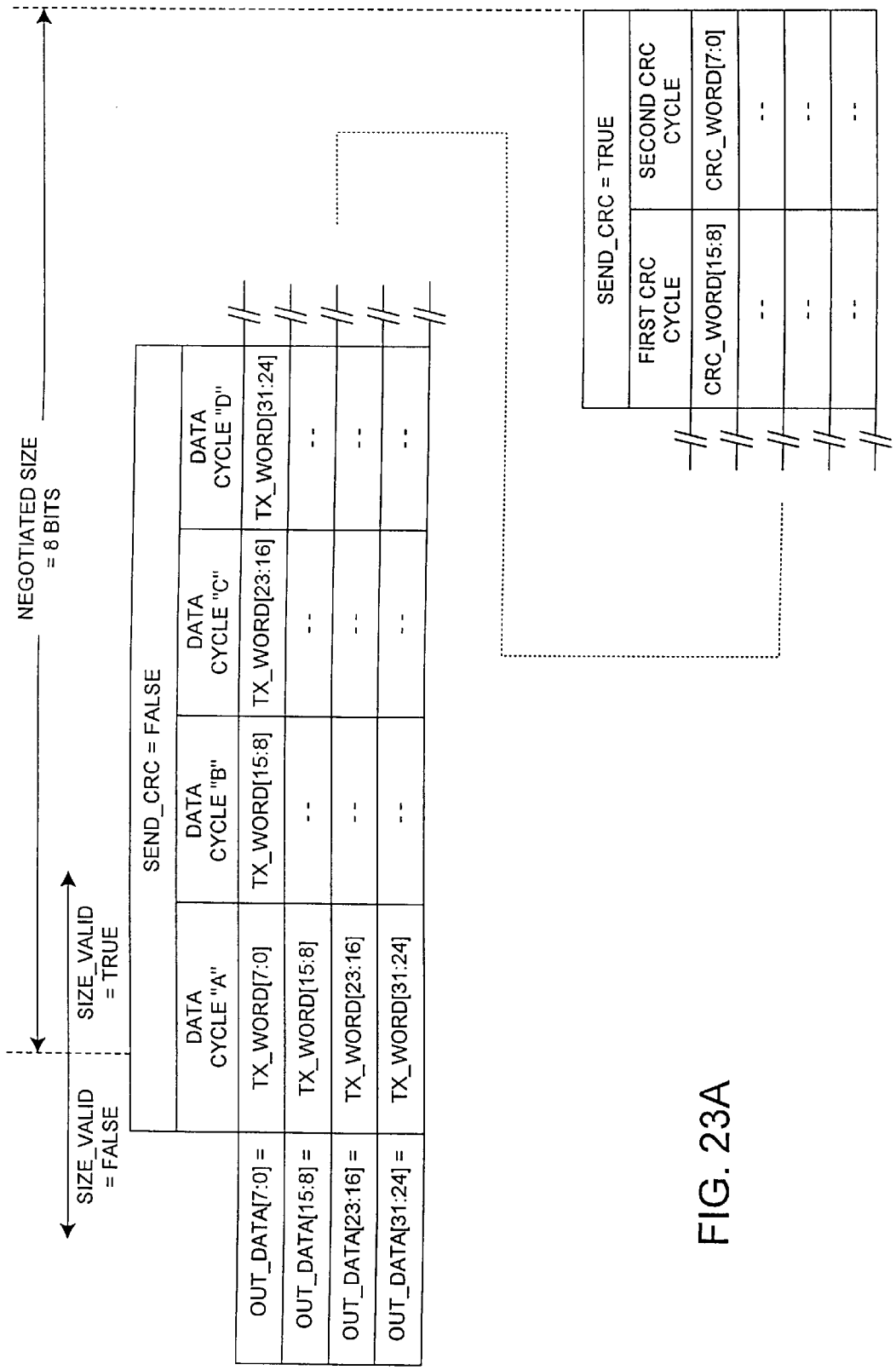
FIGS. 23A–23C are mapping tables for the output data mux circuit which forms a part of the transmit logic circuit of FIG. 20.
Figures 23B, 23C:
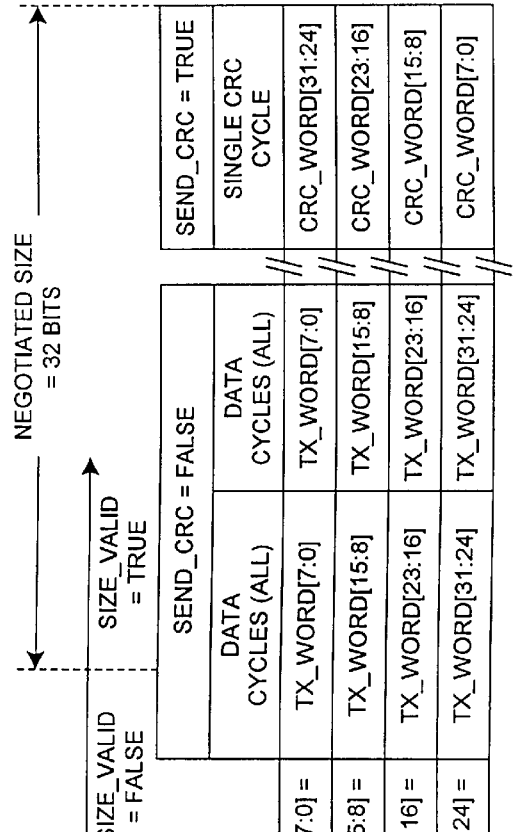

The TX_WORD bus 651 is also connected to the input of an output data multiplexer circuit 670, which arranges the bytes from the TX_WORD bus 651 for presentation onto the OUT_DATA bus 50. The mapping of output bytes is based on the current transfer width as indicated by the XFER_SIZE bus 56, as shown in FIGS. 23A–23C. In the first bus cycle, the transmitting module 11 always presents its full data width. After the SIZE_VALID signal 58 becomes true, the output data multiplexer circuit 670 responds with the actual data transfer size indicated on the XFER_SIZE bus 56.

The output data multiplexer circuit 670 includes a counter (not shown) for keeping track of successive bus cycles. If the negotiated data transfer width is less than the internal processing width of the module 11, then the count of bus cycles is used to alternate the data bytes onto the appropriate output data lines. Bus cycles are counted according to activations (rising edge) of the NEXT_DATA signal 614 from the TX control circuit 610.

In FIG. 23A, output multiplexing is illustrated for an exemplary 32-bit module 11 when the negotiated data transfer width is 8-bits. In that case, four bus cycles (labeled cycle "A" through cycle "D") are required to transmit each word from the TX_WORD bus 651. After presenting all 32-bits in the first bus cycle, the output data multiplexer circuit 670 presents the second data byte (TX_WORD[15:8]) on the low order byte output lines OUT_DATA[7:0] 50 in the second bus cycle "B". The third data byte (TX_WORD[23:16]) is put on the low order data lines OUT_DATA[7:0] 50 during the third cycle "C", and the fourth data byte (TX_WORD[31:24]) is presented in the fourth cycle "D". The pattern of bus cycles A–D then repeats, except that only the OUT_DATA[7:0] lines need to be presented during the fifth and subsequent "A" bus cycles, since the transfer size of 8 bits would then be in effect.

FIG. 23B illustrates a 16-bit transfer for the same exemplary 32-bit module 11. In this case, two bus cycles ("A" and "B") are needed to transmit each word from the TX_WORD bus 651. The data is multiplexed two bytes at a time, presenting the two high order bytes TX_WORD[23:16] and TX_WORD[31:24] during the second bus cycle "B" on the two low order output bytes OUT_DATA[7:0] and OUT_DATA[15:8], respectively. Beginning with the third bus cycle, the data alternates between the two low order bytes TX_WORD[7:0] and TX_WORD[15:8] on "A" cycles, and the two high order bytes TX_WORD[23:16] and TX_WORD[31:24] on the alternate "B" cycles.

In FIG. 23C, an example of a 32-bit module 11 transmitting with a data width of 32-bits is shown. In this case, all four data bytes from the TX_WORD bus 651 are transferred straight through to the OUT_DATA output lines 50 on every bus cycle.

Referring to FIGS. 20 and 23A–23C, the output data multiplexer circuit 670 also receives the SEND_CRC signal 613 from the TX control circuit 610, and the CRC_WORD bus 266 from the CRC circuit 260. When the SEND_CRC signal 613 is asserted to a high logic level, the output data multiplexer circuit 670 switches the data from the CRC_WORD bus 266 onto the OUT_DATA lines 50. In the case of an 8-bit transfer, as shown in FIG. 23A, the two CRC bytes from the CRC_WORD bus 266 are placed on the low order output lines OUT_DATA[7:0] on two successive bus cycles. For a 16-bit transfer (FIG. 23B), the two byte CRC residual is transmitted on the OUT_DATA[15:0] lines 50 during a single bus cycle. A 32-bit transfer (FIG. 23C) also uses a single CRC cycle, except that the CRC residual is a four byte value which is transmitted using the full 32-bit data width.

Referring again to FIG. 20, a set of enabling gates 680 are interposed between the output bus 671 from the output data multiplexer circuit 670 and the OUT_DATA bus 50. Each gate in the set of enabling gates 680 is an OR gate (represented as an inverted AND function) with one input connected to the OUT_XFER_L signal 46. Otherwise, each OR gate connects line for line between the OUT_DATA bus 50 and bus 671 from the output data multiplexer circuit 670. Thus, the OUT_DATA lines 50 can be driven to a low logic level only when the OUT_XFER_L signal 46 is asserted to a low logic level, e.g. when the module 11 is currently transmitting.

Figure 24:
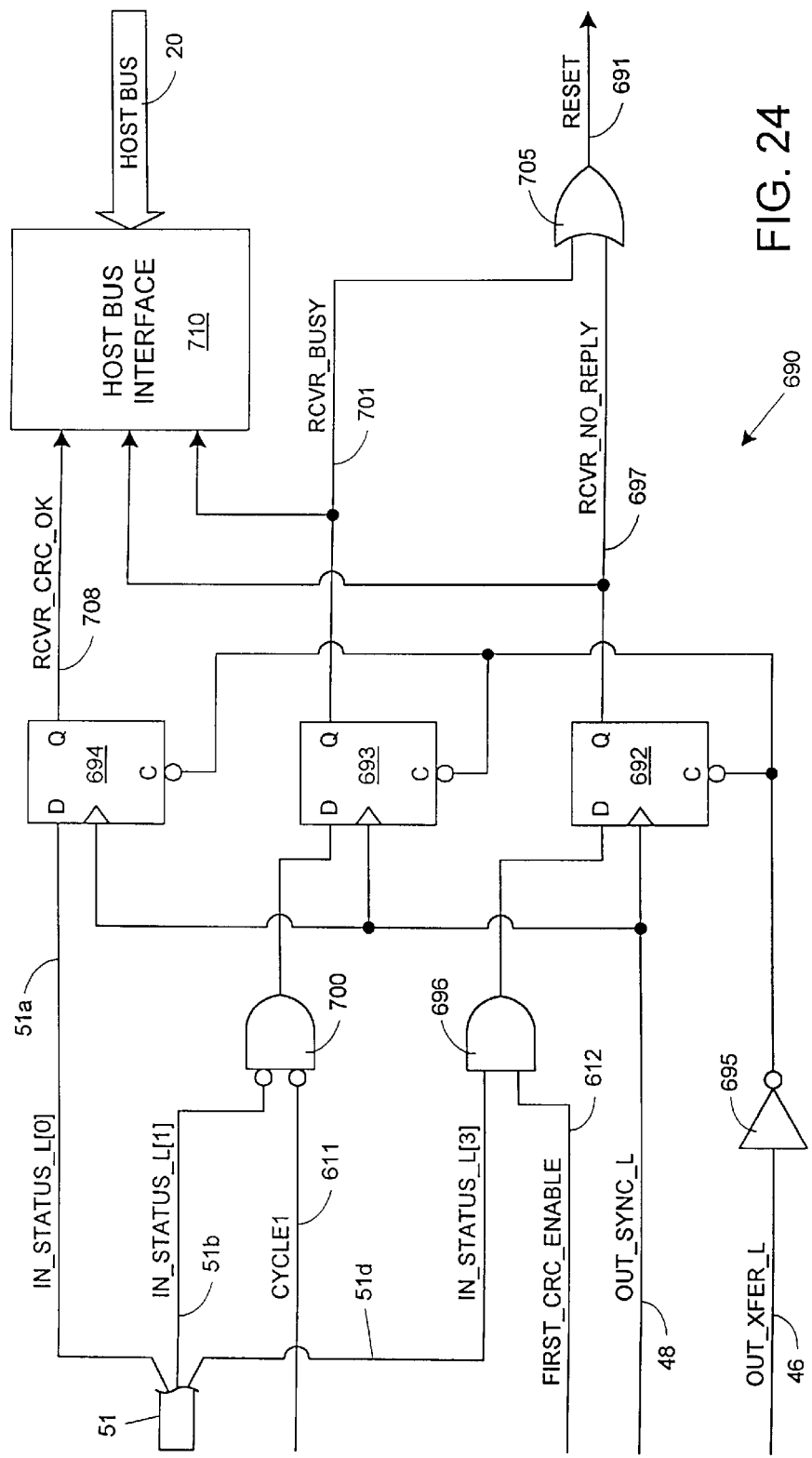
FIG. 24 is a block diagram of the reply status latches circuit which forms a part of the transmit logic circuit of FIG. 20.

Referring to FIGS. 20 and 24, the transmit logic circuit 600 further includes a reply status latches circuit 690 for latching the status for the transmission which is returned from the addressed receiving modules 11 via the IN_STATUS_L bus 51. The IN_STATUS_L lines 51 are monitored during the transmission both to detect error conditions under which the message frame is to be aborted and to report status conditions to the host processor 21 over the host bus 20. With regard to error conditions, the message frame is aborted under either of the following two abort conditions:

(1) failure of the receiving module 11 to assert the IN_STATUS_L[3] line 51*d* after the first bus cycle (i.e. absence of "receiver present" status); or (2) assertion of the IN_STATUS_L[1] line 51*b* after the first bus cycle (one or more "receiver busy" status indications).

Referring to FIG. 24, three flip-flops 692–694 are used to latch selected status conditions based upon the IN_STATUS_L lines 51. The flip-flops 692–694 are all clocked on the rising edge of the OUT_SYNC_L signal 48, and all include a reset input connected to the OUT_XFER_L signal 46 through an inverter 695. The flip-flops 692–694 are therefore held in a reset condition prior to transmitting (OUT_XFER_L signal 46 at a high logic level), and enabled when the transmission begins (OUT_XFER_L signal 46 asserted to a low logic level). The status from each participating receiver is updated in response to the active, or falling edge of the OUT_SYNC_L signal 48 which defines the beginning of each bus cycle. These status indication are then allowed to become stable before clocking the flip-flops 692–694 on the rising edge of the OUT_SYNC_L signal 48.

Flip-flop 692 is used to latch the "receiver present" status. An AND gate 696 has inputs connected to the IN_STATUS_L[3] line 51d and to the FIRST_CRC_ENABLE signal 612. The FIRST_CRC_ENABLE signal 612 serves to inhibit the output of AND gate 696 until after the negotiation for the data transfer width has been completed. Once the FIRST_CRC_ENABLE signal 612 has been asserted to a high logic level, the receiving module 11 is expected to have unconditionally asserted the IN_STATUS_L[3] line 51d to a low logic level. In that case, the output of AND gate 696 will continue to be false (low logic level) after the first bus cycle. However, if the IN_STATUS_L[3] line 51d remains at a high logic level after the first bus cycle, then the output of AND gate 696 will be true (high logic level). The output of AND gate 696 is connected to the D input of flip-flop 692, and so flip-flop 692 will become set if the receiver fails to hold the IN_STATUS_L[3] line 51d low after the first bus cycle. Consequently, the Q output of flip-flop 691 is labeled as a RCVR_NO_REPLY signal 697.

Still referring to FIG. 24, the "receiver busy" condition is latched by flip-flop 693. The D input of flip-flop 693 is connected to the output of a NOR gate 700 (represented as an AND function with inverted inputs), which in turn has inputs connected to the IN_STATUS_L[1] signal 51b and the CYCLE1 signal 611. The CYCLE1 signal 611 prevents a true (high logic level) from being produced by NOR gate 700 until after the CYCLE1 signal is dropped to a low logic level at the start of the second bus cycle. After that time, the assertion of the IN_STATUS_L[1] signal 51b to a low logic level results in a high logic level output from NOR gate 700, and consequently results in flip-flop 693 being set. The Q output of flip-flop 693 is labeled as a RCVR_BUSY signal 701, and will become true (high logic level) when a busy condition is generated by any one of the receiving modules 11.

An OR gate 705 combines the RCVR_NO_REPLY signal 697 and RCVR_BUSY signal 701 to produce the RESET signal 691. As described above, assertion of the RESET signal 691 causes the TX control circuit 610 (FIG. 20) to terminate the transmit cycle immediately, thereby saving unnecessary transmission time in view of the detected error condition.

Referring again to FIG. 24, flip-flop 694 latches the state of the IN_STATUS_L[0] line 51a. The IN_STATUS_L[0] line 51a is used to indicate the result of the comparison in receiving modules 11 of the CRC computed in the receiving modules 11 versus the CRC code included in the frame itself. No extra gating is used, such that the Q output of flip-flop 694 reflects the final state of the IN_STATUS_L[0] line 51a, i.e. the result of the CRC comparison during the last bus cycle. The Q output of flip-flop 694 is labeled as a RCVR_CRC_OK signal 708, and is connected as an input to a host bus interface circuit 710. The above mentioned RCVR_NO_REPLY signal 697 and RCVR_BUSY signal 701 are also both connected as inputs to the host bus interface circuit 710. The host bus interface circuit 710 includes decoding and buffer circuits (not shown) to permit the host processor 20 to determine if an error in transmission occurred and to read the state of the status signals 697, 701 and 708 via the host bus 20. In case of an aborted message frame, the host processor 21 may thereby determine the particular cause of the termination ("busy", "no reply", or bad CRC comparison). This mechanism provides the host processor 21 with assurance of accurate and complete delivery of message frames, with rapid termination of message frames if an error does occur.

There has been hereinabove described a preferred embodiment of the invention. Numerous modifications to the embodiments described should be apparent to those skilled in the art. For example, another embodiment of the invention may be realized by integrating some of the host processor functions into a core processor. In that case, the core processor and interface circuit may be implemented on a single large scale, application specific integrated circuit (ASIC). The core processor may be utilized, for example, to manage control blocks and provide additional message buffering.

We claim:

1. A method for receiving a message frame which is transmitted over a backplane bus in a series of bus cycles from a sending module to a receiving module, the method for operating the receiving module comprising the steps of:

a) receiving a first frame byte, a second frame byte, and a third frame byte, the first frame byte including a destination code which identifies one or more modules connected to the backplane bus which are addressed recipients of the message frame;

b) decoding the destination code to form a first determination as to whether the receiving module is an addressed recipient of the message frame;

c) if the receiving module is an addressed recipient of the message frame, then forming a second determination as to whether the receiving module currently meets a resource availability criteria for accepting the message frame, the second determination being formed prior to the latter of completion of a second bus cycle or completion of the bus cycle in which the third frame byte was received;

d) if the receiving module is an addressed recipient of the message frame according to said first determination, and the receiving module meets the resource availability criteria for accepting the message frame according to said second determination, then completing reception and processing of the message frame;

e) if the receiving module is an addressed recipient of the message frame according to said first determination, but the receiving module does not meet the resource availability criteria for accepting the message frame according to said second determination, then asserting a busy signal on the backplane bus prior to the latter of completion of the second bus cycle or completion of the bus cycle in which the third frame byte was received, whereby the transmitting module responds to the busy signal by forthrightly aborting the transmission and relinquishing control of the backplane bus.

2. The method as recited in claim 1 in which said step of forming the second determination for meeting the resource availability criteria is based upon:

i) the second frame byte including a start-of-message code which indicates whether or not the current frame is a start-of-message frame of a complete message;

ii) the receiving module including a fixed number of control blocks for storing data pertinent to the receipt of an associated complete message, wherein one of said control blocks must be allocated to each complete message to be received; and iii) the receiving module maintaining a count of the number of unallocated control blocks remaining which are available for allocation to new complete messages;

whereby upon receipt of a second frame byte which indicates that the message frame is a start-of-message frame, the receiving module forms said second determination by examining the count of remaining control blocks, wherein if the count of unallocated control blocks is greater than a predetermined minimum control block count, then one of the available control blocks is allocated for the complete message begun by the start-of-message frame, the count of unallocated control blocks is decremented, and the second determination is formed to indicate that the receiving module meets the resource availability criteria, and wherein if the count of unallocated control blocks is less than or equal to said predetermined minimum control block count, then the second determination is formed to indicate that the receiving module does not meet the resource availability criteria.

3. The method as recited in claim 2 in which the receiving module further includes an arbitration circuit which acquires a message priority code for the message frame prior to reception of the message frame, and in which said predetermined minimum control block count is selected from a plurality of different minimum control block count values based upon said message priority code, wherein successively higher priority values for said message priority code select successively lower minimum control block count values, such that a greater number of control blocks are reserved for higher priority messages.

4. The method as recited in claim 2 in which the second frame byte further includes a connected-message code which indicates whether or not the current frame is a part of a complete message which belongs to a connected message class for which control blocks in the receiving module are preallocated in addition to said fixed number of control blocks, and in which if the second frame byte indicates both a start-of-message frame and a connected message class for the message frame, then the second determination is formed to indicate that the receiving module meets the resource availability criteria without regard to said count of remaining control blocks, whereby said fixed number of control blocks remain available for allocation to messages other than from said connected message class.

5. The method as recited in claim 1 in which the receiving module includes an arbitration circuit which obtains a source identification of the transmitting module prior to receipt of the message frame, in which said step of forming the second determination for meeting the resource availability criteria is based upon a set of lockout latches, wherein one lockout latch is associated with the source identification of each possible transmitting module connected to the backplane bus, and wherein the method further includes the steps of:
  upon successful receipt of a message frame from a particular transmitting module, setting the lockout latch associated with the source identification of that particular transmitting module;
  upon completion of processing for the successfully received message frame from said particular transmitting module, clearing the lockout latch associated with the source identification of said particular transmitting module;
  forming said second determination by examining the state of the lockout latch associated with the source identification of the particular transmitting module, wherein if the associated lockout latch is cleared, then the second determination is formed to indicate that the receiving module meets the resource availability criteria, and wherein if the associated lockout latch is set, then the second determination is formed to indicate that the receiving module does not meet the resource availability criteria.

6. The method as recited in claim 1 in which the receiving module includes a fixed number of buffers for receiving message frames, and in which said step of forming the second determination for meeting the resource availability criteria is based upon availability of a buffer for receiving the message frame, wherein if a buffer is available, then the second determination is formed to indicate that the receiving module meets the resource availability criteria, and wherein if a buffer is not available, then the second determination is formed to indicate that the receiving module does not meet the resource availability criteria.

7. The method as recited in claim 1 in which said resource availability criteria comprises a plurality of separate message frame acceptance conditions, wherein separate determinations are formed as to whether the message frame meets each of said acceptance conditions, wherein failure of the message frame to meet any one of said acceptance conditions results in forming the second determination to indicate that the receiving module does not meet the resource availability criteria for accepting the message frame, and wherein the second determination is formed to indicate that the receiving module meets the resource availability criteria for accepting the message frame only when all of said acceptance conditions are met.

8. The method as recited in claim 7 in which a first acceptance condition is based upon:
  i) the first frame byte including a start-of-message code which indicates whether or not the current frame is a start-of-message frame of a complete message;
  ii) the receiving module including a fixed number of control blocks for storing data pertinent to the receipt of an associated complete message, wherein one of said control blocks must be allocated to each complete message to be received; and
  iii) the receiving module maintaining a count of the number of unallocated control blocks remaining which are available for allocation to new complete messages;
  whereby upon receipt of a second frame byte which indicates that the message frame is a start-of-message frame, if the count of unallocated control blocks is greater than a predetermined minimum control block count, then one of the available control blocks is allocated for the complete message begun by the start-of-message frame, the count of unallocated control blocks is decremented, and the first acceptance condition is considered to be met, and wherein if the count of unallocated control blocks less than or equal to said predetermined minimum control block count, then the first acceptance condition is considered to not be met.

9. The method as recited in claim 8 in which the receiving module further includes an arbitration circuit which acquires a message priority code for the message frame prior to reception of the message frame, and in which said predetermined minimum control block count is selected from a plurality of different minimum control block count values based upon said message priority code, wherein successively higher priority values for said message priority code select successively lower minimum control block count values, such that a greater number of control blocks are reserved for higher priority messages.

10. The method as recited in claim 8 in which the second frame byte further includes a connected-message code which indicates whether or not the current frame is a part of a complete message which belongs to a connected message class for which control blocks in the receiving module are preallocated in addition to said fixed number of control and in which if the second frame byte indicates both a start-of-message frame and a connected message class for the message frame, then the first acceptance condition is considered to be met without regard to said count of remaining control blocks, whereby said fixed number of control blocks remain available for allocation to messages other than from said connected message class.

11. The method as recited in claim 8 in which the receiving module includes an arbitration circuit which obtains a source identification of the transmitting module prior to receipt of the message frame, in which a second acceptance condition is based upon a set of lockout latches, wherein one lockout latch is associated with the source identification of each possible transmitting module connected to the backplane bus, and wherein the method further includes the steps of:

upon successful receipt of a message frame from a particular transmitting module, setting the lockout latch associated with the source identification of that particular transmitting module;

upon completion of processing for the successfully received message frame from said particular transmitting module, clearing the lockout latch associated with the source identification of said particular transmitting module;

determining whether the second acceptance condition is met by examining the state of the lockout latch associated with the source identification of the particular transmitting module, wherein if the associated lockout latch is cleared, then the second acceptance condition is considered to be met, and wherein if the associated lockout latch is set, then the second acceptance condition is considered to not be met.

12. The method as recited in claim 11 in which the receiving module includes a fixed number of buffers for receiving message frames, and in which a third acceptance condition is based upon availability of a buffer for receiving the message frame, wherein if a buffer is available, then the third acceptance condition is considered to be met, and wherein if a buffer is not available, then the third acceptance condition is considered to not be met.

13. The method as recited in claim 7 in which the receiving module includes an arbitration circuit which obtains a source identification of the transmitting module prior to receipt of the message frame, in which a first acceptance condition is based upon a set of lockout latches, wherein one lockout latch is associated with the source identification of each possible transmitting module connected to the backplane bus, and wherein the method further includes the steps of:

upon successful receipt of a message frame from a particular transmitting module, setting the lockout latch associated with the source identification of that particular transmitting module;

upon completion of processing for the successfully received message frame from said particular transmitting module, clearing the lockout latch associated with the source identification of said particular transmitting module;

determining whether the first acceptance condition is met by examining the state of the lockout latch associated with the source identification of the particular transmitting module, wherein if the associated lockout latch is cleared, then the first acceptance condition is considered to be met, and wherein if the associated lockout latch is set, then the first acceptance condition is considered to not be met.

14. An interface circuit for a receiving module which forms a part of an industrial controller and which is connected to a backplane bus within the industrial controller, the receiving module being adapted to receive message frames from a transmitting module, the interface circuit comprising:

buffer means connected to the backplane bus for receiving first, second, third and subsequent frame bytes over a plurality of sequential bus cycles which form the message frame, in which the first frame byte includes a destination code which identifies one or more modules connected to the backplane bus which are addressed recipients of the message frame;

address comparison means for decoding the destination code, the address comparison means activating a reception signal if the receiving module is an addressed recipient of the message frame;

flow control means for determining whether the receiving module currently meets a resource availability criteria for accepting the message frame, the flow control means activating a BUSY signal if the receiving module is an addressed recipient of the message frame as indicated by the reception signal, but the receiving module currently does meet the resource availability criteria, the BUSY signal being activated subsequent to activation of said reception signal but prior to the latter of completion of the second bus cycle or completion of the bus cycle in which the third frame byte was received; and driver means for applying the BUSY signal, when activated, onto a busy line on the backplane bus;

wherin the transmitting module responds to the BUSY signal on the busy line by forthrightly aborting the transmission and relinquishing control of the backplane bus.

15. The interface circuit as recited in claim 14 in which:

the second frame byte includes a start-of-message code which indicates whether or not the current frame is a start-of-message frame of a complete message;

the receiving module includes a fixed number of control blocks for storing data pertinent to the receipt of an associated complete message, wherein one of said control blocks must be allocated to each complete message to be received; and the receiving module maintains a count of the number of unallocated control blocks remaining which are available for allocation to new complete messages;

and in which activation of the BUSY signal is enabled if the start-of-message code indicates that the current frame is a start-of-message frame and if the count of unallocated control blocks is less than or equal to a predetermined minimum control block count.

16. The interface circuit as recited in claim 15 in which the receiving module further includes an arbitration circuit which acquires a message priority code for the message frame prior to reception of the message frame and provides the message priority code to the flow control means, and in which the flow control means selects said predetermined minimum control block count from a plurality of different minimum control block count values based upon said message priority code, wherein successively higher priority values for said message priority code select successively lower minimum control block count values, such that a greater number of control blocks are reserved for higher priority messages.

17. The interface circuit as recited in claim 15 in which the second frame byte further includes a connected-message code which indicates whether or not the current frame is a part of a complete message which belongs to a connected message class for which control blocks in the receiving module are preallocated in addition to said fixed number of control blocks, and in which if the second frame byte indicates both a start-of-message frame and a connected message class for the message frame, then activation of the BUSY signal by the flow control means is suppressed without regard to said count of remaining control blocks, whereby said fixed number of control blocks remain available for allocation to messages other than from said connected message class.

18. The interface circuit as recited in claim 14 in which:
the receiving module further includes an arbitration circuit which obtains a source identification of the transmitting module prior to receipt of said message frame; and
the flow control means includes a set of lockout latches, wherein one lockout latch is associated with the source identification of each possible transmitting module connected to the backplane bus;
and wherein:
upon successful receipt of a message frame from a particular transmitting module, the flow control means sets the lockout latch associated with the source identification of that particular transmitting module;
upon completion of processing by the receiving module for the successfully received message frame from said particular transmitting module, the flow control means clears the lockout latch associated with the source identification of said particular transmitting module; and
the flow control means activates the BUSY signal if the lockout latch associated with the source identification of an incoming message frame is set.

19. The interface circuit as recited in claim 14 in which the receiving module includes a fixed number of buffers for receiving message frames, and in which the flow control means enables activation of the BUSY' signal if a buffer is not available for buffering an incoming message frame.

20. The interface circuit as recited in claim 14 in which the flow control means evaluates a plurality of separate message frame acceptance conditions in forming said resource availability criteria, wherein failure of the message frame to meet any one of said acceptance conditions results in enabling activation of the BUSY signal.

21. The interface circuit as recited in claim 20 in which:
the second frame byte includes a start-of-message code which indicates whether or not the current frame is a start-of-message frame of a complete message;
the receiving module includes a fixed number of control blocks for storing data pertinent to the receipt of an associated complete message, wherein one of said control blocks must be allocated to each complete message to be received; and
the receiving module maintains a count of the number of unallocated control blocks remaining which are available for allocation to new complete messages;
and wherein the flow control means evaluates a first acceptance condition when the second frame byte indicates that the message frame is a start-of-message frame, such that if the count of unallocated control blocks is less than or equal to said predetermined minimum control block count, then the first acceptance condition is considered to not be met and the flow control means enables activation of the BUSY signal.

22. The interface circuit as recited in claim 21 in which the receiving module further includes an arbitration circuit which acquires a message priority code for the message frame prior to reception of the message frame and provides the message priority code to the flow control means, and in which the flow control means selects said predetermined minimum control block count from a plurality of different minimum control block count values based upon said message priority code, wherein successively higher priority values for said message priority code select successively lower minimum control block count values, such that a greater number of control blocks are reserved for higher priority messages.

23. The interface circuit as recited in claim 21 in which the second frame byte further includes a connected-message code which indicates whether or not the current frame is a part of a complete message which belongs to a connected message class for which control blocks in the receiving module are preallocated in addition to said fixed number of control blocks, and in which if the second frame byte indicates both a start-of-message frame and a connected message class for the message frame, then the first acceptance condition is considered to be met and activation of the BUSY signal by the flow control means is suppressed without regard to said count of remaining control blocks, whereby said fixed number of control blocks remain available for allocation to messages other than from said connected message class.

24. The interface circuit as recited in claim 21 in which:
the receiving module further includes an arbitration circuit which obtains a source identification of the transmitting module prior to receipt of the message frame; and
the flow control means includes a set of lockout latches, wherein one lockout latch is associated with the source identification of each possible transmitting module connected to the backplane bus;
and wherein:
upon successful receipt of a message frame from a particular transmitting module, the flow control means sets the lockout latch associated with the source identification of that particular transmitting module;
upon completion of processing by the receiving module for the successfully received message frame from said particular transmitting module, the flow control means clears the lockout latch associated with the source identification of said particular transmitting module; and
the flow control means evaluates a second acceptance condition based upon the lockout latch associated with the source identification of an incoming message frame, wherein if said associated lockout latch is set, then the second acceptance condition is considered to have failed, and the flow control means enables activation of the BUSY signal.

25. The interface circuit as recited in claim 24 in which the receiving module includes a fixed number of buffers for receiving message frames, and in which the flow control means evaluates a third acceptance condition based upon availability of a buffer for receiving the message frame, wherein if a buffer is not available, then the third acceptance condition is considered to not be met and the flow control means enables activation of the BUSY signal.

26. The interface circuit as recited in claim 20 in which:
the receiving module further includes an arbitration circuit which obtains a source identification of the transmitting module prior to receipt of the message frame; and the flow control means includes a set of lockout latches, wherein one lockout latch is associated with the source identification of each possible transmitting module connected to the backplane bus;

and wherein:

upon successful receipt of a message frame from a particular transmitting module, the flow control means sets the lockout latch associated with the source identification of that particular transmitting module;

upon completion of processing by the receiving module for the successfully received message frame from said particular transmitting module, the flow control means clears the lockout latch associated with the source identification of said particular transmitting module; and the flow control means evaluates a first acceptance condition based upon the lockout latch associated with the source identification of an incoming message frame, wherein if said associated lockout latch is set, then the second acceptance condition is considered to have failed, and the flow control means enables activation of the BUSY signal.

* * * * *